(12) United States Patent
Weiser et al.

(10) Patent No.: US 8,890,925 B2
(45) Date of Patent: Nov. 18, 2014

(54) SYSTEMS AND METHODS FOR MAPPING A URI TO A PLURALITY OF ENDPOINTS FOR A SIP COMMUNICATION

(75) Inventors: Reginal Weiser, Westmount (CA); Richard McGravie, Beaconsfield (CA)

(73) Assignee: Positron Telecommunication Systems, Inc., Montreal, Quebec (CA)

( * ) Notice: Subject to any disclaimer, the term of this patent is extended or adjusted under 35 U.S.C. 154(b) by 185 days.

(21) Appl. No.: 13/313,946

(22) Filed: Dec. 7, 2011

(65) Prior Publication Data
US 2013/0147902 A1    Jun. 13, 2013

(51) Int. Cl.
*H04N 7/15*    (2006.01)

(52) U.S. Cl.
CPC .................................... *H04N 7/15* (2013.01)
USPC ................. 348/14.08; 348/14.09; 348/14.12; 370/261

(58) Field of Classification Search
USPC .............................. 348/14.01–14.16; 709/204
See application file for complete search history.

(56) References Cited

U.S. PATENT DOCUMENTS

| 2008/0101577 A1* | 5/2008 | Frankel | 379/202.01 |
| 2010/0217823 A1* | 8/2010 | Clark et al. | 709/207 |
| 2012/0281057 A1* | 11/2012 | Couse | 348/14.03 |

\* cited by examiner

*Primary Examiner* — Melur Ramakrishnaiah
(74) *Attorney, Agent, or Firm* — Foley & Lardner LLP; Christopher J. McKenna

(57) ABSTRACT

The present disclosure is directed to systems and methods for providing unauthenticated client access to session initiation protocol (SIP) communication services provided by an Ethernet device comprising a proxy and a conference bridge. A device installed as an Ethernet adapter receives a SIP call request from a first client, the SIP call request comprising a first uniform resource identifier (URI), the first URI comprising a SIP alias. The device determines that the first client has not been authenticated. The device identifies that the first URI comprises a SIP alias. The device proxies the SIP call request to an endpoint associated with the SIP alias, responsive to the identification of the first URI as a SIP alias.

24 Claims, 27 Drawing Sheets

Mixed Video Arrangements/Formats

SYSTEMS AND METHODS FOR MAPPING A URI TO A PLURALITY OF ENDPOINTS FOR A SIP COMMUNICATION

FIELD OF THE INVENTION

The present application generally relates to telecommunications networks. In particular, the present application relates to systems and methods for providing communications to unauthenticated clients.

BACKGROUND OF THE INVENTION

Current video conferencing techniques allow multiple users in geographically-separated locations to hear and see each other via simultaneous two-way audio and video transmissions. For example, using Google Voice and Video Chat, provided by Google, Inc. of Menlo Park, Calif., two users may establish a two-way multimedia communication session, with each user's computer displaying output of a video camera of the other user's computer. Similarly, using iChat, manufactured by Apple Inc., of Cupertino, Calif., a plurality of users may establish a video conference, with each user seeing video of each other user.

As more users are added to a video conference, bandwidth requirements may drastically increase, scaling according to (number of users)*(number of users−1). For example, with two users, each receives video output from the other user, requiring network bandwidth for two video transmissions. With four users, because each user's video must be sent to three other participants, network bandwidth is required for twelve simultaneous video transmissions. This can quickly become unmanageable. For example, referring briefly to the block diagram of an embodiment of a video conference illustrated in FIG. 1A, a conference with 6 participants requires 30 transmissions to ensure each receives video output from others. Current systems typically place a cap on the number of participants allowed in a video conference, or else make some participants receive-only, such that their video output is not sent to other participants.

Similarly, processing requirements may drastically increase as the conference size grows. Each user's computer is required to receive the multiple video streams and display them simultaneously. For a six-user conference, for example, the six computing devices are all required to composite five incoming video streams, plus a local camera video output. Aside from the waste of redundant processing by each client, this restricts the ability of computing devices with low processing power from being able to participate in video conferences with a large number of users.

Enterprises typically spend a lot of money on their communications equipment and, accordingly, tend to hold onto said equipment long past obsolescence due to the high cost of replacement and internal resistance to change. Additionally, such systems may have costly service or upgrade contracts. Many companies allow such contracts to expire or lapse due to not appreciating the potential for reconfiguration or foreseeing potential new features. The companies may be ineligible to renew such upgrade contracts, for example, those provided by a manufacturer, or may have to pay retroactive costs back to the date of lapse in order to receive updates. Due to the high costs, even new features provided by manufacturers may be unavailable to many users.

BRIEF SUMMARY OF THE INVENTION

The present application is directed towards systems and methods for providing video conference services via a single device installed as an Ethernet adapter on a computing device. A device, based around a standard form factor such as a PCI card, with a CPU, operating system, and memory may be installed in a server or other computing device and utilize power from the computing device while operating independently. The device may comprise an audio/video media processor for mixing a plurality of video streams to generate one or more mixed video streams, which may be provided to video conference participants. In some embodiments, the device may select a mixing format or arrangement for the mixed video streams based on the number of participants or identified roles of one or more participants. As shown in the block diagram of an embodiment of a video conference illustrated in FIG. 1B, in which solid lines represent video streams sent from each conference participant and dashed lines represent mixed video streams provided by the mixer, mixing the video streams may drastically reduce network bandwidth, as well as reducing processing costs by each participant's device.

In one aspect, the present application is directed to a method for providing, via a single integrated device installed as an Ethernet adapter, a mixed video conference of a plurality of video conference participants. The method includes a media controller of a single integrated device installed as an Ethernet adapter in a computing device intercepting a first video stream communicated over a first transport layer connection established between the computing device and a first device of a first video conference participant of a plurality of video conference participants. The first video stream may comprise a first video capture of the first video conference participant from the first device.

The method also includes the media controller intercepting a second video stream communicated over a second transport layer connection established between the computing device and a second device of a second video conference participant of the plurality of video conference participants. The second video stream may comprise a second video capture of the second video conference participant from the second device.

The method further includes a video conferencing application communicating, to an audio/video media processor of the device, a request to mix the intercepted first video stream and the intercepted second video stream. The method also includes the media controller receiving, from the audio/video media processor, a mixed video comprising a single video stream of a first view of the first video conference participant and a second view of the second video conference participant. The method further includes the media controller transmitting the mixed video via the first transport layer connection to the first device of the first video conference participant. The method also includes the media controller transmitting the mixed video via the second transport layer connection to the second device of the second video conference participant.

In one embodiment, the method includes the media controller intercepting a real time protocol (RTP) payload of a transport layer protocol packet of the first transport layer connection, the RTP payload comprising a portion of the first video stream. In another embodiment, the method includes the media controller intercepting a real time protocol (RTP) payload of a transport layer protocol packet of the second transport layer connection, the RTP payload comprising a portion of the second video stream.

In some embodiments, the method includes the audio/video media processor processing the intercepted first video stream and the intercepted second video stream into a predetermined arrangement for mixing. In a further embodiment, the method includes the video conferencing application identifying the predetermined arrangement from a plurality of predetermined arrangements based on a role of a video conference participant of the plurality of video conference participants. In another further embodiment, the method includes the video conferencing application identifying the predetermined arrangement from a plurality of predetermined arrangements based on a number of video conference participants.

In one embodiment, the method includes the audio/video media processor inserting content into one of the intercepted first video stream or the intercepted second video stream, the content to augment the mixed video transmitted to the plurality of video conference participants. In another embodiment, the method includes the audio/video media processor inserting content into the mixed video stream to augment the mixed video transmitted to the plurality of video conference participants.

In some embodiments, the method includes the media controller generating a real time protocol (RTP) payload for a transport layer protocol packet for the first transport layer connection, the media controller using RTP information from an RTP payload received by the device from the first video stream. In other embodiments, the method includes the media controller generating a real time protocol (RTP) payload for a transport layer protocol packet for the second transport layer connection, the media controller using RTP information from an RTP payload received by the device from the second video stream.

In another aspect, the present application is directed to a system for providing, via a single integrated device installed as an Ethernet adapter, a mixed video conference of a plurality of video conference participants. The system includes a single integrated device installed as an Ethernet adapter in a computing device. The device includes a media controller configured for intercepting a first video stream communicated over a first transport layer connection established between the computing device and a first device of a first video conference participant of a plurality of video conference participants. The first video stream may comprise a first video capture of the first video conference participant from the first device.

The media controller is also configured for intercepting a second video stream communicated over a second transport layer connection established between the computing device and a second device of a second video conference participant of the plurality of video conference participants. The second video stream may comprise a second video capture of the second video conference participant from the second device.

The device further includes an audio/video media processor, and a video conferencing application of the device or a host computing device is configured for communicating, to the audio/video media processor, a request to mix the intercepted first video stream and the intercepted second video stream. The media controller is also configured for receiving, from the audio/video media processor, a mixed video comprising a single video stream of a first view of the first video conference participant and a second view of the second video conference participant. The media controller is further configured for transmitting the mixed video via the first transport layer connection to the first device of the first video conference participant. The media controller is further configured for transmitting the mixed video via the second transport layer connection to the second device of the second video conference participant.

In yet another aspect, the present application is directed to a method for providing, via a single integrated device installed as an Ethernet adapter, a mixed video conference of a plurality of video conference participants based on a role of at least one video conference participant of the plurality of video conference participants. The method includes a media controller of a device installed as an Ethernet adapter in a computing device intercepting a first real time protocol stream comprising a first video stream communicated over a first transport layer connection established between the computing device and a first device of a first video conference participant of a plurality of video conference participants. The first video stream comprises a first video capture of the first video conference participant from the first device.

The method also includes the media controller intercepting a second real time protocol stream comprising a second video stream communicated over a second transport layer connection established between the computing device and a second device of a second video conference participant of the plurality of video conference participants. The second video stream comprises a second video capture of the second video conference participant from the second device.

The method also includes a video conferencing application of the device or the computing device selecting a mixing format corresponding to a role of the first video conference participant. The method further includes the video conferencing application communicating, to an audio/video media processor, a request to process the intercepted first video stream and the intercepted second video stream in accordance with the mixing format. The method also includes the media controller receiving, from the audio/video media processor, a mixed video comprising a single video stream of a view of the second video conference participant based on the mixing format. The method also includes the media controller transmitting the mixed video to the first device of the first video conference participant.

In one embodiment, the method includes the video conferencing application identifying that the role of the first video conference participant is a presenter. In another embodiment, the method includes the video conferencing application identifying that the role of the first video conference participant is a lecturer. In still another embodiment, the method includes the video conferencing application identifying that the role of the first video conference participant is a non-presenter participant. In yet still another embodiment, the method includes the video conferencing application identifying that the role of the first video conference participant is a non-presenter lecturer. In some embodiments, the method includes selecting, by the video conferencing application, the mixing format based on a number of video conference participants.

In one embodiment, the method includes the media controller receiving the mixed video comprising a single video stream of the view of the second video conference participant and a second view of the first video conference participant based on the mixing format. In another embodiment, the method includes the media controller communicating, to the video conferencing application, a second request to process the intercepted first video stream and the intercepted second video stream in accordance with a second mixing format for a second role of a second video conference participant. In a further embodiment, the method includes the media controller receiving, from the video conferencing application, a second mixed video comprising a single video stream of a second view of the first video conference participant based on the second mixing format. In a still further embodiment, the method includes the media controller transmitting the second mixed video to the second device of the second video conference participant.

In another aspect, the present application is directed to a method for enabling session initiation protocol capabilities for a private branch exchange system without a session initiation protocol stack. The method includes providing a device installed as an Ethernet adapter in a computing device, the device in communication with a private branch exchange (PBX) system without a session initiation protocol (SIP) stack, the device providing a SIP service to the PBX system. The method also includes receiving, by the device, a request from a non-SIP phone of a first user on the PBX system to establish an audio session with a second user at an extension, the second user having a SIP phone connected to the device. The method further includes establishing, by the device responsive to the request, the audio session between the non-SIP phone and the SIP extension of the SIP phone corresponding to the extension requested by the first user.

In some embodiments, the method includes providing, by the device via the SIP service, access to a SIP trunk. In other embodiments, the method includes providing the device as an appliance in communication with the PBX system. In still other embodiments, the method includes receiving, by a SIP registrar of the device, a register request to register the SIP phone, the device providing a proxy between non-SIP phones of the PBX system and SIP phones connected via the device.

In one embodiment, the method includes receiving, by the device, the request via a non-SIP protocol and converting the request to SIP. In another embodiment, the method includes establishing, by the device, the audio session with the non-SIP phone using time division multiplexing (TDM) based communications. In yet another embodiment, the method includes establishing, by the device, the audio session with the SIP phone using Internet Protocol (IP) based communications.

In some embodiments, the method includes receiving, by the device, a SIP request from the SIP phone of the second user to establish a second audio session with the first user, the first user having the non-SIP phone on the PBX system and communicating, responsive to the SIP request, via the PBX system to establish the second audio session with the non-SIP phone of the second user. In a further embodiment, the method includes determining, by the device, that the non-SIP phone of the first user is on the PBX system. In another further embodiment, the method includes converting, by the device, the SIP request into a signal for an inbound call to the PBX system.

In another aspect, the present application is directed to a system for enabling session initiation protocol (SIP) capabilities for a private branch exchange system without a session initiation protocol (SIP) stack. The system includes a device installed as an Ethernet adapter in a computing device, the device in communication with a private branch exchange (PBX) system without a session initiation protocol (SIP) stack. The system also includes a SIP service executing on the device. The SIP service receives a request from a non-SIP phone of a first user on the PBX system to establish an audio session with a second user at an extension, the second user having a SIP phone connected to the device. The device establishes, responsive to the request, the audio session between the non-SIP phone and the SIP extension of the SIP phone corresponding to the extension requested by the first user.

In some embodiments, the device is installed in a computing device in a form of an appliance in communication with the PBX system. In other embodiments, the SIP service provides to the PBX system access to a SIP trunk. In still other embodiments, the system includes a SIP registrar of the device receives a register request to register a SIP phone, the device providing a proxy between non-SIP phones of the PBX system and SIP phones connected via the device. In yet still other embodiments, the device receives the request via a non-SIP protocol and converts the request to SIP.

In some embodiments, the device establishes the audio session with the non-SIP phone using time division multiplexing (TDM) based communications. In other embodiments, the device establishes the audio session with the SIP phone using Internet Protocol (IP) based communications. In one embodiment, the device receives a SIP request from the SIP phone of the second user to establish a second audio session with a first user, the first user having the non-SIP phone on the PBX system and communicates, responsive to the SIP request, via the PBX system to establish the second audio session with the non-SIP phone of the second user. In a further embodiment, the device determines that the non-SIP phone of the first user is on the PBX system. In another further embodiment, the device converts the SIP request into a signal for an inbound call to the PBX system.

In another aspect, the present disclosure is directed to a method for providing security for session initiation protocol (SIP) services via a single device providing an SIP proxy and video conference bridge. The method includes an Ethernet interface of a device deployed as a proxy between a first client and a second client receiving a first session initiation protocol (SIP) request of the first client to establish a real-time communication with the second client. The method also includes a firewall of the device determining, based on application of a policy to the first SIP request, to deny the first SIP request. The method further includes the Ethernet interface of the device receiving a real-time communication protocol request, originated by the first client, to establish a real-time communication channel with the second client. The method also includes the firewall identifying that the first client originating the real-time communication protocol request corresponds to the first client of the denied first SIP request. The method also includes the firewall discarding the real-time communication protocol request, at a transport layer of a network stack of the Ethernet interface, responsive to the identification.

In one embodiment, the method includes determining, based on applying an access control list policy to a source IP address of the first SIP request, to deny the first SIP request. In another embodiment, the method includes determining the first SIP request comprises an invalid session request. In still another embodiment, the method includes determining that a user of the first client has not been authenticated or lacks authorization. In still yet another embodiment, the method includes determining to deny the first SIP request, responsive to receiving a predetermined number of additional SIP requests from the first client in a predetermined period.

In some embodiments, the method includes adding a source IP address of the first SIP request to a block list of an access control list, responsive to determining to deny the first SIP request. In other embodiments, the method includes receiving a real-time communication protocol request to initiate a video conference via a video conference bridge of the device with the second client. In yet still other embodiments, the method includes determining that the source IP of the real-time communication protocol request corresponds to the source IP of the denied first SIP request. In other embodiments, the method includes discarding the real-time communication protocol request prior to inspecting the real-time communication protocol request at a layer of the network stack above the transport layer.

In another aspect, the present disclosure is directed to a system for providing security for session initiation protocol (SIP) services via a single device providing an SIP proxy and video conference bridge. The system includes a device deployed as a proxy between a first client and a second client, comprising an Ethernet interface and a firewall. The Ethernet interface is configured to receive a first session initiation protocol (SIP) request of the first client to establish a real-time communication with the second client, and receive a real-time communication protocol request, originated by the first client, to establish a real-time communication channel with the second client. The firewall is configured to determine, based on application of a policy to the first SIP request, to deny the first SIP request, identify that the first client originating the real-time communication protocol request corresponds to the first client of the denied first SIP request, and discard the real-time communication protocol request, at a transport layer of a network stack of the Ethernet interface, responsive to the identification.

In one embodiment, the firewall is configured to determine, based on applying an access control list policy to a source IP address of the first SIP request, to deny the first SIP request. In another embodiment, the firewall is configured to determine the first SIP request comprises an invalid session request. In still another embodiment, the firewall is configured to determine that a user of the first client has not been authenticated or lacks authorization. In still yet another embodiment, the firewall is configured to determine to deny the first SIP request, responsive to receiving a predetermined number of additional SIP requests from the first client in a predetermined period.

In some embodiments, the firewall is configured to add a source IP address of the first SIP request to a block list of an access control list, responsive to determining to deny the first SIP request. In other embodiments, the device further comprises a video conference bridge, and the Ethernet interface is configured to receive a real-time communication protocol request to initiate a video conference via the video conference bridge with the second client. In other embodiments, the firewall is configured to determine that the source IP of the real-time communication protocol request corresponds to the source IP of the denied first SIP request. In still other embodiments, the firewall is configured to discard the real-time communication protocol request prior to inspecting the real-time communication protocol request at a layer of the network stack above the transport layer.

In another aspect, the present disclosure is directed to a method for providing unauthenticated client access to session initiation protocol (SIP) communication services provided by an Ethernet device comprising a conference bridge. The method includes receiving, by a device installed as an Ethernet adapter, a SIP call request from a first client, the SIP call request comprising a first uniform resource identifier (URI), the first URI comprising a SIP alias. The method further includes determining, by the device, that the first client has not been authenticated. The method also includes identifying, by the device, that the first URI comprises a SIP alias. The method also includes forwarding, by the device, the SIP call request to an endpoint associated with the SIP alias, responsive to the identification of the first URI as a SIP alias.

In one embodiment, the method includes determining that the SIP alias corresponds to a conference bridge address, and wherein forwarding the SIP call request is performed responsive to the determination that the SIP alias corresponds to the conference bridge address. In a further embodiment, the method includes determining that the conference bridge address is an address for an active conference session, and wherein forwarding the SIP call request is performed responsive to the determination that the conference bridge address is an address for the active conference session.

In another embodiment, the method includes determining that the first client has not registered an address with a registrar of the device. In yet another embodiment, the method includes determining that the first client lacks authorization to register an address. In yet still another embodiment, the method includes retrieving a registration record associated with the first URI from a registrar of the device. In a further embodiment, the method includes identifying an explicit alias indicator in the retrieved registration record. In another further embodiment, the method includes identifying that the first URI is associated with a plurality of addresses. In still yet another further embodiment, the method includes identifying that the first URI is associated with an address of a conference bridge. In yet still another further embodiment, the method includes identifying that the first URI is associated with a second URI.

In some embodiments, the method includes receiving, by the device, a second SIP call request from the first client, the SIP call request comprising a third URI; and blocking, by the device, the second SIP call request. In a further embodiment, the method includes blocking the request, responsive to determining that the third URI corresponds to an internal extension. In another further embodiment, the method includes blocking the request, responsive to determining that the third URI does not correspond to an active conference session. In still yet another further embodiment, the method includes blocking the request, responsive to determining that a number of requests received from the first client exceeds a predetermined threshold. In another further embodiment, the method includes adding the first client to a blacklist.

In another aspect, the present disclosure is directed to a system for providing unauthenticated client access to session initiation protocol (SIP) communication services provided by an Ethernet device comprising a proxy and a conference bridge. The system includes a device installed as an Ethernet adapter, comprising an Ethernet interface for receiving a SIP call request from a first client, the SIP call request comprising a first uniform resource identifier (URI), the first URI comprising a SIP alias. The device is configured for determining that the first client has not been authenticated, identifying that the first URI comprises a SIP alias, and forwarding the SIP call request to an endpoint associated with the SIP alias, responsive to the identification of the first URI as a SIP alias.

In one embodiment, the device further comprises a conference bridge, and the device is configured for determining that the SIP alias corresponds to a conference bridge address, and forwarding the SIP call request is performed responsive to the determination that the SIP alias corresponds to the conference bridge address. In a further embodiment, the device is further configured for determining that the conference bridge address is an address for an active conference session, and forwarding the SIP call request is performed responsive to the determination that the conference bridge address is an address for the active conference session.

In another embodiment, the device comprises a registrar, and the device is configured for determining that the first client has not registered an address with the registrar of the device. In still another embodiment, the device is configured for determining that the first client lacks authorization to register an address. In yet still another embodiment, the device comprises a registrar, and the device is configured for retrieving a registration record associated with the first URI from the registrar of the device. In a further embodiment, the device is configured for identifying an explicit alias indicator in the retrieved registration record. In another further embodiment, the device is configured for identifying that the first URI is associated with a plurality of addresses. In yet another further embodiment, the device comprises a conference bridge, and the device is configured for identifying that the first URI is associated with an address of the conference bridge. In yet still another embodiment, the device is configured for identifying that the first URI is associated with a second URI.

In some embodiments, the Ethernet interface is further configured for receiving a second SIP call request from the first client, the SIP call request comprising a third URI; and the device is further configured for blocking the second SIP call request.

In still another aspect, the present disclosure is directed to a method for providing communications between different signaling protocol-using endpoints by single integrated device installed as an Ethernet adapter establishing a video conference bridge. The method includes a single integrated device installed as an Ethernet adapter in a computing device receiving a first request from a first client to establish communications with a second client, the first request in a first signaling protocol. The method also includes the single integrated device identifying that the first client and second client use different signaling protocols. The method further includes a conference bridge of the single integrated device initiating a conference session for the first client and second client, responsive to the identification. The method also includes the conference bridge establishing a first communication session with the first client in the first signaling protocol and a second communication session with the second client in a second signaling protocol of the second client.

In some embodiments, the method includes translating, by the single integrated device, responsive to the identification, the first request in the first signaling protocol into a second signaling protocol of the second client. The method also includes transmitting, by the single integrated device, the translated first request to the second client in the second signaling protocol. The method further includes receiving, by the single integrated device, a first response from the second client, the first response in the second signaling protocol. The method also includes translating, by the conference bridge responsive to the identification, the first response in the second signaling protocol into the first signaling protocol of the first client. The method further includes transmitting, by the single integrated device, the translated first response to the first client in the first signaling protocol.

In one embodiment, the method includes modifying, by the single integrated device responsive to the identification, the first request to replace a signaling address of the first client in the first request with a first signaling address of the single integrated device; and modifying, by the single integrated device responsive to the identification, the first response to replace a signaling address of the second client with a second signaling address of the single integrated device. In a further embodiment, the method includes receiving, by the single integrated device, a second request from the first client directed to the second signaling address of the single integrated device, the second request in the first signaling protocol. The method of the further embodiment also includes replacing, by the single integrated device, the signaling address of the first client in the second request with the first signaling address of the single integrated device, and the second signaling address of the single integrated device with the signaling address of the second client. The method also includes translating, by the single integrated device, the second request into the second signaling protocol. The method further includes transmitting, by the single integrated device, the translated second request to the second client.

In another embodiment, the method includes retrieving an identification record for each of the first client and second client from a client database of the single integrated device. In other embodiments, the method includes initiating a video conference bridge between the first client and the second client. In still other embodiments, the first signaling protocol and the second signaling protocol are different protocols selected from the group consisting of Session Initiation Protocol (SIP), H.323, H.324, Extensible Messaging and Presence Protocol (XMPP), Skinny Call Control Protocol (SCCP), and Inter-Asterisk Exchange (IAX) protocol.

In another aspect, the present disclosure is directed to a method for providing communications between different real-time communication protocol-using endpoints by a single integrated device installed as an Ethernet adapter establishing a video conference bridge. The method includes a single integrated device installed as an Ethernet adapter in a computing device receiving a first request from a first client to establish a real-time communication session with a second client, the first request in a first real-time communication protocol. The method also includes the single integrated device identifying that the first client and second client use different real-time communication protocols. The method further includes a conference bridge of the single integrated device initiating a conference session for the first client and second client, responsive to the identification. The method also includes the conference bridge establishing a first real-time communication session with the first client in the first real-time communication protocol and a second real-time communication session with the second client in a second real-time communication protocol of the second client. In some embodiments, the method includes receiving, by the conference bridge of the single integrated device, a first media stream from the second client, the first media stream in the second real-time communication protocol. The method also includes translating, by the conference bridge of the single integrated device responsive to the identification, the first media stream in the second real-time communication protocol into the first real-time communication protocol of the first client. The method further includes transmitting, by the single integrated device, the translated first response media stream to the first client in the first real-time communication protocol.

In other embodiments, the method includes mixing, by an audio/video media processor of the single integrated device, the first media stream with a second media stream received from the first client in the first real-time communication protocol; and translating the mixed first media stream and second media stream into the first real-time communication protocol of the first client.

In one embodiment, the method includes modifying, by the single integrated device responsive to the identification, the first request to replace a real-time communication address of the first client in the first request with a first real-time communication address of the conference bridge. The method also includes transmitting, by the single integrated device, the modified first request to the second client. The method further includes receiving, by the single integrated device, a response to the modified first request from the second client, the response comprising a real-time communication address of the second client. The method also includes modifying, by the single integrated device responsive to the identification, the response from the second client to replace the real-time communication address of the second client with a second real-time communication address of the single integrated device. In some embodiments, the method includes retrieving a registration record for each of the first client and second client from a client database of the computing device. In other embodiments, the first real-time communication protocol and the second real-time communication protocol are different protocols selected from the group consisting of H.261, H.262, H.263, H.264, MPEG-1, MPEG-4, G.722, G.723, Windows Media Audio (WMA), and Windows Media Video (WMV).

In yet another aspect, the present application is directed to a system for providing communications between different protocol-using endpoints by a single integrated device installed as an Ethernet adapter in a computing device establishing a video conference bridge. The system includes a single integrated device installed as an Ethernet adapter in a computing device, the device comprising a video conference bridge. The single integrated device is configured to receive a first request from a first client to establish a real-time communication session with a second client, the first request in a first real-time communication protocol. The single integrated device is also configured to identify that the first client and second client use different real-time communication protocols. The single integrated device is further configured to receive a first response from the second client, the first response in the second real-time communication protocol. The video conference bridge of the single integrated device is configured to initiate a conference session for the first client and second client, responsive to the identification, and establish a first real-time communication session with the first client in the first real-time communication protocol and a second real-time communication session with the second client in a second real-time communication protocol of the second client.

In some embodiments, the single integrated device is further configured to modify, responsive to the identification, the first request to replace a real-time communication address of the first client in the first request with a first real-time communication address of the single integrated device. The single integrated device is also configured to modify, responsive to the identification, the first response to replace a real-time communication address of the second client with a second real-time communication address of the single integrated device.

In another embodiment, the single integrated device further comprises a client database, and is configured to retrieve an identification record for each of the first client and second client from the client database of the single integrated device. In yet another embodiment of the system, the first real-time communication protocol and the second real-time communication protocol are different protocols selected from the group consisting of H.261, H.262, H.263, H.264, MPEG-1, MPEG-4, G.722, G.723, Windows Media Audio (WMA), and Windows Media Video (WMV).

In still another aspect, the present application is directed to a method for providing multi-processing of video and audio portions of a video and audio conference. The method includes a processor within a single integrated device installed as an Ethernet adapter on a computing device intercepting, at a network layer of a network stack of the computing device, a video stream communicated over a transport layer connection established between the computing device and a first device. The method also includes the processor within the single integrated device installed as the Ethernet adapter processing the video stream comprising a video portion of a video and audio conference. The method further includes a communication application executing on a central processing unit (CPU) of the computing device and operating at an application layer of the network stack intercepting an audio stream, the audio stream comprising an audio portion of the video and audio conference. The method also includes the communication application, executing on the CPU of the computing device, processing the audio stream of the video and audio conference while the processor within the single integrated device installed as the Ethernet adapter processes the video stream of the video and audio conference.

In one embodiment, the method includes receiving, by the processor, signaling protocol communications from the first device to establish the video and audio conference. In another embodiment, the method includes receiving, by the processor, a real time protocol (RTP) payload of a plurality of transport layer protocol packets, the RTP payload comprising portions of the video stream. In still another embodiment, the method includes mixing the video stream with a second video stream intercepted from a second device. In some embodiments, the single integrated device comprises an audio/video media processor or a video mixing chip.

In some embodiments, the method includes passing, by the processor, the audio stream up the network stack to the application layer. In other embodiments, the method includes receiving by the CPU of the computing device the audio stream concurrently with receipt of the video stream by the processor within the single integrated device. In still other embodiments, the method includes processing, by the communication application executing on the CPU of the computing device, at least a portion of the audio stream concurrently with the processing of at least a portion the video stream by the processor within the single integrated device installed as the Ethernet adapter. In yet still other embodiments, the method includes transmitting, by the communication application executing on the CPU of the computing device, via the single integrated device installed as the Ethernet adapter, the processed audio stream to a second device. In a further embodiment, the method includes transmitting, by the processor within the single integrated device installed as the Ethernet adapter, at least a portion of the processed video stream to the second device concurrently with transmission of at least a portion of the processed audio stream.

In another aspect, the present application is directed to a system for providing multi-processing of video and audio portions of a video and audio conference. The system includes a processor within a single integrated device installed as an Ethernet adapter on a computing device, the processor intercepting, at a network layer of a network stack of the computing device, a video stream communicated over a transport layer connection established between the computing device and a first device. The system also includes the processor within the single integrated device installed as the Ethernet adapter processing the video stream comprising a video portion of a video and audio conference. The system further includes a communication application executing on a central processing unit (CPU) of the computing device and operating at an application layer of the network stack, the communication application receiving an audio stream, the audio stream comprising an audio portion of the video and audio conference. The communication application executing on the CPU of the computing device processes the audio stream of the video and audio conference while the processor within the single integrated device installed as the Ethernet adapter processes the video stream of the video and audio conference.

In one embodiment, a video conferencing application of the device receives signaling protocol communications from the first device to establish the video and audio conference. In another embodiment, the processor receives a real time protocol (RTP) payload of a plurality of transport layer protocol packets, the RTP payload comprising portions of the video stream. In still another embodiment, the processor within the single integrated device mixes the video stream with a second video stream intercepted from a second device. In yet still another embodiment, the processor within the single integrated device comprises an audio/video media processor.

In some embodiments, the processor does not intercept the audio stream and the audio stream traverses up the network stack to the application layer. In other embodiments, the CPU of computing device receives the audio stream concurrently with the receiving of the video stream by the processor within the single integrated device. In still other embodiments, the communication application executing on the CPU of the computing device processes at least a portion of the audio stream concurrently with the processing of at least a portion the video stream by the processor within the single integrated device installed as the Ethernet adapter. In yet still other embodiments, the communication application, executing on the CPU of the computing device, transmits via the single integrated device installed as the Ethernet adapter, the processed audio stream to a second device. In a further embodiment, the processor within the single integrated device installed as the Ethernet adapter transmits at least a portion of the processed video stream to the second device concurrently with transmission of at least a portion of the processed audio stream.

In yet still another aspect, the present application is directed to a method for providing a mixed video conference between a video conference participant and an external video producing source. The method includes a media controller within a single integrated device installed as an Ethernet adapter on a computing device redirecting media to an audio/video media processor for mixing a first video stream communicated over a first transport layer connection established between the device and a first device of a first video conference participant and a second video stream communicated over a second transport layer connection established between the device and a second device of a second video conference participant. The method also includes the media controller transmitting the mixed video to each of the first device and the second device. The method further includes the media controller intercepting a video stream from an external video producing device. The method also includes the media controller transmitting portions of the video stream to each of the first device via the first transport layer connection and the second device via the second transport layer connection.

In one embodiment, the method includes the audio/video media processor mixing the first video stream and the second video stream. In another embodiment, the method includes transmitting, by the media controller, the mixed video comprising a single video stream of a first view of the first video conference participant and a second view of the second video conference participant. In still other embodiments, the method includes establishing, by a video conferencing application of the device or the computing device, a connection with the external video producing device. In a further embodiment, the method includes establishing the connection responsive to a request from one of the first video conference participant or the second video conference participant to connect to the external video producing device.

In some embodiments, the method includes intercepting, by the media controller, the video stream from the external video producing device comprising a closed caption television. In other embodiments, the method includes intercepting, by the media controller, the video stream from the external video producing device comprising a digital video recorder. In yet other embodiments, the method includes intercepting, by the media controller, the video stream from the external video producing device comprising one of a security camera, a television set, a cable set box or a projector.

In still yet other embodiments, the method includes receiving, by the video conferencing application, a request from one of the first video conference participant or the second video conference participant to call the external video producing device to receive the video stream from the external video producing device. In another embodiment, the method includes mixing, by the audio/video media processor, portions of the video stream from the external video producing device with the first video stream and the second video stream.

In another aspect, the present application is directed to a system for providing a mixed video conference between a video conference participant and an external video producing source. The system includes a single integrated device installed as an Ethernet adapter on a computing device. The single integrated device includes an audio/video media processor, configured for mixing a first video stream communicated over a first transport layer connection established between the computing device and a first device of a first video conference participant and a second video stream communicated over a second transport layer connection established between the computing device and a second device of a second video conference participant. The single integrated device also includes a media controller transmitting the mixed video to each of the first device and the second device. The media controller is further configured to intercept a video stream from an external video producing device; and transmit portions of the video stream to each of the first device via the first transport layer connection and the second device via the second transport layer connection.

In one embodiment, the audio/video media processor may comprise a hardware processor. In another embodiment, the mixed video comprises a single video stream of a first view of the first video conference participant and a second view of the second video conference participant. In still another embodiment, the media controller establishes a connection with the external video producing device. In a further embodiment, the media controller establishes the connection responsive to a request from one of the first video conference participant or the second video conference participant to call the external video producing device.

In some embodiments, the external video producing device comprises a closed caption television. In other embodiments, the external video producing device comprises a digital video recorder. In still other embodiments, the external video producing device comprises one of a security camera, a television set, a cable set box or a projector. In yet still other embodiments, the device receives a request from one of the first video conference participant or the second video conference participant to connect to the external video producing device to receive the video stream from the external video producing device. In still yet other embodiments, the audio/video media processor mixes portions of the video stream with the first video stream and the second video stream.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1B:
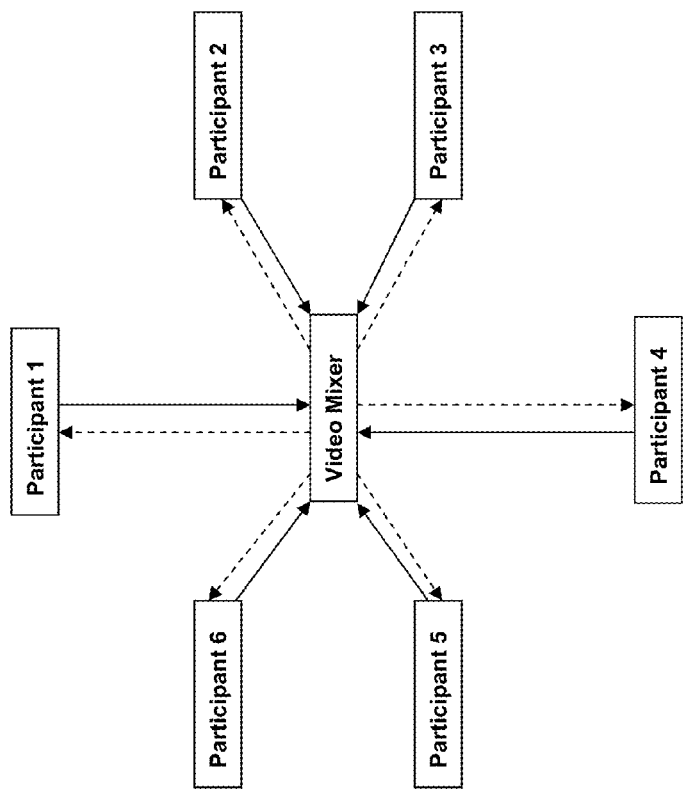
FIG. 1B is a block diagram of an embodiment of a multi-participant video conference with centralized mixing.
Figure 1A:
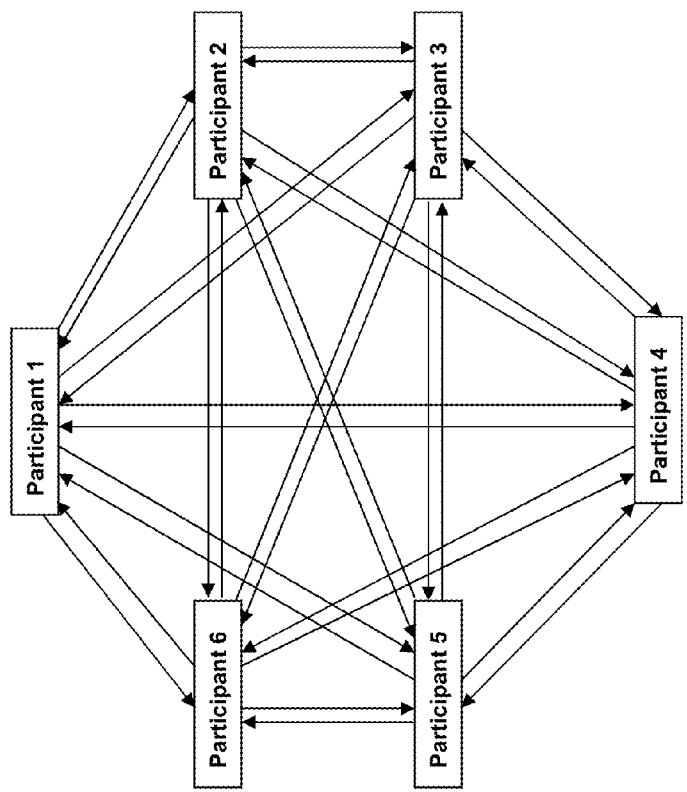
FIG. 1A is a block diagram of an embodiment of a multi-participant video conference without centralized mixing.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following enumeration of the sections of the specification and their respective contents may be helpful:

- Section A describes a network and computing environment which may be useful for practicing embodiments described herein;
- Section B describes embodiments of systems and methods for providing a mixed video conference of a plurality of video conference participants;
- Section C describes embodiments of systems and methods for enabling session initiation protocol for a private branch exchange system without a session initiation protocol stack;
- Section D describes embodiments of systems and methods for providing security for session initiation protocol (SIP) services;
- Section E describes embodiments of systems and methods for mapping a uniform resource identifier (URI) to a video conferencing endpoint for a session initiation protocol (SIP) communication;
- Section F describes embodiments of systems and methods for providing communications between different protocol-using endpoints by a computing device establishing a video conference bridge;
- Section G describes embodiments of systems and methods for parallel processing of video and audio portions of video and audio conference streams; and
- Section H describes embodiments of systems and methods for integrating video from external video producing devices into video conferences.

A. Network and Computing Environment

Figure 1C:
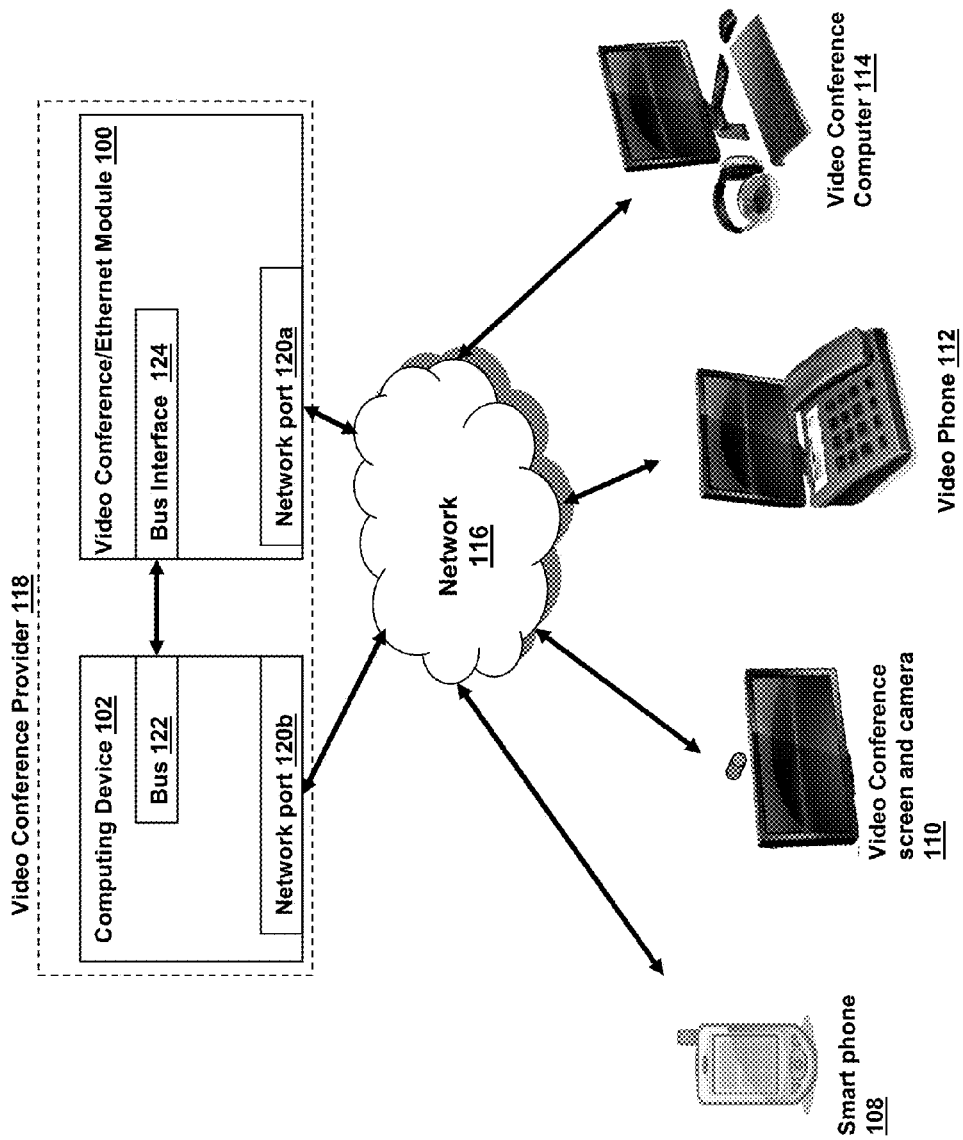
FIG. 1C is a block diagram of an embodiment of a video conferencing environment.

Prior to discussing the specifics of embodiments of the systems and methods of the present solution, it may be helpful to discuss the network and computing environments in which such embodiments may be deployed. Shown in FIG. 1C is a block diagram of an embodiment of a video conferencing environment. In brief overview, a video conference provider 118 comprising a computing device 102 and a Video Conference/Ethernet module 100 interfaces with a network 116 via one or more network ports 120a-120b. The video conference provider 118 provides video conferencing services to smart phones 108, video conferencing equipment such as television screens and cameras 110, video phones or video-capable voice over Internet Protocol (VoIP) phones 112, video-capable computers 114 or other devices. Although illustrated as an endpoint, in many embodiments, video conference provider 118 may comprise an intermediary between two video conference participants.

Still referring to FIG. 1C and in more detail, in some embodiments, a computing device 102 may comprise a client, a workstation, a server, a blade server, an appliance, or any other computing device that comprises a bus 122 capable of interacting with a bus interface 124 of a Video Conference/Ethernet module 100. In many embodiments, a computing device 102 may supply power to a Video Conference/Ethernet module 100 via bus 122 and bus interface 124. For example, in one embodiment in which bus 122 is a PCI bus and bus interface 124 is a PCI interface, a computing device 102 may supply power to Video Conference/Ethernet module 100 from a power supply unit of computing device 102 via the bus. In some embodiments, bus 122 and bus interface 124 may comprise an VESA VL bus, an ISA bus, an EISA bus, a MicroChannel Architecture (MCA) bus, a PCI bus, a PCI-X bus, a PCI-Express bus, a NuBus, or any similar bus capable of carrying power to PBX/Ethernet module 100. In many embodiments, bus 122 and bus interface 124 may allow communication between computing device 102 and Video Conference/Ethernet module 100, as described in more detail below in connection with FIG. 1D. Network ports 120a and 120b may comprise Ethernet or Firewire ports or other hardware interfaces, or wireless transmitters and receivers capable of interfacing with a wireless network. As shown, in some embodiments, either or both network ports 120a and 120b may connect to the network. In some embodiments, discussed in more detail below, the computing device 102 may communicate with a network via bus 122, bus 124, and network port 120a of module 100. In other embodiments, computing device 102 may communicate with a network via its own network port 120b or a network port of another Ethernet module, wireless module, or other communication interface. In still other embodiments, module 100 may communicate with a network via bus 124, bus 122, and network port 120b of computing device 102. Accordingly, in some embodiments, either computing device 102 or module 100 may act as a bridge for the other device, or neither may act as a bridge.

In some embodiments, a video conference provider 118 may provide video conference and/or VoIP services to one or more components of the system. In some embodiments, the components may include one or more smart phones 108, such as an iPhone, manufactured by Apple Inc., or any of the varieties of smart phones manufactured by HTC Corporation of Taiwan; Nokia Corporation of Espoo, Finland; Motorola Inc. of Schaumburg, Ill.; Samsung Group of Seoul, South Korea; or others. In other embodiments, the components may include video conferencing equipment 110 such as televisions or monitors, video cameras, and multipoint control units, such as the Lumina Telepresence system by BrightCom, Inc. of Huntington Beach, Calif.; the Cisco TelePresence system by Cisco Systems of San Jose, Calif.; any of the varieties of telepresence or video conferencing solutions by Polycom, Inc. of Pleasanton, Calif.; or any others. In still other embodiments, the components may include video phones 112, such as the LifeSize Passport by LifeSize Communications of Austin, Tex., or video-capable computers 114, including laptops or desktops with integrated or attached cameras. In many embodiments, video conference provider 118 interfaces with these components via a network 116, which may be a wide area network, including the Internet, a metropolitan area network, a public network, a private network, a virtual private network, or any other type and form of network. In some embodiments, video conference provider 118 may also provide voice and/or video routing, incoming call signaling, outgoing call dialing, encryption, conference calling, voice mail, and other VoIP features to system components 108-114.

Figure 1D:
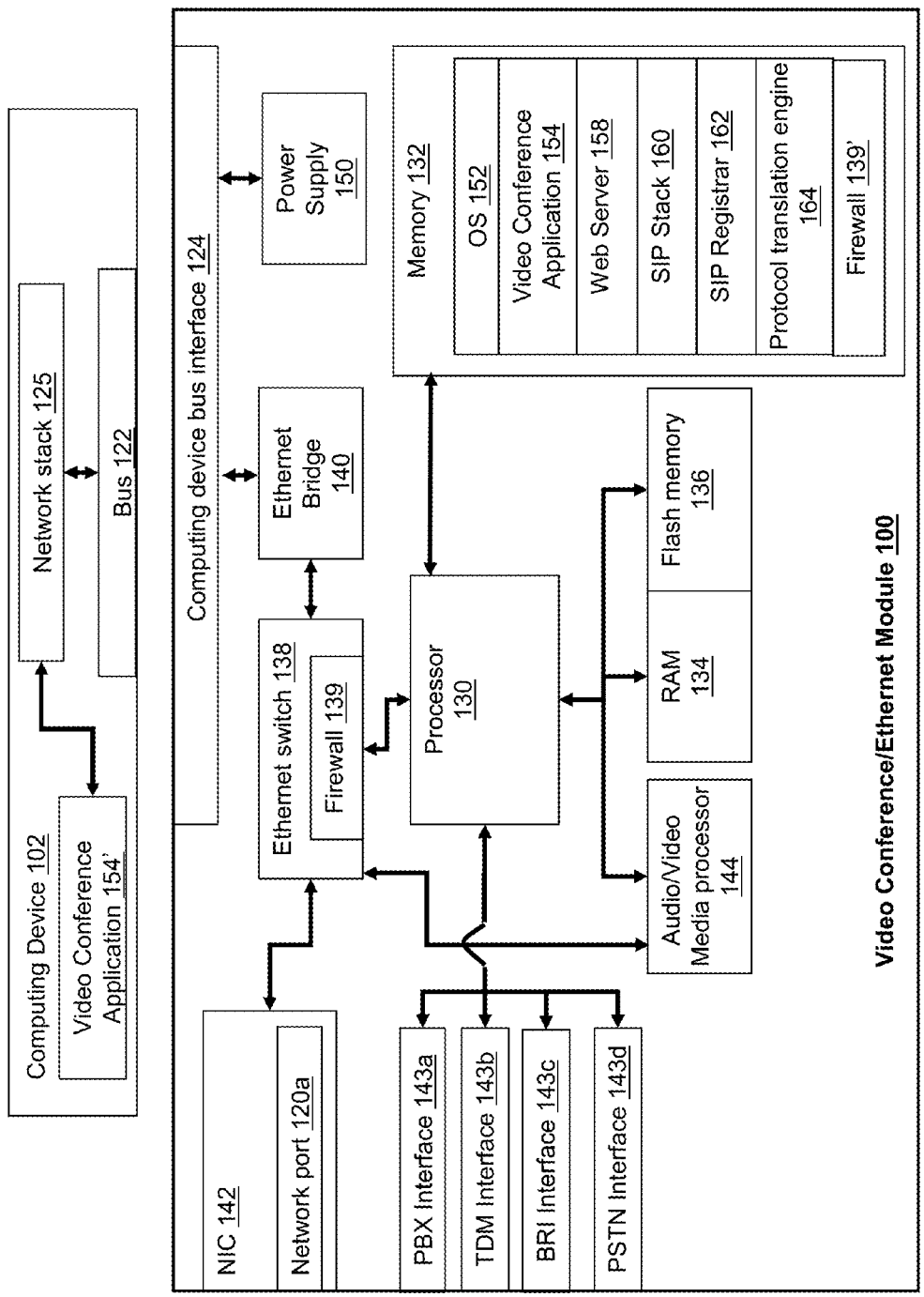
FIG. 1D is a block diagram of an embodiment of an interface module for a video conferencing environment.

Referring now to FIG. 1D, illustrated is a block diagram of an embodiment of a Video conference/Ethernet device, also referred to as module 100. In brief overview, in some embodiments, a Video conference/Ethernet module 100 may comprise a processor 130, a memory element 132, a random access memory element 134, a flash memory interface or element 136, an Ethernet switch 138, an Ethernet bridge 140, and a network interface card 142. In some embodiments, Video conference/Ethernet module 100 may also comprise a digital signal processor or audio/video media processor 144, sometimes referred to as a video mixer. In some embodiments, Video conference/Ethernet module 100 may comprise a power supply 150, connected to a bus interface 124.

As shown, a Video conference/Ethernet module 100 may comprise interfaces for a packet-based network, such as Ethernet switch 138, Ethernet bridge 140, and NIC 142. In some embodiments, a Video conference/Ethernet module 100 provides network connectivity for a host computing device via the computing device bus interface 124. In many embodiments, Video conference/Ethernet module 100 operates in a stand-alone fashion, executing an operating system 152 and applications 154-160 on processor 130, using power supplied via the bus interface 124 from a computing device 102, and distributed via an on-board power supply 150. By including a processor, memory, and operating system independent of those of computing device 102, Video conference/Ethernet module 100 has enhanced reliability and stability, requiring, in some embodiments, only power from computing device 102. In other embodiments, an external power supply may be connected to Video conference/Ethernet module 100, such that computing device 102 is not necessary for operation.

Still referring to FIG. 1D and in more detail, in some embodiments, a Video conference/Ethernet module 100 may comprise a processor 130, which may be referred to as a central processing unit or CPU, a processor, a microprocessor, a microcontroller, or any similar notation. Processor 130 may comprise any type and form of processing unit, including: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; those manufactured by Texas Instruments, Inc. of Dallas, Tex.; those manufactured by Analog Devices, Inc. of Norwood, Mass.; or those manufactured by Advanced Micro Devices of Sunnyvale, Calif.; or any other processor capable of executing the functions described herein.

In some embodiments, processor 130 may be connected via one or more internal busses to a memory element 132 and random access memory 134. Memory element 132 may comprise flash memory, a hard drive, or any other data storage element capable of storing data in a manner accessible and editable by processor 130. Memory 132 may comprise one or more of an operating system 152, a video conference application 154, a web server 158, and a session initiation protocol (SIP) proxy 160. RAM 134 may comprise one or more memory chips capable of storing data and allowing any storage location to be directly accessed by processor 130, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). In some embodiments, RAM 134 may comprise a cache memory.

In some embodiments, a Video conference/Ethernet module 100 may include a flash memory interface 136. The flash memory interface 136 may comprise and type and form of interface constructed and designed for receiving, accessing or reading flash memory media or devices, such as a the common flash memory interface (CFI). In many embodiments, flash memory interface 136 may be used for storing or recording data, such as media data of a call, and/or saving data.

A network interface card or NIC 142 may comprise one or more network ports 120a, as discussed above in connection with FIG. 1C. In many embodiments, a NIC 142 serves as an Ethernet network interface for PBX/Ethernet module 100 via computing device bus interface 124. The NIC 142 can, in some embodiments, be any of the network interface cards or mechanisms described herein. The NIC 552 may have any number of ports. The NIC may be designed and constructed to connect to any type and form of network or router 104. While a single NIC 142 is illustrated, the Video conference/Ethernet module 100 may comprise any number of NICs 142.

The NIC 142 may, in some embodiments, interact with an Ethernet switch 138. Ethernet switch 138 may comprise any combination of hardware and software elements for routing communications between a NIC 142, a processor 130, and an Ethernet bridge 140. For example, a Video conference/Ethernet module 100 may receive communications from a computing device 102 via a bus interface 124, as discussed above. In some instances, these communications may be directed to processor 130, such as control or configuration commands for any of applications 154-160. In other instances, these communications may be directed outward to a network, via NIC 142. Similarly, incoming communications from a network via NIC 142 may be directed to processor 130, or to a computing device 102 via the bus interface 124. Thus, the functions of Ethernet switch 138 allows the PBX/Ethernet module 100 to serve as a NIC for both applications of Video conference/Ethernet module 100 and for computing device 102.

In some embodiments, Ethernet switch 138 may comprise a firewall 139. Although shown as part of switch 138, in many embodiments, firewall 139 may be logically or physically separate. Firewall 139 may comprise an application, service, server, daemon, routine, module, or other executable logic for providing network security to processor 130, Ethernet bridge 140, and/or services of video conference/Ethernet module 100. Firewall 139 may comprise one or more rules or policy engines for applying one or more rules to intercepted or received network packets. In some embodiments, firewall 139 may operate at one or more layers of a network stack, such as a network layer, transport layer, session layer, presentation layer, or application layer. For example, in one embodiment, firewall 139 may operate at a network layer and parse headers of incoming packets for information, such as a source IP address. Filters may be applied, for example, white listing (allowing) or black listing (denying or blocking) communications from specified source IP addresses. In other embodiments, firewall 139 may apply policies to allow or block communications based on contents of any header, including network layer headers, transport layer headers, session layer headers, presentation layer headers, application layer headers, compression headers, file headers, or any other data. In still other embodiments, firewall 139 may apply policies to allow or block communications based on payload contents. For example, firewall 139 may be configured to scan application-layer payloads of packets and block executable or compressed files, while allowing HTTP requests. In other embodiments, firewall 139 may be configured to allow or block communications based on application of one or more policies to "meta"-information about a packet flow or communication session, rather than data carried by the flow. For example, in one such embodiment, firewall 139 may be configured to block packets of less than a predetermined size or greater than a predetermined size. In another such embodiment, firewall 139 may be configured to block communications from a source IP address if a large number of requests, or a number of requests exceeding a threshold, have arrived within a predetermined period of time. Advantageously, in such embodiments, firewall 139 need not identify or process incoming packets beyond the application of the policy to any necessary information. In some embodiments, to block distributed denial of service attacks, for example, firewall 139 may apply policies to block communications from one or more source addresses. In one such embodiment, incoming packets may be blocked or rejected for a period of time, regardless of source, or regardless of source except for sources on a white list or explicit-allow list. In a further embodiment, firewall 139 may add any current communications that video conference/Ethernet module 100 is forwarding to a white list and block other requests, regardless of or agnostic to the data in such requests. In some embodiments, firewall 139 may provide IP Security (IPSec) features, stealth features such as port-knocking or network address translation, or other features. As shown, in some embodiments, firewall 139 may comprise a software firewall 139' stored in memory and executed by processor 130 to process incoming packets at one or more layers of a network stack.

In some embodiments, an Ethernet bridge 140 serves to bridge a layer 2 network from Ethernet switch 138 to a computing device 102 via bus interface 124. An Ethernet bridge 140 may comprise any combination of hardware and software elements for connecting and managing network segments at the data link layer. In many embodiments, Ethernet bridge 140 further includes functionality to appear as a NIC or virtual NIC to computing device 102. For example, in some embodiments, upon installation of a Video conference/Ethernet module 100 into a computing device 102, Ethernet bridge 140 may appear as an installed NIC or Ethernet adapter to computing device 102, such that applications and protocols above the link layer may communicate via the Video conference/Ethernet module 100. In some embodiments, no additional software drivers need be installed on computing device 102 to allow for Ethernet communications via Video conference/Ethernet module 100. In a further embodiment, Ethernet switch 138 and/or Ethernet bridge 140 provide a distinct network address to a host computing device 102 via a bus interface 124. In one such embodiment, Video conference/Ethernet module 100 may be installed as an Ethernet adapter on computing device 102 and direct communications to a first IP and port to computing device 102, and communications to a second IP and port to components of Video conference/Ethernet module 100. For example, PBX/Ethernet module 100 may direct communications to IP 1.2.3.4 to a host computing device 102 via the bus interface 124, and direct communications to IP 1.2.3.5 to web server 158 executing on processor 130.

Processor 130 may also, in some embodiments, operatively connect to a digital signal processor or media processor 144. Media processor 144 may comprise hardware, software, or any combination of hardware and software for processing audio and/or video signals communicated over a switched telephone network. In some embodiments, media processor 144 may comprise a digital signal processor (DSP), graphics processing unit (GPU), co-processor, or any other type and form of processor. Media processor 144 may comprise functionality for analog/digital signal conversion, arithmetic processing, hardware pipelining, or any other functionality useful in audio or video processing. In some embodiments, media processor 144 may act as an echo canceller or hybrid echo suppressor. In many embodiments, media processor 144 provides voice transcoding, voice enhancement, noise reduction, noise shaping, packet loss concealment, audio compression, expansion, and gating, equalization, audio mixing, conferencing, and other features.

In many embodiments, media processor 144 may comprise any combination of hardware and software for mixing a plurality of video streams, including dynamic video content and static images, into a single video stream. For example, in one embodiment, media processor 144 mixes a plurality of video streams from video conference participants into a single video stream for transmission and display for the video conference participants. Similarly, in another embodiment, media processor 144 may mix a plurality of audio streams for an audio conference call. In some embodiments, audio/video media processor may be referred to as a media processor, and may process audio, video, or static images.

Video conference/Ethernet module 100 may comprise a power supply 150. In many embodiments, power supply 150 receives power from a host computing device 102 via a bus interface 124. In some embodiments, power supply 150 may convert these voltages to desired voltages for processor 130 or other components. For example, a Video conference/Ethernet module 100 using a PCI interface may receive voltages provided by a power supply unit of computing device 102 via a backplane, including +3.3V or +5V, and power supply 150 may convert these voltages as desired, such as to +1.8V for low power flash RAM cards. Power supply 150 may further comprise functionality for dynamic voltage scaling for power management. In some embodiments, power supply 150 may include additional components to allow conversion of AC voltages to desired DC levels. In such embodiments, a Video conference/Ethernet module 100 may not require a host computing device 102 for operation.

Video conference/Ethernet module 100 may execute an operating system 152. In some embodiments, operating system 152 may be a desktop or server operating system, including any of the Windows variants manufactured by Microsoft Corp. of Redmond, Wash.; Unix, or a Unix-like operating system, including Gnu, Linux, or BSD; or a proprietary system, such as HP-UX, manufactured by Hewlett-Packard of Palo Alto, Calif., or AIX, manufactured by IBM of Armonk, N.Y. In some embodiments, the operating system 153 may be a firmware based or embedded operating system. In other embodiments, the Video conference/Ethernet module may include any elements or combination of element of a computing device described below.

In some embodiments, Video conference/Ethernet module 100 may execute any type and form of application, such as any one of several applications, including a video conference application 154, a web server 158, and a SIP proxy 160. Video conference application 154 may provide functionality for hosting, joining, and participating in multi-user video conferences. In some embodiments, a video conference application 154 may provide configuration and functionality for the various functions of media processor 144 discussed above.

In many embodiments, processor 130 may execute a web server 158. The web server 158 may serve web pages to a user of computing device 102 or another computer that can access Video conference/Ethernet module 100 through a network, for the purpose of configuration, diagnostics, monitoring, and maintenance of various functions of Video conference/Ethernet module 100.

In some embodiments, processor 130 may execute a session initiation protocol (SIP) stack 160. SIP stack 160 may comprise a SIP proxy server for performing the functionality of routing SIP requests between a plurality of clients. In many embodiments, SIP stack 160 may comprise a SIP registrar 162, discussed in more detail below, and/or a redirect server for directing SIP session invitations to external domains. In some embodiments, SIP stack 160 may be executed by a second processor 130 or a co-processor, not illustrated. SIP stack 160 may, in some embodiments, be referred to as a SIP proxy, SIP gateway, SIP registrar, or other SIP module.

As shown, in some embodiments, SIP stack 160 may comprise a SIP registrar 162, or processor 130 may execute a SIP registrar 162. SIP registrar may comprise a service, server, daemon, routine, or other executable logic for maintaining a directory or registry of client addresses and uniform resource identifier (URI) names. In some embodiments, SIP registrar 162 may comprise a location server or connect to a location server or database. SIP registrar 162 may receive registration requests from one or more clients, each request identifying a client URI and a corresponding address, such as an IP address. SIP registrar may then associate the URI with the address, allowing SIP stack 160 to direct requests properly. Furthermore, while in a video conferencing session, requests directed to the client URI may be redirected to the video conference application 154, without the requestor being aware that it is interacting with the video conference bridge rather than the client. Thus, SIP registrar 162 may provide for seamless switching between one-to-many conferencing and one-to-one real-time communications.

In some embodiments, processor 130 may execute a protocol translation engine 164. Protocol translation engine 164 may comprise an application, service, daemon, library, routine, or other executable code for translating between different communication protocols. For example, a Windows Mobile-based smart phone may be able to perform video chat using a Windows Media Video stream or container-based communication, while an Apple iOS-based smart phone such as the iPhone may be able to perform video chat using an H.264 or MPEG stream or container-based communication. However, the devices may not be able to communicate directly with each other. Accordingly, in some embodiments, video conference/Ethernet module 100 may provide a video conference bridge and may use protocol translation engine 164 to translate real-time protocol communications for one or both participants. For example, rather than connecting from the first device to the second device directly, the first device and second device may each connect to the video conference bridge, which may then provide mixed or separate video streams to each participant. The streams may be translated and packaged as necessary by protocol translation engine 164, such that each client device may display the stream properly. In some embodiments, protocol translation engine 164 may provide real-time protocol translation of audio and/or video. In other embodiments, protocol translation engine 164 may provide signaling protocol translation. This may allow a device that uses Session Initiation Protocol (SIP) to communicate with a device that uses Skinny Call Control Protocol (SCCP) provided by Cisco Systems, Inc., Inter-Asterisk Exchange (IAX) protocol, Extensible Messaging and Presence Protocol (XMPP), or any other type of signaling protocol.

In some embodiments, video conference/Ethernet module 100 may comprise one or more additional interfaces. For example, in one embodiment, module 100 may include a PBX interface 143a for interfacing with a PBX system. In some embodiments, the interface may comprise a proprietary inter-PBX interface, a foreign exchange office or foreign exchange station interface, or any other similar interface. In another embodiment, module 100 may comprise a TDM interface 143b, such as an interface to a T1 or T3 line or similar interfaces. In still another embodiment, module 100 may comprise a basic rate interface (BRI) 143c, for connection to an ISDN line. In yet still another embodiment, module 100 may comprise an interface for POTS or PSTN extensions, or an interface to a PSTN network 143d. In many embodiments, a subset of these interfaces, a plurality of one type of interface, or a combination of any number and type of interfaces may be included with module 100, depending on customer requirements.

Figure 1E:
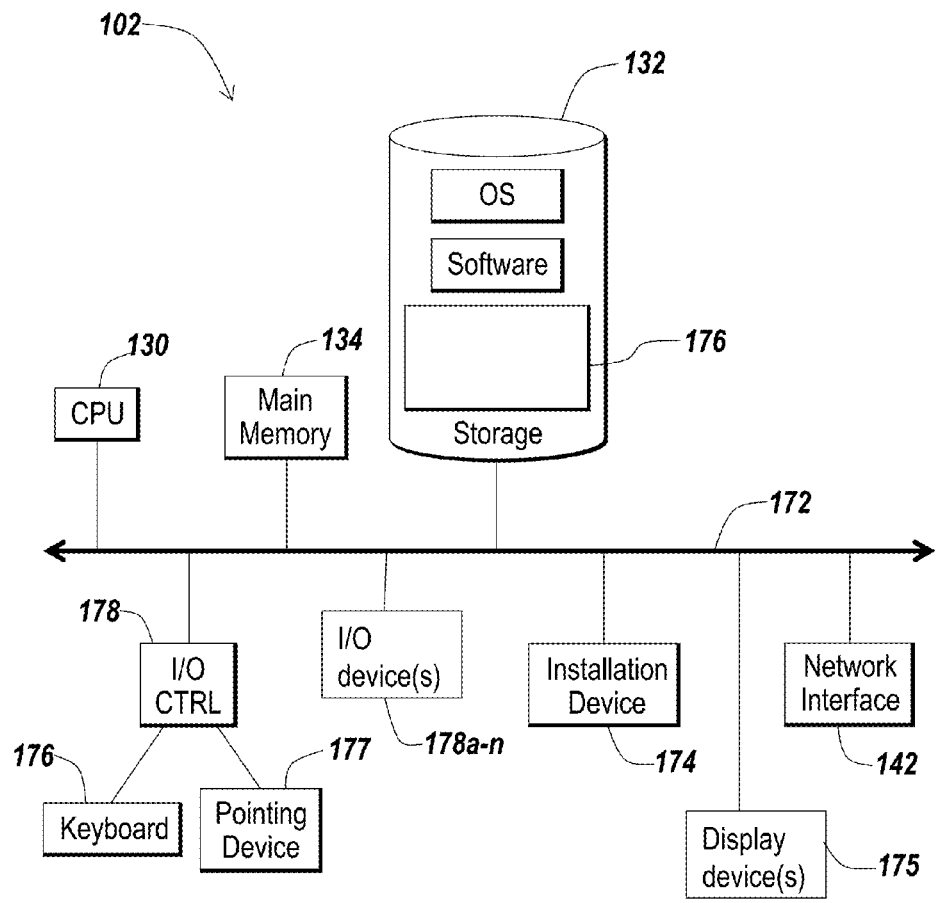
FIGS. 1E-1F are block diagrams of embodiments of a computing device.
Figure 1F:
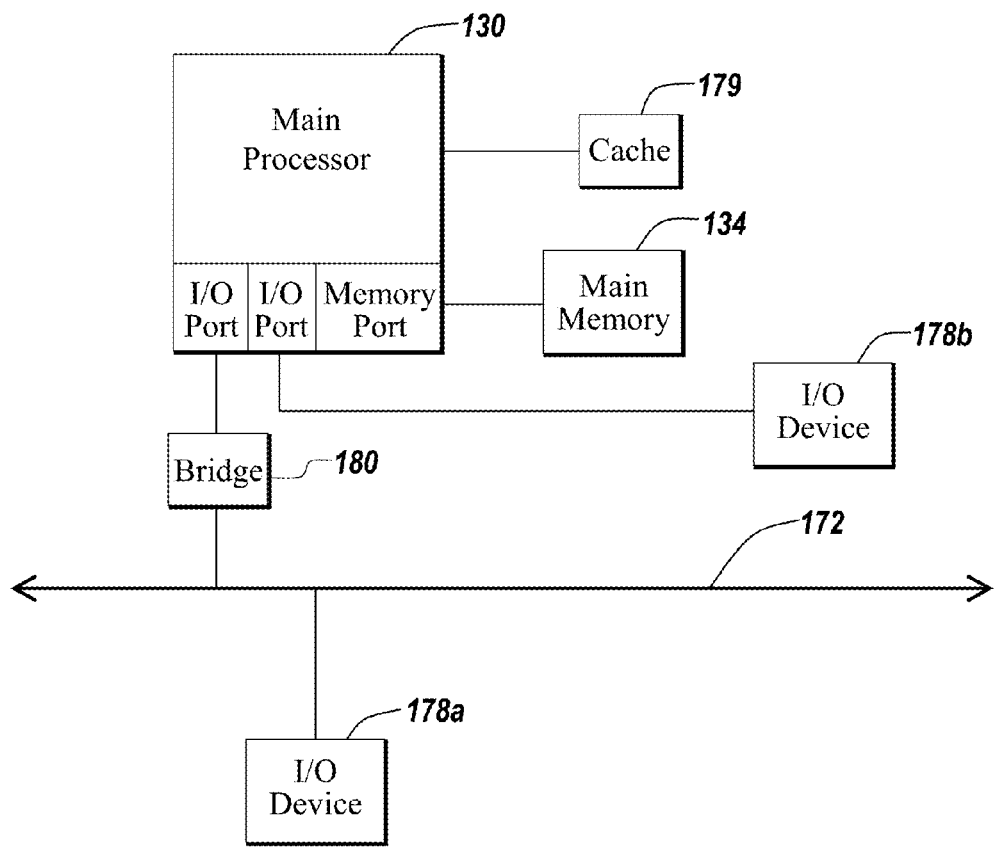
Figure 1G:
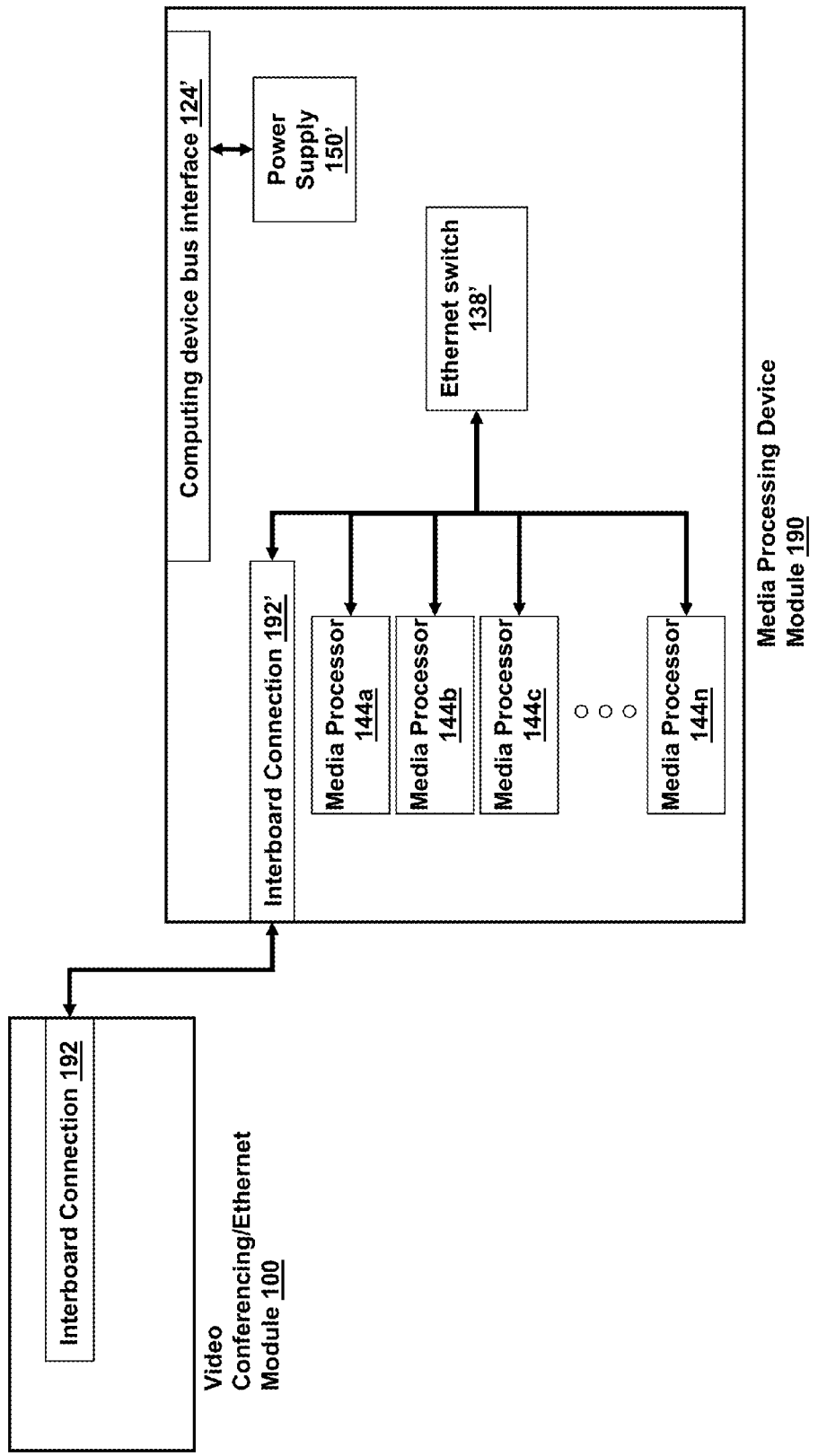
FIG. 1G is a block diagram of an embodiment of a media processing device module.

Referring briefly ahead to FIG. 1G, in a further embodiment, a Video conference/Ethernet module 100 may include an interconnection 192 to a media processing device module 190, sometimes referred to as a secondary processing module, a DSP resource module, a slave processing module, or similar terms. Media processing device module 190 may be similar to a Video conference/Ethernet module 100, and may include a bus interface 124' and a power supply 150'. In some embodiments a media processing device module 190 may include a processor 130', memory 132', RAM 134', a flash memory interface 136', or other features. A media processing device module 190 may further comprise one or more media processors 144a-144n and a connection 192' to Video conference/Ethernet module 100. Media processors 140a-140n may comprise digital signal processors, computing device processors, graphics processors, video or audio encoders, or any other processors. For example, a Video conference/Ethernet module 100 may include a connector 192 for an application or engine such as audio/video media processor 144 or video conference application 154 to connect to one or more media processors 144a-144n on a media processing device module 190 for additional processing capability. Thus, a media processing device module 190 may provide expandability of a Video conference/Ethernet system for reduced cost.

In some embodiments, connections between interboard connections 192 and 192' may be via a parallel or serial connector, such as a multi-wire planar cable, a flexible flat cable, an ISA, PCI, PCI-X or other type of bus, or any other interface for communication between two modules of a system.

FIGS. 1E and 1F depict block diagrams of a computing device 102 useful for practicing an embodiment of the computing device 102 of FIG. 1E, video conference computers 114, or any of the other computing devices shown in FIG. 1E. As shown in FIGS. 1E and 1F, each computing device 102 includes a central processing unit 130, and a main memory unit 134. As shown in FIG. 1E, a computing device 102 may include a visual display device 175, a keyboard 176 and/or a pointing device 177, such as a mouse. Each computing device 102 may also include additional optional elements, such as one or more input/output devices 178a-n (generally referred to using reference numeral 178), and a cache memory 179 in communication with the central processing unit 130.

The central processing unit 130 is any logic circuitry that responds to and processes instructions fetched from the main memory unit 134. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 102 may be based on any of these processors, or any other processor capable of operating as described herein.

Main memory unit 134 may be one or more memory chips capable of storing data and allowing any storage location to be directly accessed by the microprocessor 130, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 134 may be based on any of the above described memory chips, or any other available memory chips capable of operating as described herein. In the embodiment shown in FIG. 1E, the processor 130 communicates with main memory 134 via a system bus 172 (described in more detail below). FIG. 1F depicts an embodiment of a computing device 102 in which the processor communicates directly with main memory 134 via a memory port 174. For example, in FIG. 1F the main memory 134 may be DRDRAM.

FIG. 1F depicts an embodiment in which the main processor 130 communicates directly with cache memory 170 via a secondary bus, sometimes referred to as a backside bus. In other embodiments, the main processor 130 communicates with cache memory 170 using the system bus 172. Cache memory 179 typically has a faster response time than main memory 134 and is typically provided by SRAM, BSRAM, or EDRAM. In the embodiment shown in FIG. 1F, the processor 130 communicates with various I/O devices 178 via a local system bus 172. Various busses may be used to connect the central processing unit 130 to any of the I/O devices 178, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 175, the processor 130 may use an Advanced Graphics Port (AGP) to communicate with the display 175. FIG. 1F depicts an embodiment of a computer 102 in which the main processor 130 communicates directly with I/O device 178b via HyperTransport, Rapid I/O, or InfiniBand. FIG. 1F also depicts an embodiment in which local busses and direct communication are mixed: the processor 130 communicates with I/O device 178b using a local interconnect bus while communicating with I/O device 178a directly.

The computing device 102 may support any suitable installation device 174, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 176, or portion thereof. The computing device 102 may further comprise a storage device 132, such as one or more hard disk drives or redundant arrays of independent disks, for storing an operating system and other related software, and for storing application software programs such as any program related to the client agent 176. Optionally, any of the installation devices 174 could also be used as the storage device 132. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 102 may include a network interface or NIC 142 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 142 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. A wide variety of I/O devices 178a-178n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 178 may be controlled by an I/O controller 178 as shown in FIG. 1E. The I/O controller may control one or more I/O devices such as a keyboard 176 and a pointing device 177, e.g., a mouse or optical pen. Furthermore, an I/O device may also provide storage 132 and/or an installation medium 174 for the computing device 102. In still other embodiments, the computing device 102 may provide USB connections to receive handheld USB storage devices such as the USB Flash Drive line of devices manufactured by Twintech Industry, Inc. of Los Alamitos, Calif.

In some embodiments, the computing device 102 may comprise or be connected to multiple I/O devices 178a-178n or one or more display devices 175, which each may be of the same or different type and/or form. As such, any of the I/O devices 178a-178n and/or the display devices 175 or I/O controller 178 may comprise any type and/or form of suitable hardware, software, or combination of hardware and software to support, enable or provide for the connection and use of multiple I/O devices 178a-178n or display devices 175 by the computing device 102. For example, the computing device 102 may include any type and/or form of video adapter, video card, driver, and/or library to interface, communicate, connect or otherwise use the display devices 175. In one embodiment, a video adapter may comprise multiple connectors to interface to multiple display devices 175. In other embodiments, the computing device 102 may include multiple video adapters, with each video adapter connected to one or more of the display devices 175. In some embodiments, any portion of the operating system of the computing device 102 may be configured for using multiple display devices 175. In other embodiments, one or more of the display devices 175 may be provided by one or more other computing devices via a network.

In further embodiments, an I/O device 178 may be a bridge 180 between the system bus 172 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 102 of the sort depicted in FIGS. 1E and 1F typically operate under the control of operating systems, which control scheduling of tasks and access to system resources. The computing device 102 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS VISTA, and WINDOWS 7 all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 102 may have different processors, operating systems, and input devices consistent with the device. For example, in one embodiment the computer 102 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 102 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Systems and Methods for Providing a Mixed Video Conference of a Plurality of Video Conference Participants Typical voice-over-internet protocol (VoIP) systems may have issues with security due to the split nature of communications, with media data (audio and/or video) traversing a different path, and sometimes different proxies, gateways, firewalls, and/or devices than signaling data. Likewise, typical PBX systems may lack advanced features, such as extension mobility, multi-party conferencing, or other capabilities. Furthermore, systems attempting to bridge a PBX and VoIP system typically end up with basic communications only, unable to provide enhanced security and other features. Worse, such systems are frequently expensive and difficult to configure, requiring complicated installation and integration.

The present application discusses embodiments of systems and methods for providing enhanced services, bridging, and providing advanced security for VoIP and PBX systems, including legacy systems. The systems and methods discussed herein include a single integrated device that may be installed in a computing device, such as in a PCI or PCIe slot. In many embodiments, the device may appear to the host computing device as an Ethernet adapter, thus not requiring driver installations or complicated configuration of the host computing device's operating system. The device may be easily and quickly integrated into existing systems, using native communications protocols and formats, allowing service providers or customers to efficiently upgrade legacy systems.

Figure 2:
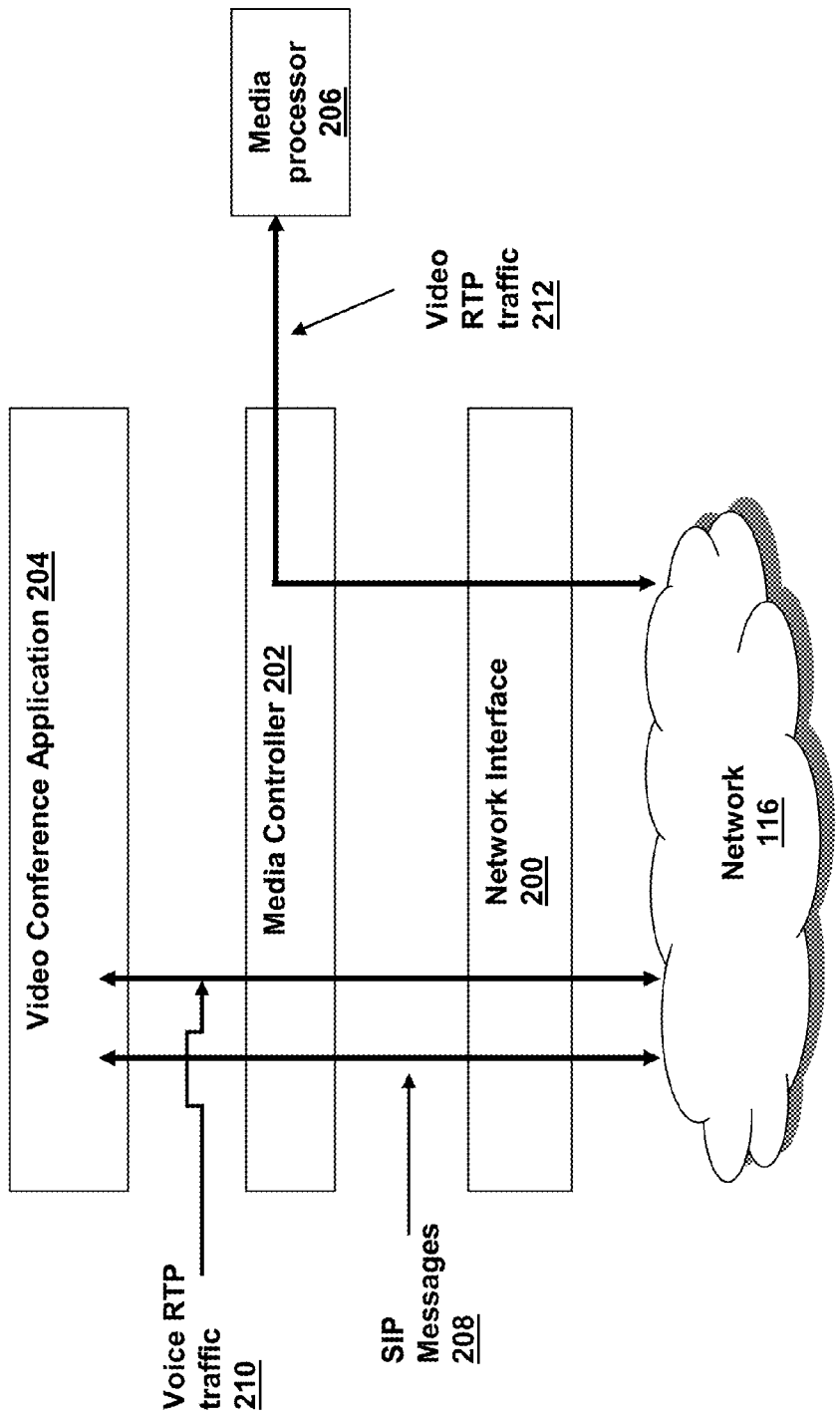
FIG. 2 is a block diagram of an embodiment of a system for intercepting and redirecting video real-time protocol (RTP) traffic.

Referring now to FIG. 2, illustrated is a block diagram of an embodiment of a system for intercepting and redirecting video real-time protocol (RTP) traffic. A network interface 200, such as NIC 142 of Video Conference/Ethernet Module 100 of FIG. 1D may receive real time protocol traffic including voice RTP traffic 210 and video RTP traffic 212, and session initiation protocol (SIP) messages 208 or similar protocol messages. For example, although shown as SIP messages 208, in some embodiments, other application layer VoIP signaling protocols may be used, such as H.323. In some embodiments, voice RTP traffic 210 may comprise G.711, G.729, MP3, GSM, DTMF, or any other type and form of RTP audio payloads. In some embodiments, video RTP traffic 212 may comprise MPEG-4, H.263, H.263-1998, H.264, or any other type and form of RTP video payloads. Network interface 200 may, in some embodiments, comprise a network stack. Accordingly, network interface 200 may be considered both the hardware components, such as a NIC and data port, and software components, such as a network stack and buffers, of a network interface.

Media controller 202, sometimes referred to as a media control layer, may comprise an application, driver, shim, service, server, library, daemon, or other executable logic for intercepting RTP video traffic 212 communicated over transport layer connections between network interface 200 and computing devices of one or more video conference participants. Intercepted RTP video traffic 212 may be redirected to an audio/video media processor 206, which may comprise an application, service, server, library, daemon, or other executable logic for mixing a plurality of intercepted video streams to create one or more mixed video streams.

In some embodiments, audio/video media processor 206 may return one or more mixed video streams or video payloads of RTP traffic to media controller 202, for transmission to one or more video conference participants. To provide these mixed video streams to participants seamlessly and transparently, in some embodiments, media controller 202 may retrieve information from intercepted RTP video traffic 212, such as RTP packet header information including sequence numbers, timestamps, or synchronization source identifiers (SSRC); transport layer information including transport control protocol source and destination ports, sequence numbers, acknowledgement numbers, window sizes, or options flags; and/or network layer information, including source and destination IP addresses, TTL values, or options headers; or any other type and form of information. This information may be used by media controller 202 to generate an RTP payload comprising the mixed video stream from audio/video media processor 206 for transmission to one or more video conference participants.

Thus, for example, in one embodiment, media controller 202 may intercept a packet from IP address and port 1.2.3.4/500 to IP address and port 5.6.7.8/501 comprising an RTP video payload. Media controller 202 may pass the RTP video payload to video mixer 206, which may mix the video with one or more other video payloads from other conference participants, and return a payload comprising a mix of the plurality of video payloads. Media controller 202 may generate a new RTP packet comprising the mixed video payload, with the same IP source address and port and destination address and port, and same sequence numbers as the intercepted packet. When received by the destination, the packet may be treated as if it was never intercepted and modified.

As shown, in some embodiments, voice RTP traffic 210 may not be intercepted by media controller 202, but instead passed to a video conference application 204. Video conference application 204 may comprise an application, service, server, library, daemon, or other executable logic for providing VoIP services and video conferencing to one or more devices. In one embodiment, video conference application 204 may comprise the Asterisk software suite manufactured by Digium, Inc. of Huntsville, Ala. Voice RTP traffic 210 may be processed, mixed, or otherwise modified by video conference application 204, and may, in some embodiments, be transmitted to conference participants along with generated RTP video packets comprising mixed video payloads. Video conference application 204 may, in some embodiments, comprise functionality for identifying one or more participants of a video conference and one or more respective roles of participants. For example, in some embodiments, Video conference application 204 may identify a video conference participant as a leader, presenter, lecturer, teacher, non-presenter participant, non-presenter lecturer, or any other roles. In a further embodiment, Video conference application 204 may identify a video stream as corresponding to an identified role of a participant, and may generate a request for audio/video media processor 206 to mix the video stream in accordance with a predetermined arrangement or format, discussed in more detail below. In a further embodiment, processing and layering of streams may be performed by the audio/video media processor 206, responsive to instructions from the conferencing application.

In many embodiments, network interface 200, media controller 202, audio/video media processor 206, and video conference application 204 may be provided as components or modules of a Video Conference/Ethernet module 100. In other embodiments, one or more of these components may be provided by a video conference/Ethernet module 100, while one or more other components may be provided by a host computing device, another video conference or PBX/Ethernet module, or any other computing device.

Figure 3A:
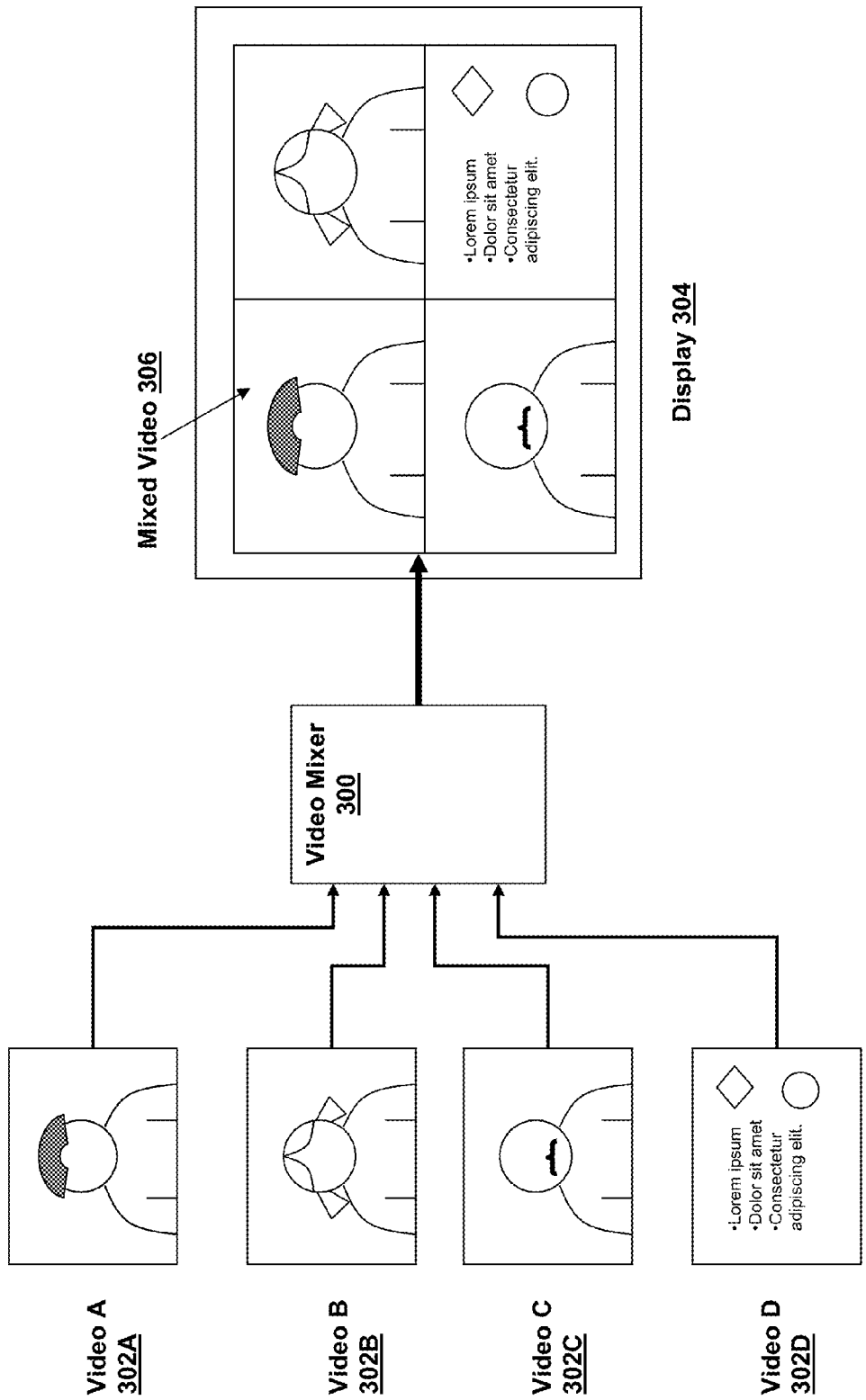
FIG. 3A is a block diagram of an embodiment of mixing multiple video streams into a single video stream.

Referring now briefly to FIG. 3A, illustrated is a block diagram of an embodiment of mixing multiple video streams into a single video stream. A plurality of video streams 302A-302D (referred to generally as video stream(s) 302) may be mixed by a audio/video media processor, referred to in this example as a video mixer 300 to create a mixed video stream 306. Mixed video stream 306 may be provided for display by a computing device or video conference or telepresence display 304. In some embodiments, mixed video stream 306 may be displayed full-screen, windowed, or in other formats according to the display or computing device 304. Video streams 302 may comprise outputs of telepresence, video cameras, or web cameras of computing devices or video conferencing terminals. For example, video stream A 302A may comprise the output of a first participant's laptop's integrated camera; video stream B 302B may comprise the output of a second participant's videophone's camera; and video stream C 302C may comprise the output of a third participant's smart phone's video conferencing (e.g. front-facing) camera. In many embodiments, a participant such as first, second, or third participant, or a fourth participant (not illustrated) may provide a fourth video stream D 302D, which may comprise an application output window or document such as a Microsoft PowerPoint slideshow, an interactive whiteboard output, a scanner output, a PDF document, a video file, or any other type of static or dynamic video content. In some embodiments, video stream D 302D may be provided by a video driver or video conferencing application of the video mixing system. For example, video stream D 302D may comprise titles, captions, logos, animations, scrolls, status indicators, or other visual indicators that may be placed alongside or overlaid on video streams 302A-302C.

Figure 3B:
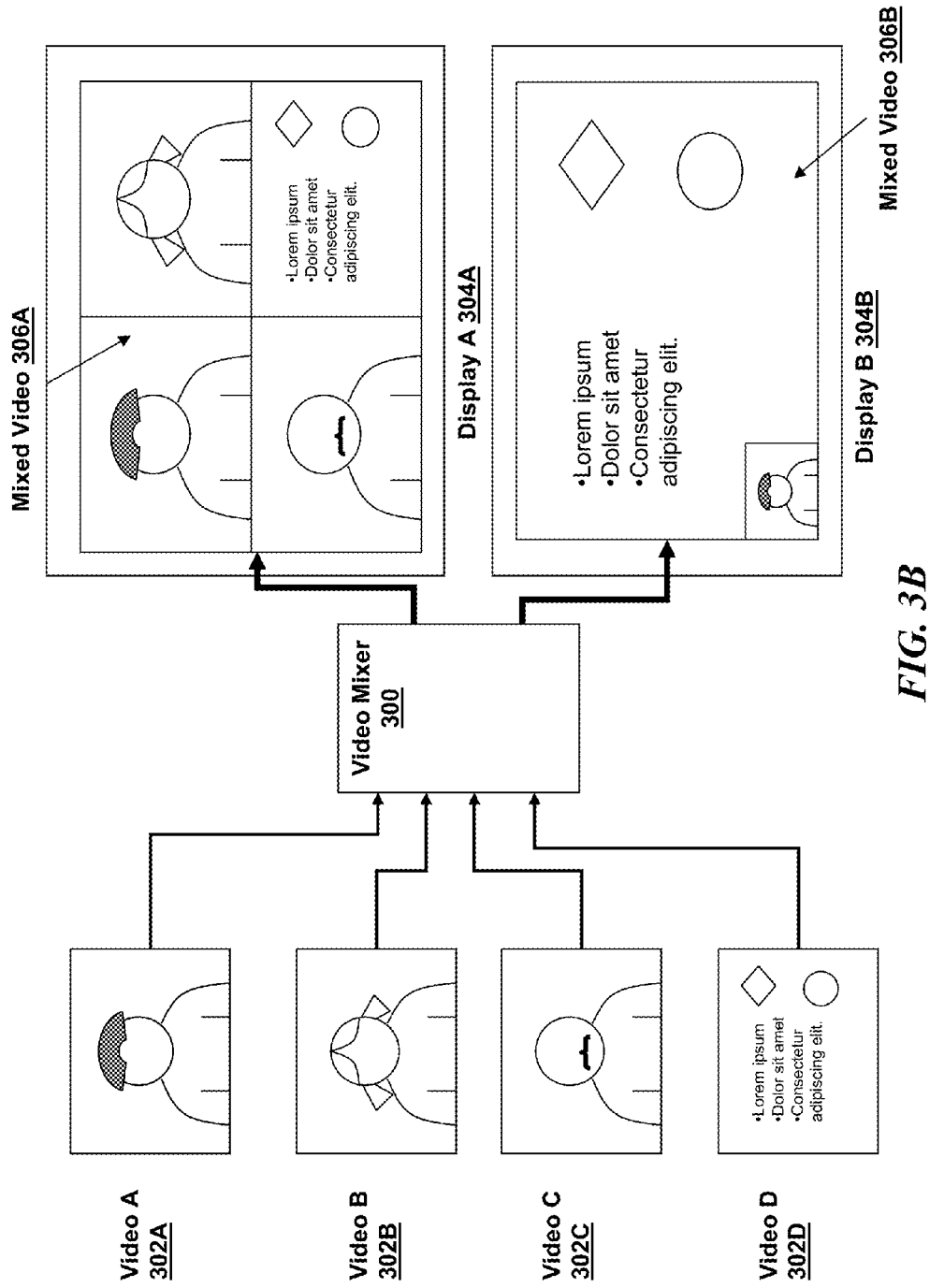
FIG. 3B is a block diagram of another embodiment of mixing multiple video streams.
Figure 3C:
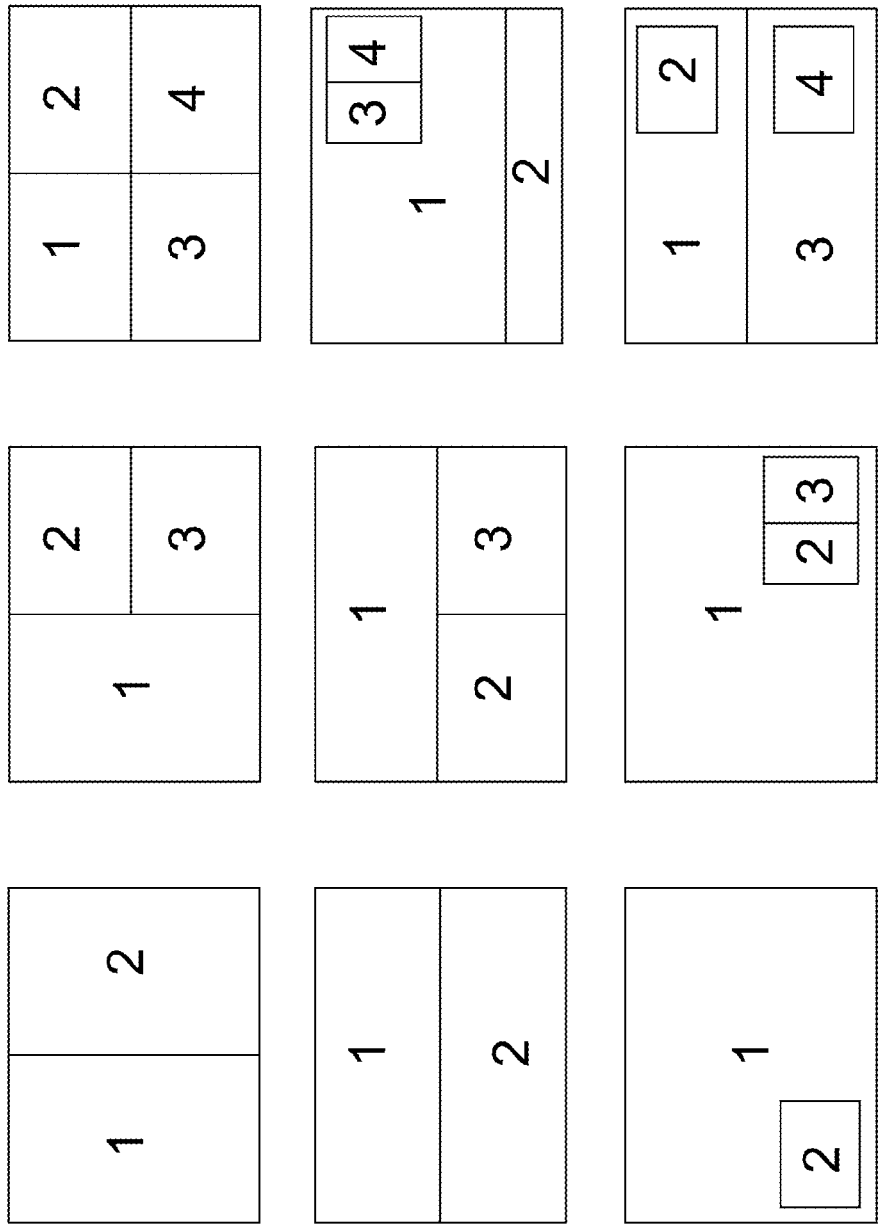
FIG. 3C is another block diagram of examples of embodiments of mixed video formats.

Although shown arranged alongside each other in a four-box arrangement, in many embodiments, video streams 302A-302D may be mixed or arranged in other formats. For example, referring briefly ahead to FIG. 3C, illustrated are several examples of embodiments of mixed video formats or arrangements. The examples shown are for illustrative purposes only, and are not meant to be limiting. As shown, input video streams may be placed alongside each other, overlaid (similar to picture-in-picture or other functions), or layered. For example, in one embodiment in which a video stream comprises a caption for a second video stream, such as a name and title of a lecturer, the caption video stream may be transparently overlaid on the second video stream, with the mixed video comprising both the lecturer and the overlaid title. In some embodiments, more streams may be mixed, including 10 streams, 15 streams, 20 streams, or more. For example, in one embodiment with a lecturer presenting remotely to a virtual classroom with 50 students, the video mixer may provide a single stream mix of the 50 individual student cameras to the lecturer so that, at a glance, he or she may see if a student has raised their hand for a question.

Referring back to FIG. 3B, illustrated is a block diagram of another embodiment of mixing multiple video streams. Similar to FIG. 3A, video streams 302A-302D may be mixed by a video mixer into a first mixed video stream 306A for display on a first display 304A. The video streams may also be mixed into a second mixed video stream 306B for display on a second display 304B. This may be done responsive to different roles of participants of the video conference. For example, a first participant may be a presenter, while the second and third participants are merely viewers. A first mixed video stream 306A may be provided to the presenter, so that he or she may view feedback from viewer participants, while a second mixed video stream 306B comprising the presenter and a presentation may be provided to the viewer participants. In a further embodiment, the mixed video streams may be dynamically remixed, for example, as slides or other documents are shown, as different participants take on speaker roles, or responsive to other requirements.

Figure 4A:
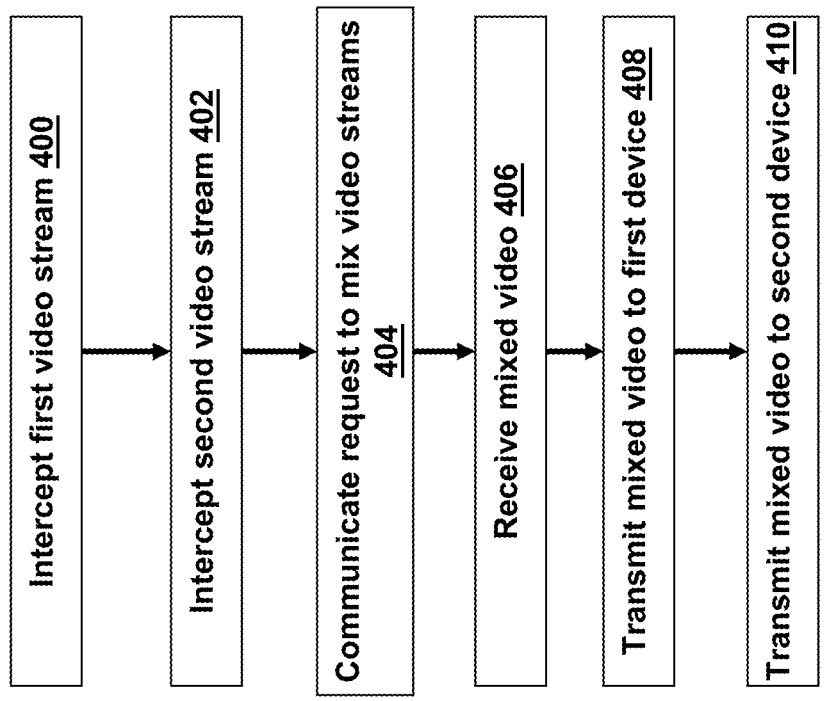
FIGS. 4A and 4B are a flow chart and block diagram, respectively, of an embodiment of a method for providing a mixed video conference of a plurality of video conference participants.
Figure 4B:
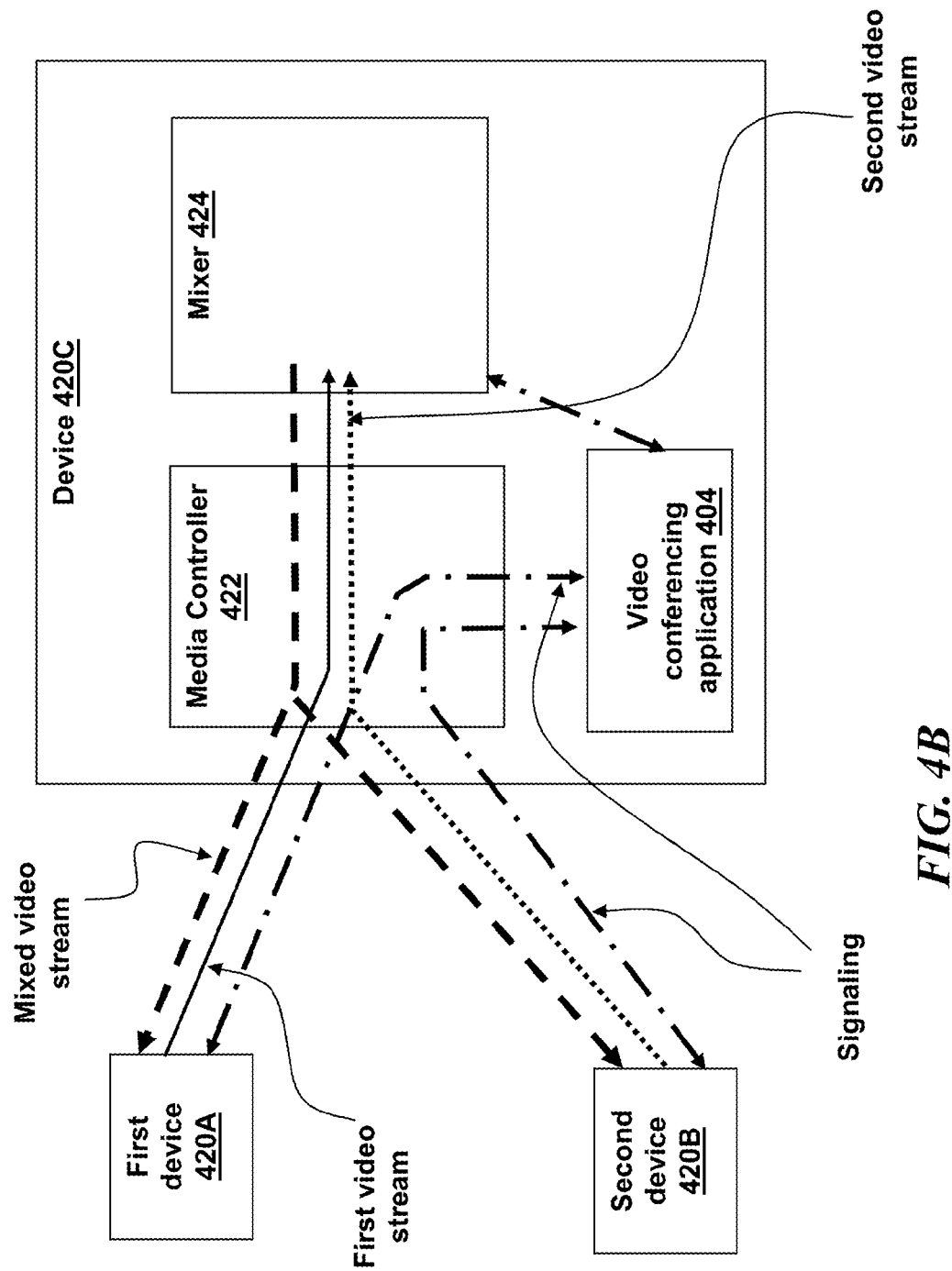

Referring now to FIGS. 4A and 4B, illustrated are a flow chart and block diagram, respectively, of an embodiment of a method for providing a mixed video conference of a plurality of video conference participants. Although only two participants are shown in FIG. 4B, the method and systems discussed herein may be easily scaled up. By providing a mixed video stream to a plurality of participants, each participant does not need to provide an un-mixed video stream to each other participant, drastically reducing bandwidth requirements as the number of participants increase. At step 400, a driver or media controller 422 of a device 420C installed as an Ethernet adapter in a computing device may intercept a first video stream. In some embodiments, the first video stream may be communicated over a first transport layer connection established between the computing device and a first device 420A of a first video conference participant of a plurality of video conference participants. The first video stream may comprise a first video capture of the first video conference participant from the first device, such as from a webcam, integrated camera, external USB camera, or other video capture device.

At step 402, the media controller may intercept a second video stream communicated over a second transport layer connection established between the computing device and a second device 420B of a second video conference participant of the plurality of video conference participants. In some embodiments, the second device 420B and second video conference participant may be the first device 420A and the first video conference participant, such as where the second video stream comprises an application output window, video file, slideshow, or other dynamic or static content. In some embodiments, intercepting the first or second video streams may comprise intercepting an RTP payload of a TCP/IP packet from the respective connection, the RTP payload comprising a portion of the respective video stream.

At step 404, the media controller may communicate a request to mix the intercepted first video stream and second video stream to a video mixer 424. In some embodiments, the request may comprise a selected arrangement or format of a plurality of predetermined arrangements, as discussed above in connection with FIG. 3C. In one such embodiment, the video conferencing application may identify or select the arrangement based on a number of video conference participants. In another such embodiment, the video conferencing application may identify or select the arrangement based on a role of a video conference participant, or roles of a combination of participants.

In some embodiments, the video conferencing application may instruct audio/video media processor to process the first intercepted video stream and second intercepted video stream for mixing, or may instruct the audio/video media processor to process the intercepted streams. For example, the video conferencing application may instruct the audio/video media processor to rescale the video stream to reduce the size of each video frame, or reduce the color depth of the video stream. In other embodiments, the video conferencing application may instruct the audio/video media processor to remove areas through cropping, or color-keying (sometimes referred to as chroma key compositing, chroma keying, or blue- or green-screening) to create a transparent portion of the video stream for mixing with other streams. In still other embodiments, the video conferencing application may instruct the audio/video media processor to augment the video streams or insert content into one of the first or second video streams for mixing. For example, the video conferencing application may instruct the audio/video media processor to add captions, titles, number identifications, animations, logos, or other indicators to one or more of the video streams, such that the mixed video content is enhanced with the additions.

At step 406, the media controller may receive a mixed video from the mixer comprising a single video stream of a first view of the first video conference participant and a second view of the second video conference participant. In some embodiments, the video conferencing application may instruct the audio/video media processor to insert additional content into the mixed video stream to augment the mixed video, including titles, captions, logos, number identifications, animations, or other indicators. In a further embodiment, the video conferencing application may instruct the audio/video media processor to retrieve a file or image to add to the mixed video stream. In some embodiments, the video conferencing application may instruct the audio/video media processor or media controller to generate an RTP payload for one or more transport layer protocol packets for the first and/or second transport layer connections to the first or second device, respectively, comprising the mixed video stream. In a further embodiment, the media controller may use information retrieved from the intercepted RTP packet to generate the RTP payload. For example, in one such embodiment, where the media controller has intercepted a video stream from the first device to the second device, the media controller may generate a packet that appears to come from the first device for transmission to the second device, with the mixed video as the RTP payload. On receipt, the second device may then display the mixed stream as if it was received from the first device, transparently.

At step 408, the media controller may transmit the mixed video via the first transport layer connection to the first device of the first video conference participant. At step 410, the media controller may transmit the mixed video via the second transport layer connection to the second device of the second video conference participant.

In some embodiments, regardless of the number of participants involved in the video conference, a device receiving a mixed stream from the media controller may act as if it is involved in a video conference with only one other participant. For example, the media controller may act as a conference participant proxy, such that a device believes that it is in communication with only a single video conference participant. This may be useful in allowing devices with limited processing power or bandwidth to participate in a multi-user video conference, without requiring modification to two-way video conference applications on the device. Thus, a device normally capable of only a single two-way video conference may participate in a video conference with a limitless number of users.

In a further embodiment, the media controller and audio/video media processor may generate unique mixed streams for each recipient device. This may be useful where a device locally mixes a local camera feed with an incoming stream. For example, many video conferencing applications present a full-screen or large windowed incoming stream of the remote user, while displaying the camera output of the local user in a small picture-in-picture window. To prevent displaying the camera output of the local user twice, in some embodiments, the media controller and audio/video media processor may deliver a mixed stream to the user's device that does include the view of the local user or local user's camera output. In many instances, such as where a user is a non-presenting participant, this may not be necessary.

Figure 4C:
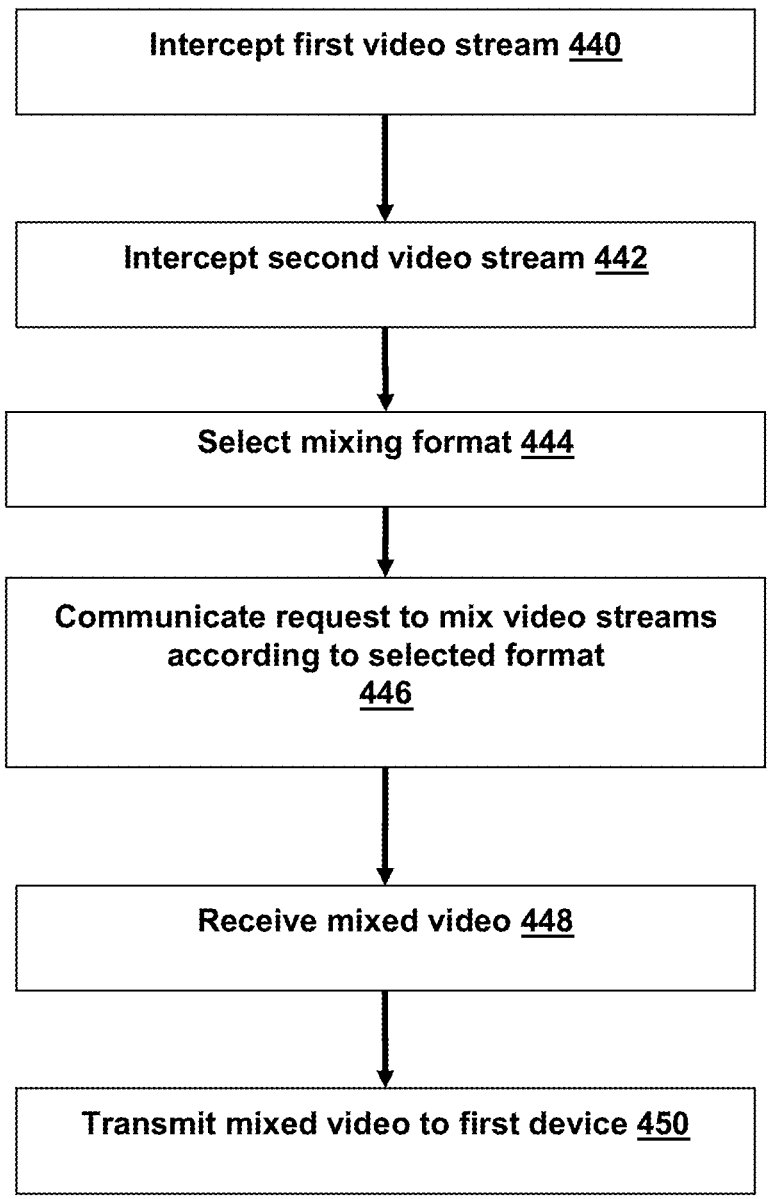
FIG. 4C is a flow chart of an embodiment of a method for providing a mixed video conference of a plurality of video conference participants based on a role of at least one video conference participant.

Referring now to FIG. 4C, illustrated is a flow chart of an embodiment of a method for providing a mixed video conference of a plurality of video conference participants based on a role of at least one video conference participant. At step 440, a media controller of a device installed as an Ethernet adapter in a computing device may intercept a first real time protocol stream comprising a first video stream communicated over a first transport layer connection established between the computing device and a first device of a first video conference participant of a plurality of video conference participants. In some embodiments, the first video stream may comprise a first video capture of the first video conference participant from the first device. In other embodiments, the first video stream may comprise an image, document, application output window, file, video, or other displayed information.

At step 442, the media controller may intercept a second real time protocol stream comprising a second video stream communicated over a second transport layer connection established between the computing device and a second device of a second video conference participant of the plurality of video conference participants. The second video stream may, in some embodiments, comprise a second video capture of the second video conference participant from the second device. In other embodiments, the second video stream may comprise an image, document, application output window, file, video, or other displayed information.

At step 444, the video conferencing application may select a mixing format or arrangement corresponding to a role of the first video conference participant. In some embodiments, the video conferencing application may identify the first video conference participant as having a specified role, while in other embodiments, the video conferencing application may receive an indication that the first video conference participant has the specified role. In such embodiments, the video conferencing application may receive the indication from the first device, the second device, or may receive an indication from an authentication, security, or administration system of the video conference provider. For example, the first conference participant may log in as a presenter to an authentication system, and the authentication system may notify the video conferencing application that the conference participant is a presenter. In some embodiments, the video conferencing application may identify that the role of the first video conference participant is a presenter. In other embodiments, the video conferencing application may identify that the role of the first video conference participant is a lecturer. In still other embodiments, the video conferencing application may identify that the role of the first video conference participant is a non-presenter participant. In yet still other embodiments, the video conferencing application may identify that the role of the first video conference participant is a non-presenter lecturer. In some embodiments, the video conferencing application may select the mixing format based on a number of video conference participants. For example, the video conferencing application may select a vertical or horizontal split screen format or a picture-in-picture format if there are two participants, a boxed format if there are four participants, a mixed split-screen and picture-in-picture if there are five participants, etc. In some embodiments, the video conferencing application may select the mixing format based on both a number of video conference participants and their roles, or a number of participants having a specified role. For example, if ten participants of twelve are non-presenters, and the other two participants are presenters, the video conferencing application may select an arrangement with the ten non-presenters video streams placed in small boxes at the bottom of the mixed video, with the two presenters sharing the majority of the mixed video in a split-screen. In some embodiments, the video conferencing application may select an arrangement wherein the video streams of a number of non-presenters are not included in the mixed video stream.

At step 446, in some embodiments, the video conferencing application may communicate a request to the audio/video media processor or mixer to process the intercepted first video stream and intercepted second video stream in accordance with the selected mixing format. Communicating the request may comprise generating an interprocess message, a function call, or other request. In some embodiments in which auxiliary media processing is provided by a second device, as discussed above in connection with FIG. 1G, communicating the request may comprise generating an interboard message.

At step 448, in some embodiments, the media controller may receive a mixed video comprising a single video stream of a view of the second video conference participant based on the mixing format. For example, in one embodiment in which the first video conference participant is a non-presenter, the view of the first video conference participant may not be included in the mixed video, based on the selected mixing format. In other embodiments, the media controller may receive the mixed video comprising a single video stream of the view of the second video conference participant and a second view of the first video conference participant based on the mixing format. For example, in an embodiment in which both conference participants are presenters, both views may be included in the single mixed video stream. In still other embodiments, the view of the first conference participant may not be included in the mixed video stream because the device of the first conference participant may locally mix incoming video streams and the local camera, as discussed above. In such embodiments, the mixed video may comprise a third view of a third video conference participant, the video stream of the third conference participant similarly intercepted by the media controller.

At step 450, the media controller may transmit the mixed video to the first device of the first video conference participant. In some embodiments, as discussed above, transmitting the mixed video may comprise generating an RTP payload comprising the mixed video for transmission via one or more transport layer packets, such as UDP packets. The media controller may retrieve information from the intercepted UDP packets to generate the UDP payload and/or transport layer packets for transmission. Although discussed in terms of UDP packets, in some embodiments, different protocols may be used, such as UDP tunneled via TCP packets, reliable UDP, XTP, or any other protocol.

In some embodiments, the method may further comprise the video conferencing application communicating to the video mixer a second request to process the intercepted first video stream and the intercepted second video stream in accordance with a second mixing format for a second role of a second video conference participant. In a further embodiment, the media controller may receive a second mixed video comprising a single video stream of a second view of the first video conference participant based on the second mixing format. The media controller may transmit the second mixed video to the second device of the second video conference participant. This may be done to provide different views to different conference participants, for example, based on their roles, as discussed above in connection with FIG. 3B.

C. Systems and Methods for Enabling Session Initiation Protocol for a Private Branch Exchange System without a Session Initiation Protocol Stack Many installations of existing or legacy private branch exchange (PBX) systems may lack advanced features for interfacing with an IP-based telephony system. For example, such PBX systems may lack session initiation protocol (SIP) stacks, proxies, or registrars, or lack the ability to interface with such components. Difficulties arise due to the difference between the synchronous nature of time division multiplexing (TDM) systems such as the public switched telephone network (PSTN) and the asynchronous nature of internet networks. Prior attempts at solutions typically require installation of expensive bridging gateways or adapters with both foreign exchange subscriber (FXS) or foreign exchange office (FXO) ports as well as Ethernet ports. Such appliances may be difficult to maintain, and lack the ability to easily upgrade features.

Accordingly, in one embodiment of a solution for enabling SIP for a PBX system without an SIP stack, a conference/Ethernet module 100 having a PCI, PCIe, or similar form factor as discussed above may be installed in a computing device, and provide SIP-to-TDM gateway services, in addition to the extended capabilities discussed herein, including SIP registrar services and video conferencing. As the module may be installed as an Ethernet adapter in the host computing device 102, the module 100 does not require additional drivers or complicated customization of the computing device 102. Rather, as discussed above, the module 100 may communicate with applications on the computing device through simple TCP/IP or similar communications with network addresses provided by the module to both the computing device and the operating system of the module. Thus, the same module may be utilized with different operating systems and VoIP software packages in the host computing device with minimum integration time. In some embodiments, software packages may even be run on a virtual machine executed by the host machine, providing enormous flexibility, without requiring custom software drivers due to the hardware.

Figure 5A:
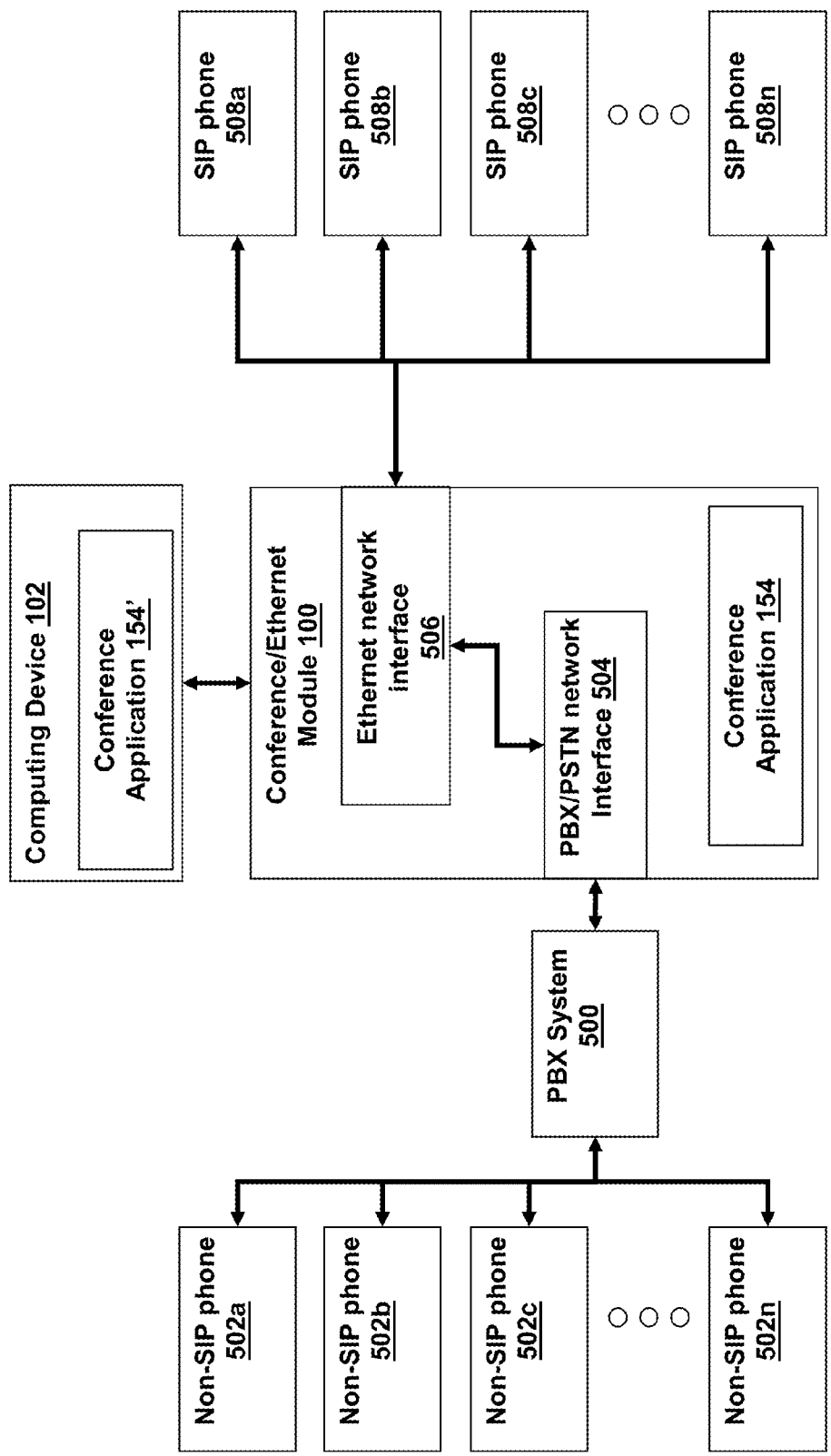
FIG. 5A is a block diagram of an embodiment of a system for enabling session initiation protocol for a private branch exchange system without a session initiation protocol stack.

Referring now to FIG. 5A, illustrated is an embodiment of a system for SIP enabling of a private branch exchange system without an SIP stack. In brief overview, the system includes a conference/Ethernet module 100 or similar device installed as an Ethernet adapter in a computing device 102. In some embodiments, the module 100 may connect to a PBX system 500. The connection may be via a PBX/PSTN network interface 504 such as an FXO or FXS interface, or may, in some embodiments, be via an Ethernet interface or similar network interface. In still other embodiments, the connection to the PBX system 500 may be via an inter-PBX communication protocol, while in yet still other embodiments, the module 100 may appear to the PBX system as a branch office or even an individual extension. In some embodiments, the PBX system 500 may provide branch services to one or more post office telephone systems (also referred to as plain old telephone system or POTS) or PSTN extension phones 502a-502n, referred to generally as non-SIP phones 502. Via an Ethernet network interface 506, the module 100 may provide VoIP, IP PBX, or SIP services to one or more SIP or VoIP phones 508a-508n referred to generally as SIP phones 508. In some embodiments, computing device 102 may execute one or more applications, such as a conference application 154', VoIP service application, or SIP application, such as Lync Server or Office Communications Server, provided by Microsoft Corp. of Redmond, Wash., or any similar application. In other embodiments, module 100 may comprise a SIP registrar, SIP proxy, SIP stack, Ethernet bridge, firewall, gateway, or other modules as discussed above in connection with FIG. 1D. Module 100 may, in some embodiments, execute one or more applications, such as a conference application 154.

Still referring to FIG. 5A and in more detail, in some embodiments, the system may comprise a device or module 100 installed as an Ethernet adapter in a computing device 102 in communication with a PBX system 500 without an SIP stack. In some embodiments, the computing device 102 may comprise an appliance, while in other embodiments, the computing device 102 may comprise a server, workstation, or desktop computer. In some embodiments, device or module 100 may comprise any of the embodiments of Conference/Ethernet modules 100 discussed herein. In a further embodiment, device or module 100 may comprise a plurality of modules, such as a first module 100 and a media processing device module 190, auxiliary audio/video media processor module, or other module. In one such embodiment, a second module may comprise FXO/FXS ports and interfaces and connect via an interboard connection 192 to module 100 to allow connection to the PBX system 500.

In some embodiments, PBX system 500 may connect to one or more non-SIP phones 502a-502n. Although shown in direct connections, in many embodiments, PBX system 500 may connect to non-SIP phones via the PSTN interface. For example, in some embodiments, PBX system 500 may represent a telecommunications central office or branch office, and non-SIP phones may represent customer phones.

In some embodiments, PBX system 500 and module 100 may connect via a PBX/PSTN network interface 504. PBX/PSTN network interface 504, sometimes referred to as a TDM interface, may comprise any type and form of TDM or PSTN interface, including a telephone line, fiber optic line, multipair cable, ISDN, microwave transmission link, satellite link, cellular link, T1 circuit, E1 circuit, T3 circuit, OC-3 circuit or any other type and form of non-SIP interface. In some embodiments, module 100 may appear to PBX system 500 as another branch office, while in other embodiments, module 100 may appear to PBX system as one or more extensions. PBX system and module 100 may communicate via TDM signaling protocols or PSTN signaling, such as DTMF tones.

As discussed above, in many embodiments, module 100 may include one or more Ethernet network interfaces for connection, via a network, to one or more SIP phones 508. Although referred to as SIP phones, the devices may include VoIP phones, desktop or laptop computers, audio/video conference appliances, or any other type and form of audio/video interface utilizing IP-based telephony. Although shown directly connected to Ethernet network interface 506, in many embodiments SIP phones 508 may connect to module 100 via one or more networks, including a WAN, LAN, or the Internet, or via a VoIP service provider.

In some embodiments, module 100 may include one or more of the applications or features discussed above. For example, module 100 may comprise an Ethernet switch and firewall, a network bridge, a processor, an SIP stack, an SIP proxy, an SIP registrar, a conference bridge and/or conference application, or any other type and form of applications or services.

Figure 5B:
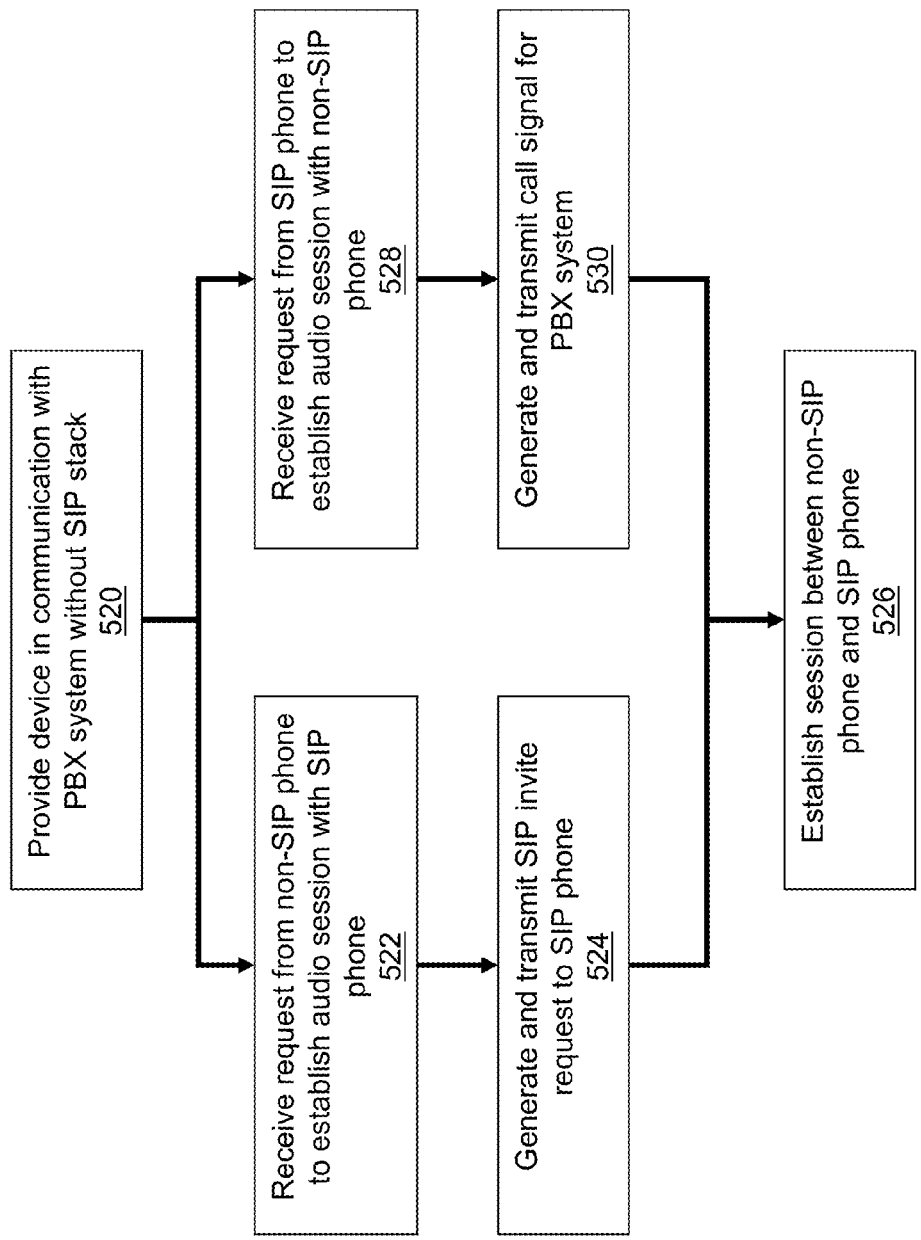
FIG. 5B is a flow chart of an embodiment of a method for enabling session initiation protocol for a private branch exchange system without a session initiation protocol stack.

Referring now to FIG. 5B, illustrated is a flow chart of an embodiment of a method for enabling SIP for a PBX system without an SIP stack. In brief overview, at 520, a device may be provided, the device installed as an Ethernet adapter in a computing device. The device may be in communication with a PBX system without a session initiation protocol stack, such that the device provides an SIP service to the PBX system or access to an SIP trunk. In some embodiments, at step 522, the device may receive a request from a non-SIP phone of a first user on the PBX system to establish an audio session or call with a second user at a SIP phone extension in communication with the device. At step 524, the device may generate and transmit a SIP invite request directed to the SIP phone of the second user. At step 526, the device may establish an audio session between the non-SIP phone and the SIP extension of the SIP phone corresponding to the extension requested by the first user, responsive to the request.

In other embodiments, at step 528, the device may receive a SIP request from the SIP phone of the second user to establish an audio session with a non-SIP phone of a third user, the non-SIP phone of the third user connected to the PBX system. At step 530, the device may generate and transmit an incoming call signal to the PBX system, directed to the non-SIP phone of the third user. At step 526, as above, the device may establish an audio session between the non-SIP phone of the third user and the SIP extension of the SIP phone of the second user.

Still referring to FIG. 5B and in more detail, at step 520, in some embodiments, a device may be installed as an Ethernet adapter in a computing device. In some embodiments, the device may comprise an interface to a PBX system and an interface to one or more SIP phones. In other embodiments, the device may communicate with a PBX system via an adapter, gateway, or other interface. The PBX system may lack an SIP stack, and accordingly, the device may provide SIP services and/or access to an SIP trunk to the PBX system. In some embodiments, the device may appear as an Ethernet adapter to the computing device, such that the computing device does not require installation of hardware specific drivers to communicate with the device via a network stack. The device may, in some embodiments, comprise a SIP proxy, SIP gateway, SIP registrar, SIP stack, conference bridge, or other applications, servers, modules, or services discussed above. In some embodiments, the device may comprise a SIP registrar, and may receive a register request to register the SIP phone. In further embodiments, the device may act as a gateway between non-SIP phones of the PBX system and SIP phones connected to the device or in communication with the device.

At step 522, in some embodiments, the device may receive a request from a non-SIP phone of a first user on the PBX system to establish an audio session with a second user at an extension, the second user having a SIP phone connected to the device. In some embodiments, the request may be in a non-SIP protocol. For example, in some embodiments, the PBX may transmit an incoming call signal to the module as if the module were a POTS extension. In other embodiments, the PBX system may transmit a request to the module in a proprietary inter-PBX protocol of the PBX system. In still other embodiments, the PBX may transmit an incoming call signal via a signaling channel of an ISDN, T1, E1, or any other connection.

In some embodiments, the device may identify a plurality of extensions to the PBX as if they were POTS or PSTN extensions, each extension corresponding to a SIP phone registered in a SIP registrar of the device. Thus, the PBX system may direct calls to specific extensions via a TDM signaling method, regardless of a lack of SIP stack on the PBX system. In some embodiments, these extensions may be referred to as virtual extensions. In a further embodiment, a virtual extension may correspond to a plurality of SIP phones or devices. For example, the device may identify a number of a virtual extension to the PBX system for a user, and may direct incoming calls to that number from the PBX to any SIP device currently in use by the user, such as a computer, a mobile phone, a desktop phone, etc., seamlessly providing the mobility afforded by SIP communications to the PBX system. In such embodiments, the device may determine that an incoming call identifies a number corresponding to a virtual extension, and retrieve a corresponding SIP device address from a SIP registrar of the device.

At step 524, in some embodiments, the device may generate and transmit a SIP invite request to the SIP phone, responsive to receiving the request from the PBX system. In some embodiments, the SIP invite request may identify an address of a conference bridge of the device or other bridge for bridging between the SIP and TDM networks. In other embodiments, the SIP invite request may identify a virtual address for the PBX system or the non-SIP phone, the virtual address generated by the device. In a further embodiment, a SIP registrar of the device may register the virtual address or bridge address as an address for the PBX system or non-SIP phone, such that return signaling communications from the SIP phone may be properly processed and/or translated into a TDM signaling protocol and directed to the PBX system.

At step 526, the device may establish an audio communication session between the non-SIP phone and the SIP extension of the SIP phone corresponding to the extension requested by the first user. In some embodiments, establishing the audio communication session may comprise establishing a session via a conference bridge, as discussed below. In other embodiments, establishing the audio communication session may comprise processing and translating between SIP signaling methods and TDM signaling methods, and translating between TDM protocols and real-time media protocols. For example, in some embodiments, the device may packetize and encapsulate an incoming MPEG stream with an RTP header for transmission via UDP to the SIP phone.

Additionally signaling communications may also be translated and bridged between the networks, such as ringing signaling, busy signaling, and call termination signaling.

Similarly, in some embodiments, the device may allow SIP phones to contact non-SIP phones connected to the PBX system. At step 528, the device may receive a request from a SIP phone, such as the SIP phone of the second user, to establish an audio session with a user of a non-SIP phone connected to the PBX system, such as the first user or a third user. In some embodiments, the request may identify a URI of a user of the non-SIP phone. In a further embodiment, the device may map a URI via a conference bridge, the PBX, or other interface for the user of the non-SIP phone. The URI may, in some embodiments, comprise a POTS telephone number. In one embodiment, the device may determine that the request is directed to a non-SIP phone connected to the PBX system.

Responsive to the request, at step 530, in some embodiments, the device may communicate the request via the PBX system to establish the audio session with the non-SIP phone identified by the request. In some embodiments, communicating the request may comprise generating and transmitting a call signal, such as an off-hook signal and DTMF tones corresponding to the extension of the non-SIP phone. In other embodiments, the device may translate or convert the request into a signal for an inbound call to the PBX system.

At step 526, as discussed above, the device may establish an audio session between the SIP phone and the non-SIP phone. In some embodiments, the established session may be via a conference bridge of the device, as discussed below. In other embodiments, establishing the audio communication session may comprise processing and translating between SIP signaling methods and TDM signaling methods, and translating between TDM protocols and real-time media protocols as discussed above.

Accordingly, the device may serve to bridge between SIP or VoIP networks and trunks, and legacy PBX systems that lack capability for interfacing with the SIP system. The device may provide additional SIP signaling, redirection, conferencing, proxy, gateway and registrar services as needed, providing such capabilities to the PBX system regardless of the legacy system's capabilities or lack thereof.

Figure 6A:
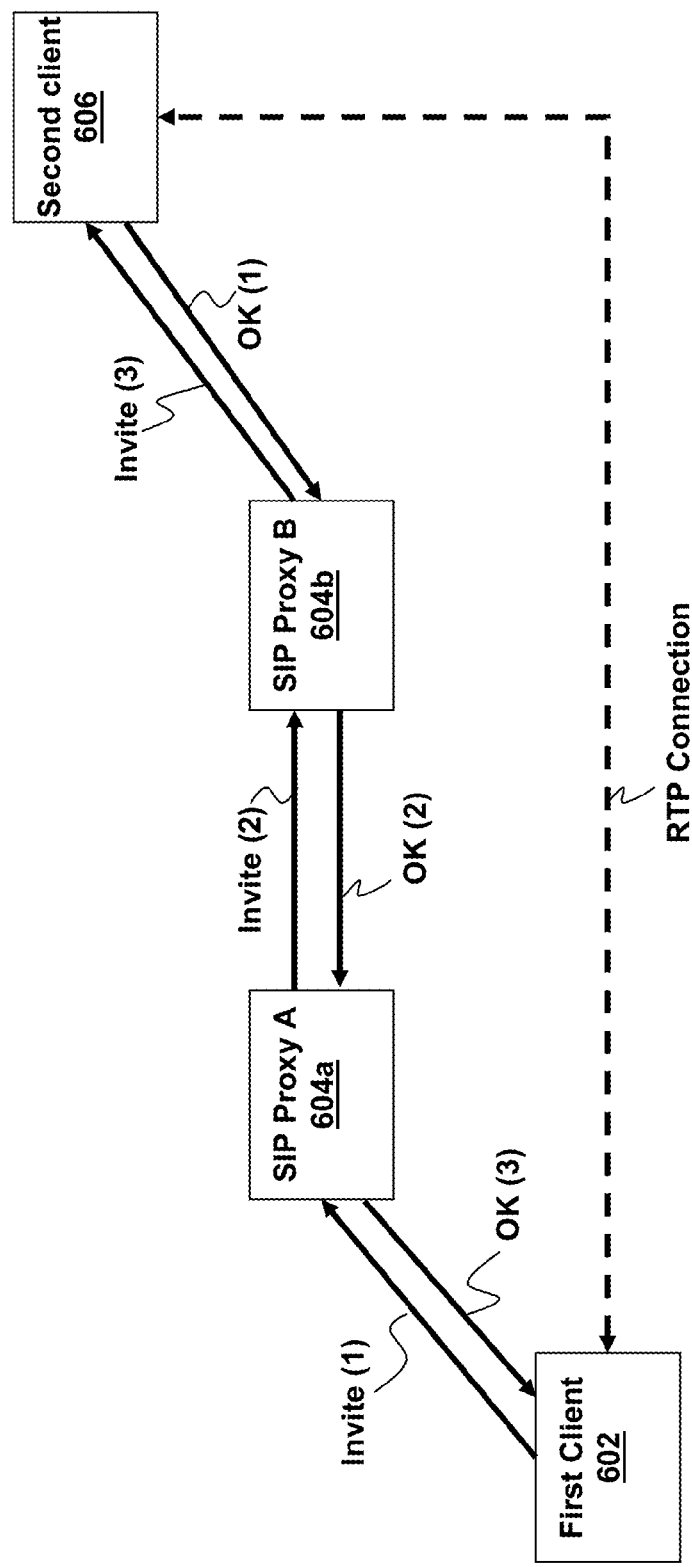
FIG. 6A is a block diagram of an embodiment of separate signaling and media paths between endpoints of a real-time protocol communication.

D. Systems and Methods for Providing Security for Session Initiation Protocol (SIP) Services SIP and similar protocols that utilize signaling and media paths can pose unique problems for security. For example, referring briefly to FIG. 6A, illustrated is a block diagram of an embodiment of separate signaling and media paths between endpoints of a real-time protocol communication. As shown, a first client 602 may connect via one or more proxies 604a-604b (referred to generally as a proxy or proxies 604) to a second client 606. Although two proxies 604 are shown, in many embodiments, more or fewer proxies may act as intermediaries.

As shown, typically, a first client 602 wishing to establish communications with a second client 606 sends a request (sometimes referred to as an invite request or an invite) to a proxy 604. In many embodiments, first client 602 does not know an address for the second client 606 at the time of the invite request, but instead identifies the second client 606 by a uniform resource identifier (URI) such as "client@aa.com". The proxy 604 may identify the second client address via a registrar or forward the request to a registrar or location server or another proxy. The request is thus forwarded via one or more proxies until an address for the second client 606 is identified, and then the invite request may finally be transmitted to the second client 606.

The second client 606 may acknowledge the response, and include in the acknowledgement an address of the second client 606 for a real-time communication session. In many embodiments, the invite request does not include the address of the first client 602 but rather just a URI of the first client 602, and/or the source IP address of the first client 602 may be replaced with a source address of a proxy as each proxy forwards the request to the second client 606. Accordingly, the second client 606 may not be able to transmit the response directly to the first client 602, but rather, may transmit the response via the same chain of one or more proxies as the request.

Once the response is received by the first client 602, the response comprising the second client's address, the first client 602 is able to establish a direct real-time communication with the second client 606. Although referred to as direct, such communication may travel via one or more intermediaries, routers, gateways, switches, or other devices. However, the communication is direct, in that the communication transmitted by the first client 602 includes a destination address of the second client 606, unlike the invitation, which was directed to the first proxy 604. This can reduce latency and delay in the RTP communication, particularly when combined with low-latency but non-reliable protocols such as UDP.

As can be seen from FIG. 6A, the signaling path and real-time protocol paths may be different. Accordingly, the second client 606, for example, may not easily be able to apply network or transport layer security to these communications. For example, the second client 606 may receive signaling protocol messages via a proxy 604 (and thus, with source IP addresses of the proxy), while receiving media data from the first client 602 (and thus, with source IP address of the first client 602). Prior to receiving the media data, as discussed above, in many embodiments, the second client 606 does not know the IP address of the first client 602. Thus, prior to establishing the media path connection, the second client can neither white list the first client's IP address (or add it to an explicit allow list) nor immediately reject a request arriving from a third party IP address to establish a connection. Rather, the second client 606, having acknowledged a signaling request via the proxy, must typically open a port for the real-time protocol communication and wait for a request on the port with session- or application-layer parameters matching the acknowledgement. During this period, the second client 606 is vulnerable to denial-of-service attacks, as each incoming request on the port must be parsed at the session or application layer prior to rejecting or allowing the request.

Figure 6B:
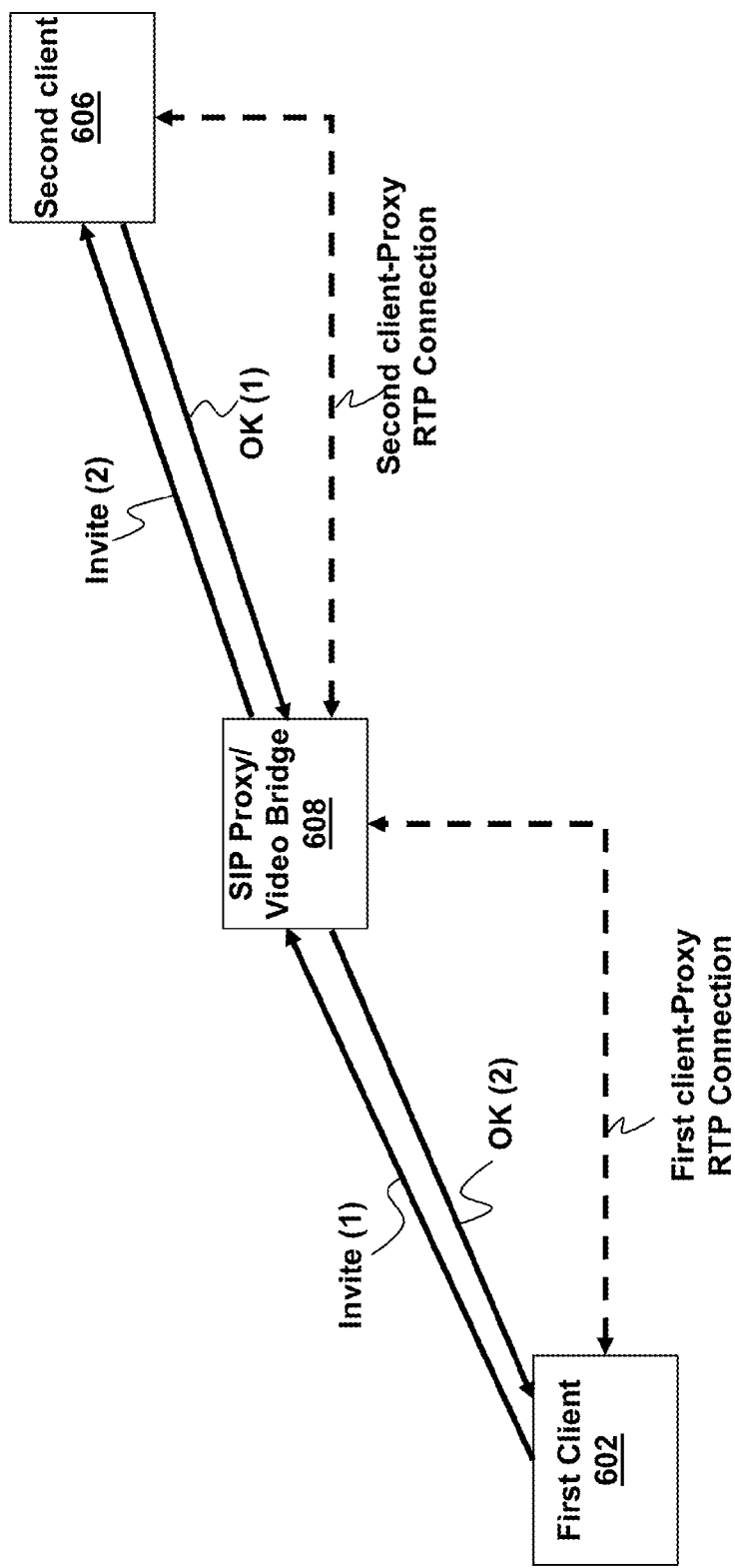
FIG. 6B is a block diagram of an embodiment of utilizing a video conference bridge device to provide a single intermediary point of communication for signaling and media paths between endpoints of a real-time protocol communication.

The proxy/video conference bridge of the present disclosure may provide a solution to these problems by providing a single common point for both real-time protocol communications and signaling protocol communications. Although discussed primarily in terms of video conferencing, the systems and methods discussed herein may also be applied to audio conferencing (i.e. multi-way telephone calls), multi-user screen sharing or screen casting, or similar one-to-many or many-to-many media presentation systems. Referring briefly to FIG. 6B, illustrated is a block diagram of an embodiment of utilizing a video conference bridge device to provide a single intermediary point of communication for signaling and media paths between endpoints of a real-time protocol communication. As shown, the combined proxy/video conference bridge 608 serves as an end point for the first client 602-proxy communication, both on the signaling path and the media path. Similarly, the proxy/video conference bridge 608 serves as an end point for the second client 606-proxy communication, both on the signaling path and the media path. Because the proxy/video conference bridge 608 knows each client's address, the proxy/video conference bridge can block or allow communications at the transport or network layer, without needing to parse incoming requests at the session or application layer.

In one embodiment, the proxy may provide this single-point security system by replacing an address of the second client in the response to the first client's invitation with an address of the video conference bridge. Upon receipt of the response, the first client 602 may establish a real-time protocol communication with the video conference bridge, believing the bridge to be the second client 606. Simultaneously, the proxy/video conference bridge 608 may establish a real-time protocol communication with the second client 606, with the second client 606 believing the bridge to be the first client 602. Advantageously, such embodiments require no modifications to the first client or second client. Upon receipt of media data from the first client 602, the bridge may retransmit the data to the second client 606. Similarly, media data received by the bridge from the second client 606 may be retransmitted to the first client 602. In some embodiments, the bridge may quickly and efficiently retransmit the data at the network or transport layer, without needing to parse session or application layer payloads of the media data, since the bridge can easily identify that the media data has come from the appropriate client. In other embodiments, discussed in more detail below, the bridge may perform translations between different media protocols as necessary.

As a single point with knowledge of both the signaling path and the media path, the proxy/video conference bridge 608 may provide network and/or transport layer security for the clients. For example, if a malicious third party attempts to execute a denial of service attack or other spurious connection the video conference bridge, because the proxy knows the client addresses for the signaling path, the proxy can easily determine whether incoming real-time protocol connections are associated with one of the client addresses. If not, the proxy may, in some embodiments, reject the communication at the network or transport layer, avoiding the need to check session or application layer parameters.

In some embodiments, the proxy/video conference bridge 608 may utilize an access control list to determine whether to allow or deny communication requests. In some embodiments, in which the access control list comprises an explicit allow or white list, the proxy/video conference bridge 608 may add a client address to the white list responsive to the client providing a valid registration request. In other embodiments, in which the access control list comprises an explicit deny or black list, the proxy/video conference bridge 608 may add a client address to the black list responsive to the client providing an invalid registration request. In a similar embodiment, the proxy/video conference bridge 608 may add a client address to the black list responsive to a user of the client not being authenticated, or lacking authorization to register the client as a user location. In yet another embodiment, the proxy/video conference bridge 608 may add a client address to the black list responsive to receiving a predetermined number of requests from the client within a predetermined time period. For example, if the client sends a large number of registration requests and/or invite requests within a short time, the proxy/video conference bridge 608 may determine that the client is initiating a denial-of-service attack, and may add the client address to a black list or temporary black list. In a further embodiment, the proxy/video conference bridge 608 may prevent distributed denial of service attacks by utilizing a white list for incoming real-time protocol communication packets, with addresses of clients for whom the proxy is providing services on the white list. This will allow network or transport layer blocking of any malicious third party requests, regardless of source.

Figure 6C:
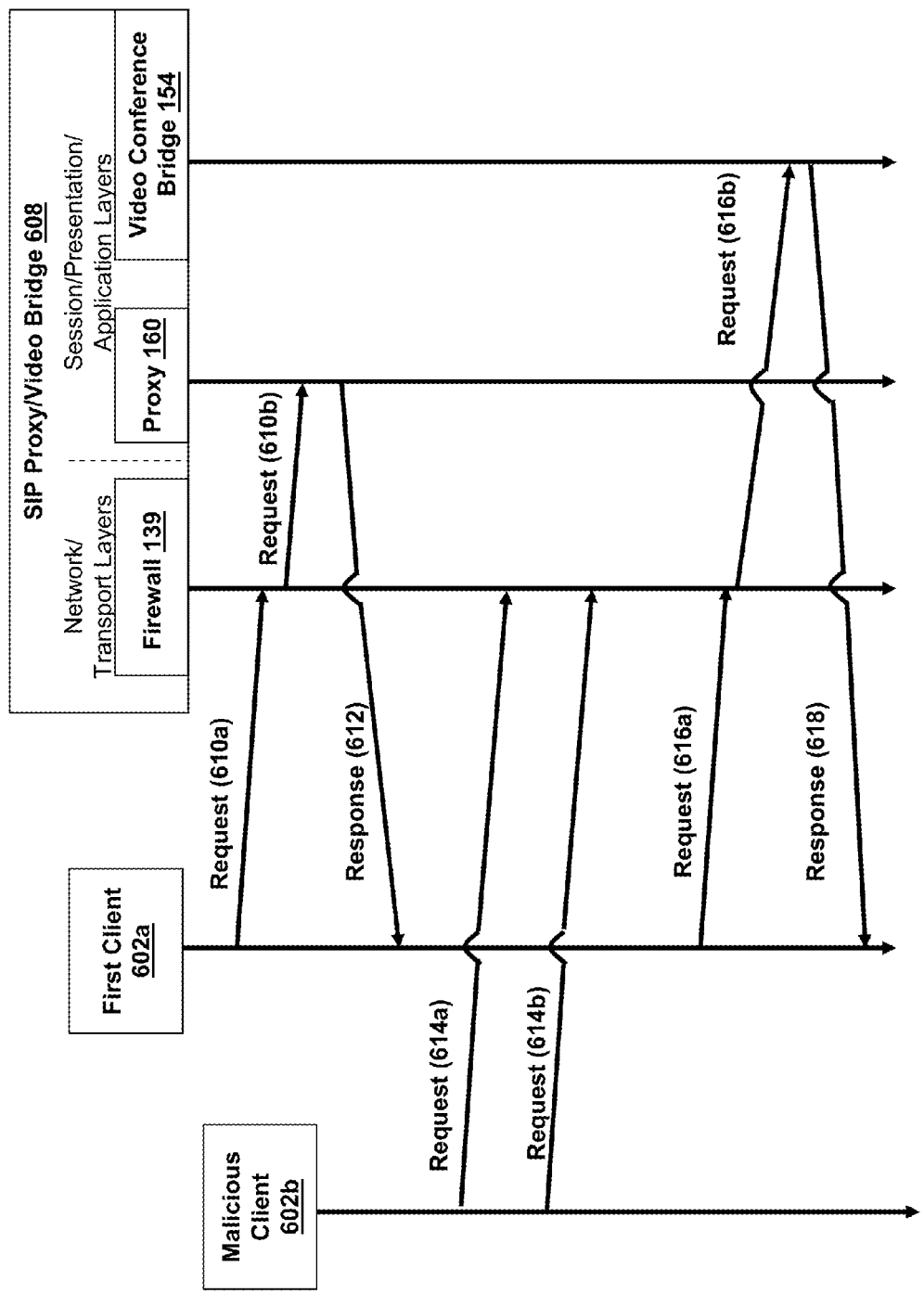
FIG. 6C is a signal flow diagram of an embodiment of a method for providing security for signaling and media paths via a single intermediary point of communication.

Referring briefly to FIG. 6C, illustrated is a flow diagram of an embodiment of a method for providing security for signaling and media paths via a single intermediary point of communication. As shown, in some embodiments, a first client 602a may transmit a request 610a to proxy/video conference bridge 608. The request may be intercepted by a firewall 139 and, responsive to an access control policy or security policy, may be transmitted to a proxy 160. The proxy 160 may respond with a response 612. Although not illustrated, as discussed above in connection with FIGS. 6A and 6B, proxy 160 may transmit the request to a second client and receive a response from the second client. The proxy 160 may retransmit, or modify and transmit this response as response 612.

In some embodiments in which the request 610a is a request to establish a real-time protocol communication session and the request is accepted or acknowledged in response 612, firewall 139 may open a listening port for the real-time protocol communication, such as a UDP port which may be identified in the acknowledgement, and may, in some embodiments, add an address of the first client 602a to a white list corresponding to the listening port. If a malicious client 602b attempts to connect to the listening port via a request 614a, the firewall 139 may immediately determine that the request does not originate from the first client 602a and may block or discard the request at the network or transport layer. In a further embodiment, the firewall 139 may add a source address of the malicious client 602b to a black list, to block further requests such as request 614b, regardless of whether the request is directed to the listening port or another port. For example, this may block future requests of the malicious client to register a client URI, invite other clients to communication sessions, or query the proxy for capabilities.

Upon receipt of a request 616a on the listening port from the first client 602a, the firewall 139 may identify that the request corresponds to the address of the client acknowledged in response 612, and/or may apply security policies to the request. Because the client address has been placed on a white list, the request may be forwarded to video conference bridge 154, which may then parse or otherwise process the request at the application, session, or presentation layer and respond accordingly in response 618.

Figure 6D:
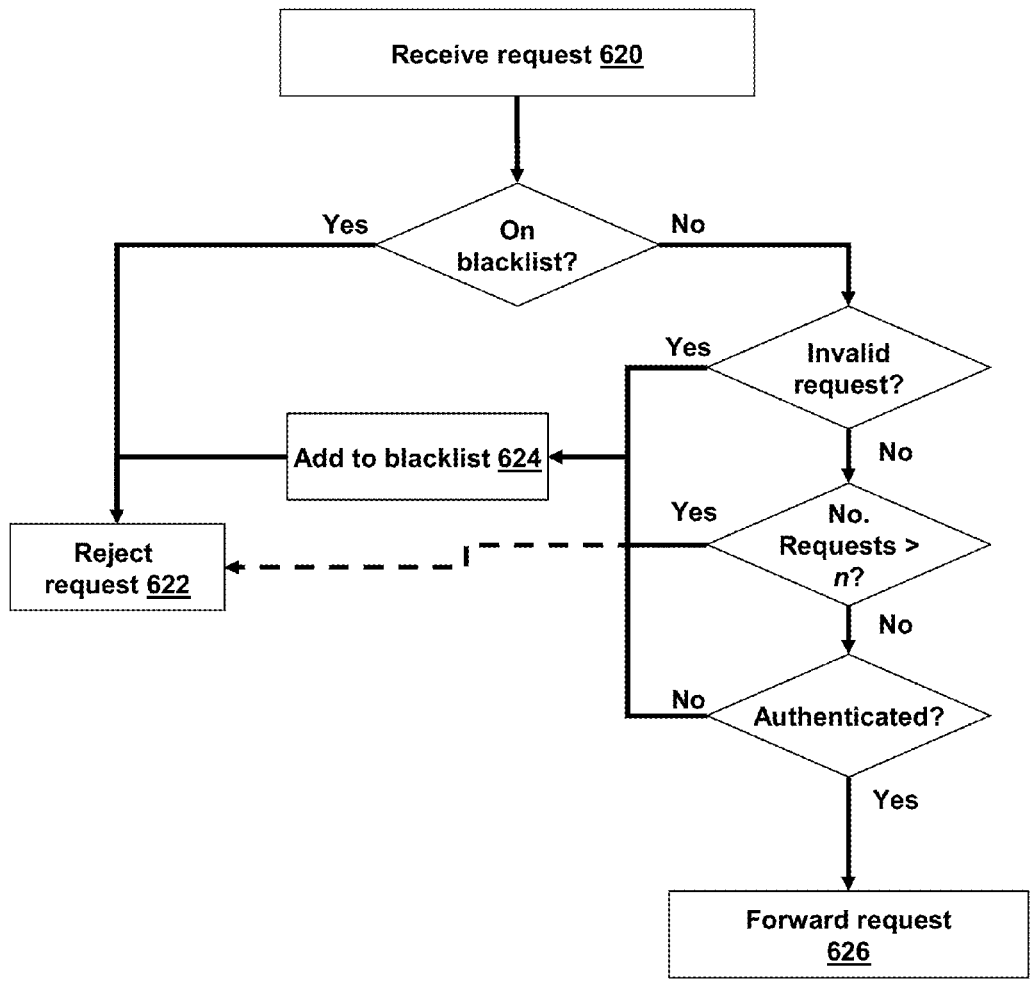
FIG. 6D is a flow chart of an embodiment of a method for providing security for signaling and media paths via a single intermediary point of communication.

Referring now to FIG. 6D, illustrated is a flow chart of an embodiment of a method for providing security for signaling and media paths via a single intermediary point of communication. In brief overview, a device deployed as a proxy between a first client and second client may receive a request from the first client at step 620. A firewall of the device may apply a policy to the request to determine whether to reject or deny the request at step 622. In some embodiments, the firewall may add the first client to a black list or access control list at step 624. In other embodiments, shown in the dotted line, the firewall may merely block or reject the request at step 622. Upon receipt of a second request by the first client, the firewall may identify that the client address is blacklisted or indicated for denial on the access control list, and may reject the request at step 622. If the firewall determines to allow the request, in some embodiments, the firewall may forward the request or pass the request to a higher layer of the network stack at step 626.

Still referring to FIG. 6D and in more detail, at step 620, a device may receive a data packet from a first client. In some embodiments, the data packet may comprise a request. The request may comprise a signaling request of the first client to establish a real-time protocol communication session with a second client, such as an invite request. In other embodiments, the request may comprise a request for capabilities of a proxy. In still other embodiments, the request may comprise a registration request. In yet still other embodiments, the request may comprise a request to modify a session, such as a terminate or bye request, an update request, a parameter change request, or any other type and form of request. The request may be in a session initiation protocol (SIP), IAX protocol, XMPP protocol, or any other signaling protocol. In other embodiments, the data packet may comprise a real-time protocol packet, such as a UDP packet.

A firewall of the device, on its own or in combination with one or more security modules, such as authentication engines, pinhole filters, or other modules, may determine, based on application of a policy to the data packet and/or request, to allow or deny the request. In some embodiments, the firewall and/or security modules may determine if the source address of the originator of the data packet is on a black list or deny list of an access control list. In other embodiments, the firewall and/or security modules may determine if the data packet comprises an invalid request, such as an invalid registration request. In still other embodiments, the firewall and/or security modules may determine if the number of data packets and/or requests received from the client exceeds a predetermined number or threshold of requests within a predetermined time period. In some embodiments, the threshold may be adjusted responsive to suspected denial of service attacks or similar behaviors. For example, responsive to a client being identified as a suspected malicious attacker, the threshold may be correspondingly reduced. This may result in the client being re-blacklisted quicker once they are removed from a blacklist, in case the client resumes an attack. In some embodiments, the threshold may apply to all originators of requests, allowing quick response for distributed denial of service attacks. For example, a threshold set to a first level may be reduced in response to a denial of service attack from a first client. If the first client changes to a different address or a second client begins a denial of service attack, the number of requests of the client will reach the reduced threshold sooner, resulting in the new address or client being added to the blacklist more quickly. In some embodiments, the firewall and/or security modules may determine if a user of the client has been authenticated, such as via a cookie or authorization token. If the client has not been authenticated, the firewall may block the request. Similarly, in some embodiments, the firewall and/or security modules may determine if the authenticated user has permission or authorization to issue the request. For example, a user of a client may be authenticated, but lack permission to register the client as new location. In such cases, the request may be denied. Although illustrated in one sequence in FIG. 6D, in many embodiments, the firewall and/or security modules may apply one or more access control policies in other sequences or orders. For example, the firewall and/or security modules may apply a request threshold determination first, prior to determining whether a request is valid.

If the firewall and/or security modules determine to allow the request, at step 626, the firewall may forward the request to another device or to another layer in the network stack of the device. For example, in one embodiment, the firewall may forward the request to another proxy device. In other embodiments, the firewall may forward the request to a proxy of the device, to a registrar of the device, or to a video conference bridge of the device.

If the firewall determines to deny the request, in some embodiments, the firewall may merely reject or deny the request at step 622. For example, in one embodiment, the firewall may merely deny a first invalid request from a client, but may blacklist the client upon receipt of a second invalid request within a predetermined time period. In other embodiments, the firewall and/or security modules may add the client address to a blacklist or access control list 624. Once added to a blacklist, further requests, including requests via a different protocol or to a different port, such as a real-time protocol communication request via UDP may be blocked at a transport layer or network layer of the network stack, obviating the need for further processing.

E. Systems and Methods for Mapping a Uniform Resource Identifier (URI) to an Endpoint for a Session Initiation Protocol (SIP) Communication By providing proxy services and a video conference bridge, a device may further provide the ability to seamlessly accept a SIP invite request based on a SIP alias from an external network, regardless of whether the requesting client is authenticated or not, through a firewall to the proxy, to allow media streaming and access to a multi-person video conference. In conventional systems, this may not be possible for security reasons, as unauthenticated requests are typically rejected. For example, because a conventional proxy may not comprise a registrar, the proxy may not recognize a request to as a request to a SIP alias rather than a request to call an extension directly. Accordingly, in the interest of protecting SIP extensions from unauthenticated calls, the conventional proxy may reject all such calls, regardless of the alias.

However, the single device comprising a proxy and video conference bridge discussed herein may be able to determine the request is to an alias, allowing communications from unauthenticated clients to aliased extensions or the conference bridge while still providing security. In a further embodiment, a device receiving a request from an unauthenticated client to call an authenticated client may instead initiate a conference bridge for the first client and second client and map the requested URI to the conference bridge. Accordingly, the conference bridge may transparently serve as an intermediary between the unauthenticated first client and the second client. Any malicious attacks by the first client can be received and processed by advanced security policies and intrusion prevention services of the conference bridge and device, providing security to primitive clients such as VoIP phones that may not have security features. Thus, unlike typical systems which would merely reject unauthenticated requests, the methods and systems discussed herein may allow such requests safely through transparent bridging.

Figure 7A:
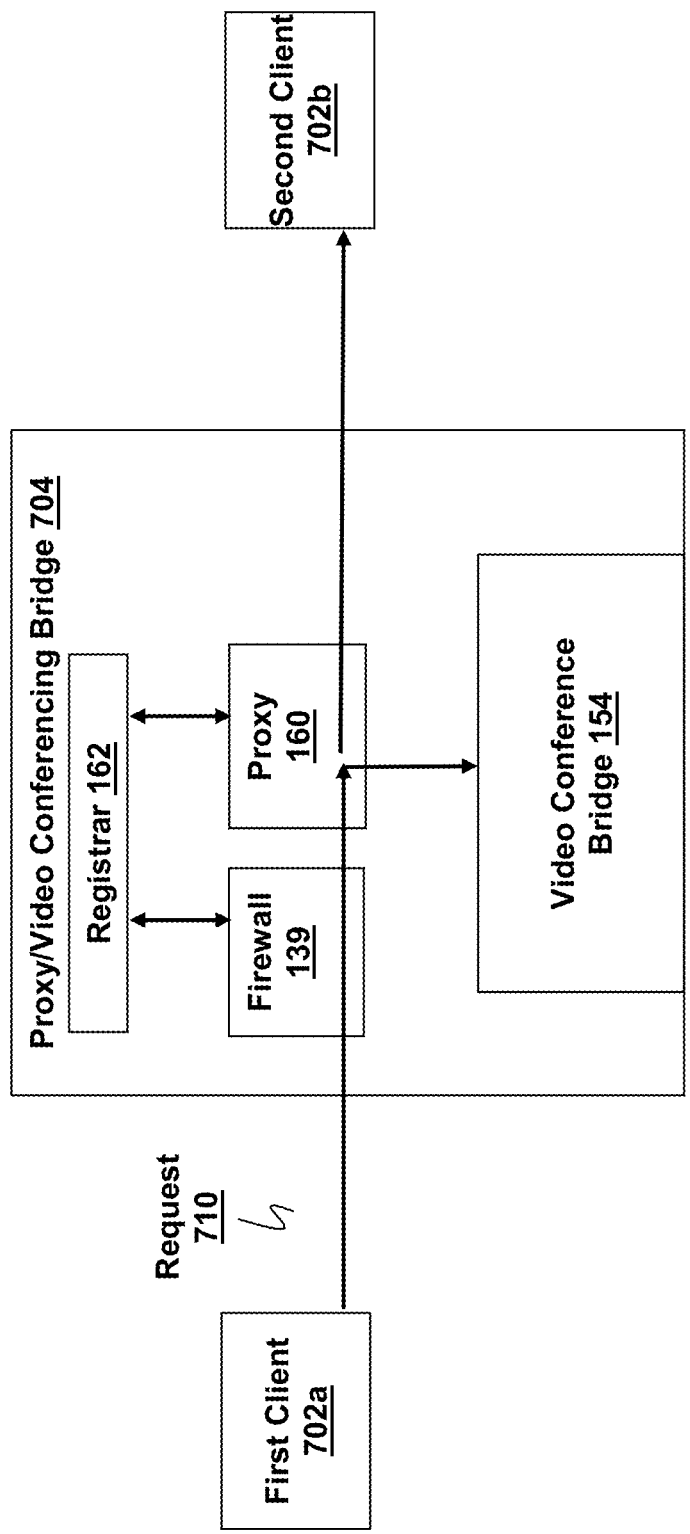
FIG. 7A is a block diagram of an embodiment of a system providing access to audio and video conferencing for unauthenticated clients via mapping of a uniform resource identifier to a conference session.

Illustrated in FIG. 7A is a block diagram of an embodiment of a system providing video conferencing to unauthenticated clients via mapping of a uniform resource identifier alias to a conference session. A proxy/video conferencing bridge 704 may comprise an audio/video conference bridge 154, a proxy 160, a registrar 162, and a firewall 139 and/or additional security modules, including filters, access control lists (e.g. whitelists or blacklists, for example). In some embodiments, the proxy/video conferencing bridge may comprise an authentication service for authenticating clients and/or users of clients. Such service may comprise a customer or client database, in some embodiments. In some embodiments, a first client 702*a* may transmit a call request 710. In one embodiment, the call request 710 may identify a URI of a second client 702*b*, while in another embodiment, the call request 710 may identify a URI of a conference session. In still other embodiments, the call request 710 may comprise a URI alias. A URI alias may comprise an identifier that may be mapped to a plurality of locations. For example, a desk telephone may have a unique ring number, but may also ring via an 800 number. Similarly, an extension may have a unique address for calls to the user of the extension, or be associated with a general address, such as "sales". In some embodiments, requests to this alias or general address may be directed to one or more extensions, and/or to a conference session provided by the audio/video conference bridge 154. In many embodiments, an alias may be indistinguishable from a URI address. Conventional proxies in receipt of such requests may simply forward the request to a registrar. However, where the requesting client is unauthenticated, conventional proxies may merely reject the request. The systems and methods discussed herein, by including both a proxy and registrar, may determine that a specified URI in a call request is an alias for one or more addresses and may forward the request properly, even if the requestor is unauthenticated.

Figure 7B:
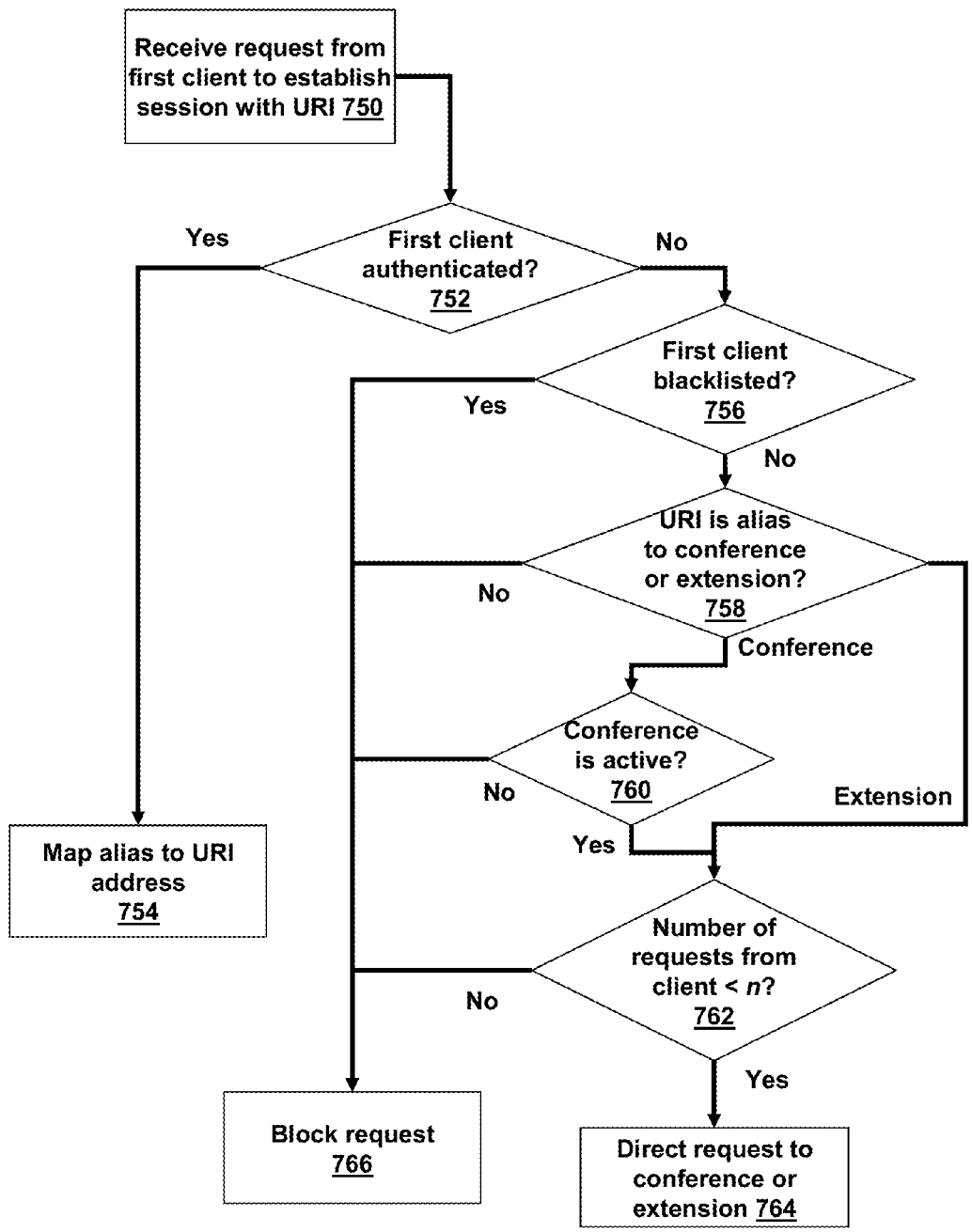
FIG. 7B is a flow chart of an embodiment of a method for providing access to audio and video conferencing for unauthenticated clients via mapping a uniform resource identifier to a conference session.

Referring now to FIG. 7B, illustrated is a flow chart of an embodiment of a method of providing audio/video conferencing to unauthenticated clients via mapping of a uniform resource identifier alias. At step 750, a single integrated device installed as an Ethernet adapter may receive a first SIP invite request from a first client. In some embodiments, the device may serve as a bridge between two networks, providing gateway, proxying, firewalling, or other services to clients on one network. Accordingly, one network may be referred to as internal, protected, or a LAN, and the other network may be referred to as external, unprotected, or a WAN. In a further embodiment, as discussed above, the device may comprise various internal services and applications, such as a conference bridge, which may be considered to be behind the firewall and thus on the internal or protected network. In some embodiments, the invite request may comprise a call request to a first URI. The URI may comprise a URI of a second client, a conference session, or an alias. Where the URI comprises an alias, the alias may be mapped by a registrar of the device to one or more endpoints or extensions and/or a conference session. As discussed above, in many embodiments, a URI alias may be indistinguishable from an extension-specific URI. In such embodiments, the device may determine that the URI comprises an alias by consulting a registrar of the device, a registration record cached in a cache of a proxy of the device, or other means. In many embodiments, such determination may be made at other points during the method, such as step 758, discussed below.

At step 752, the device may determine whether the first client has been authenticated. In one embodiment, determining the first client is not authenticated may comprise determining that the first client has not registered a client location with a SIP registrar of the device. In another embodiment, determining that the first client is not authenticated may comprise determining that a user of the first client has not provided authentication credentials. In still another embodiment, determining that the first client has not been authenticated may comprise determining that the first client lacks permission to register a client location. If the client is authenticated, then at step 754, the device may proxy the request normally. In one embodiment, the device may forward the request to an address corresponding to the URI. In another embodiment in which the request comprises an alias, the device may map the alias to one or more URI addresses, and may forward the request accordingly.

If the first client is not authenticated, then at step 756, the device may determine if the first client has been blacklisted or is in a deny list of an access control list. In one embodiment, a firewall of the device may make the determination in conjunction with an access control list. In some embodiments, the access control list may comprise a blacklist or deny list of users, clients, IP addresses, MAC addresses, or other identifiers of users or clients that should be prevented from unauthenticated access. In other embodiments, the access control list may comprise a whitelist or allow list of users or clients that should be allowed unauthenticated access, with all other users or clients being prevented. Accordingly, being blacklisted may refer either to being on a blacklist or deny list, or not being on a whitelist or allow list with a policy that blocks all users or clients not on said whitelist. In one embodiment, if the client is blacklisted or denied by the access control list, then at step 766, the device and/or firewall may block the request.

If the client is not blacklisted, then at step 758, the device may determine if the URI comprises an alias for a conference session and/or one or more extensions. In one embodiment, the device may consult a registration record for an address corresponding to the URI. In some embodiments, the registration record may explicitly identify the URI as an alias. In other embodiments, the registration record may implicitly identify the URI as an alias. In one such embodiment, if multiple addresses are found, then the URI may be an alias to the multiple addresses. For example, "sales@company.com" may be associated with addresses "1.2.3.4", "1.2.3.5", "1.2.3.6", indicating that multiple extensions should ring responsive to the call. In another example, one address may be associated with the URI, but the address may be an address or virtual address of the conference bridge or a session of the conference bridge. In such cases, in many embodiments, the URI may be considered to be an alias. In still another example, one address may be associated with the URI, but the address may be another URI. For example, "sales@company.com" may be associated with "bob@company.com", which is itself associated with address "1.2.3.4". In such embodiments, because "sales" is an alias, unauthenticated calls to "sales@company.com" may be allowed, while unauthenticated calls to "bob@company.com" may be rejected.

In some embodiments in which the URI is not an alias, then at step 766, the device, a proxy, or firewall of the device may block or reject the request. If the alias is mapped to a conference bridge or conference session, then at step 760, the device may determine if the conference is active. In some embodiments, the proxy may transmit a request to the conference bridge to determine if the conference session is active, while in other embodiments, the proxy may determine if other clients have established connections with the conference session. In one embodiment, if the conference session is inactive, then the request may be blocked at step 766. This may be done to prevent unauthenticated clients from initiating conference sessions, attempting to probe the conference bridge for active sessions, or initiate denial of service attacks.

If the conference is active, or if the URI is aliased to an extension, then in some embodiments, at step 762, the device may determine if the number of requests from the client is less than or equal to a predetermined threshold. This threshold may be used to allow requests from unauthenticated but benign clients, while preventing denial of service attacks or repeat calling from unauthenticated malicious clients. In some embodiments, the threshold may be over time, such as four requests per hour, or one request per second. If the number of requests exceeds the threshold, then at step 766, the request may be blocked.

If the request passes determinations 756-762, then at step 764, the device may direct the request to the extension(s) and/or conference session for which the URI is an alias. Although shown in one order, in many embodiments, determinations 756-762 may be made in other orders. In other embodiments, one or more determinations may be optional, or may be enabled or disabled according to a policy engine or administrator configuration. At step 766, in some embodiments, in addition to blocking the request, the device may add the first client to a blacklist. Similarly, in some embodiments, at step 764, the device may add the first client to a white list.

Accordingly, through the methods and systems discussed herein, requests from unauthenticated clients may be allowed to aliased addresses, while maintaining security for endpoint extensions.

F. Systems and Methods for Providing Communications Between Different Protocol-Using Endpoints In addition to providing security and many-to-many conference functionality, a single device comprising a proxy and video conference bridge may also be able to provide transparent translation for client devices using different communication protocols. For example, typically, a user of a client device with a first operating system, such as Apple iOS, may engage in real-time video conferencing only with users of clients with a similar operating system, or at least a system that uses the same protocol, such as H.264. Such users may be unable to engage in real-time video conferencing with users of Windows Mobile-based client devices using Windows Media protocols. However, the conference bridge and proxy systems discussed herein may serve as a bridge between incompatible protocol-using devices. In some embodiments, each device need not be modified or reconfigured, and may not even know that it is communicating with a device using a different protocol.

Figure 8A:
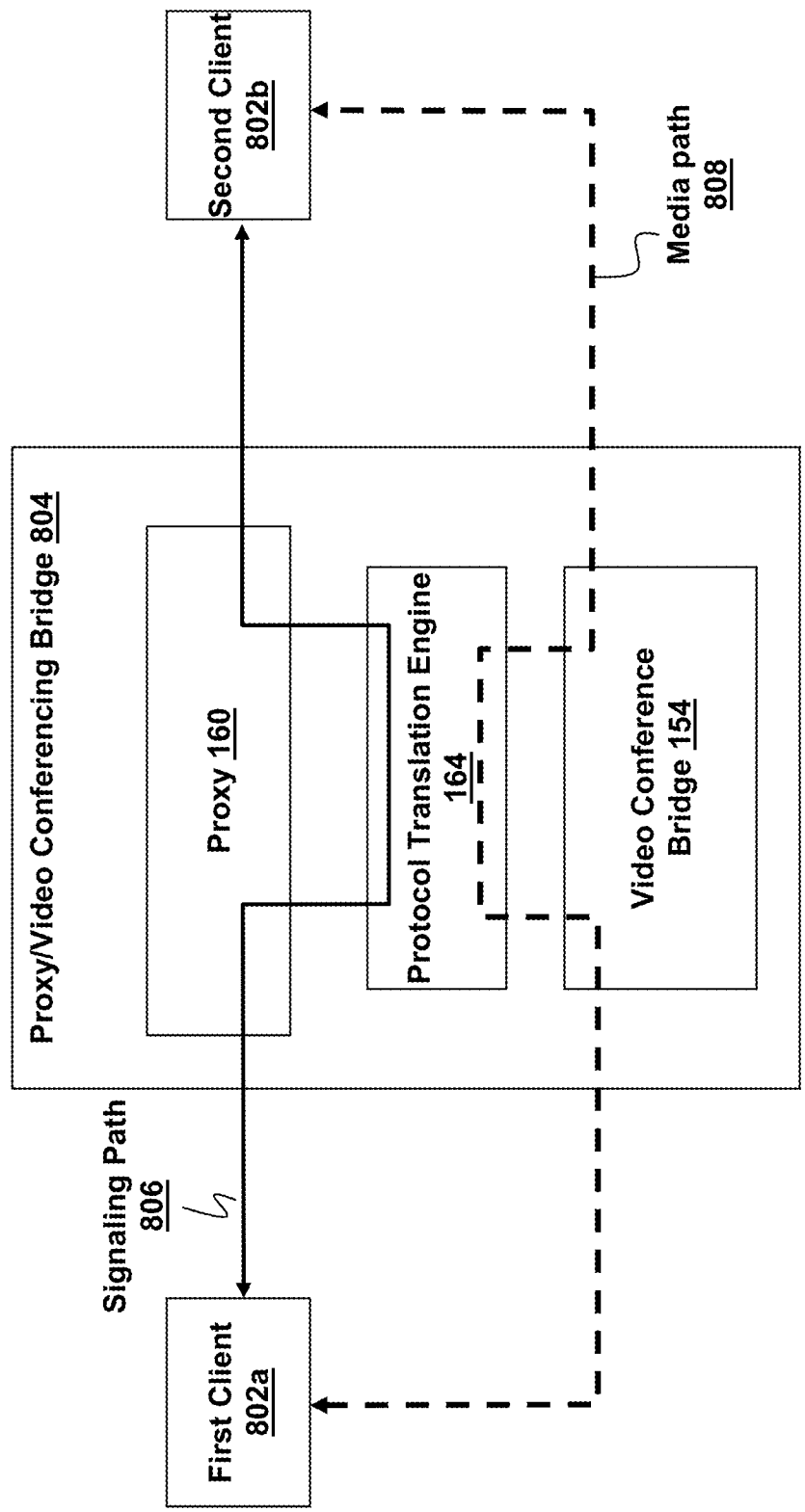
FIG. 8A is a block diagram of an embodiment of a system for providing communications between different protocol-using endpoints by a computing device establishing a video conference bridge.

Referring now to FIG. 8A, illustrated is a block diagram of an embodiment of a system for providing communications between different protocol-using endpoints by a computing device establishing a video conference bridge. Although discussed in terms of a video conference bridge, the systems and methods discussed herein may apply to audio or voice communications, screen casting, or any other media delivery system.

A gateway/video conference bridge 804 may comprise a proxy 160, a protocol translation engine 164, and a conference bridge 154. A first client 802a wishing to communicate with a second client 802b using an incompatible protocol may send a request to proxy 160 to establish a signaling communication session in a first protocol, such as SIP. In some embodiments, the request may identify or include a URI of the second client 802b. In one embodiment, the request may indicate that the second client uses a different protocol or identify the second protocol of the second client. In many embodiments, however, the request may not specify that the second client uses a different protocol. In some embodiments, the proxy 160 may determine that the second client uses a different protocol by retrieving a record from a registrar associated with the second client URI. For example, as discussed above, to identify an address for the second client, proxy 160 may retrieve a registration record from a registrar or location server. In some embodiments, the registration record may further identify a protocol of the client. For example, a registration record may comprise a client URI, a client address (and possibly a bridge address, as discussed above), and an identification of a signaling and/or real-time protocol used by the client. A protocol may be identified by name in a string or data field, or may be identified by code, flag, or other identification.

In some embodiments, the proxy 160 may pass a request in a first protocol to a protocol translation engine 164. The protocol translation engine 164 may translate the request in the first protocol into a second protocol of the second client, and may return the translated request to the proxy 160. In some embodiments, translating the request may comprise parsing the request to identify an address, a format, a URI, a unique identifier, an authentication token or cookie, user credentials, a command, or any other information. The translator may use the identified information to generate a corresponding request in the second protocol. In some embodiments, protocol translation engine 164 may be able to translate requests between any number of signaling protocols, such as H.323, H.324, SIP, XMPP, AIX, SCCP, or any other protocol. In some embodiments, protocol translation engine 164 may execute at one or more of the transport layer, session layer, presentation layer, or application layer.

Proxy 160 may transmit the translated request to the second client in the second protocol. In some embodiments, proxy 160 may receive a response or acknowledgment from the second client in the second protocol. Similar to the above process, proxy 160 may pass the response or acknowledgement to the translation engine 164, which may translate the response or acknowledgement into a protocol of the first client. Proxy 160 may then transmit the translated response or acknowledgement to the first client in the first signaling protocol. Thus, a signaling path 806 may be established between the client devices in their respective protocols.

Similarly, real-time protocol communications may be translated by protocol translation engine 164. In some embodiments, during establishment of a communication session between first client 802a and 802b, a second client may respond to an invite request of a first client with an address of the second client to be used for a real-time protocol communication, such as a UDP address and port number. If this address and port are returned to the first client, the first client will attempt to transmit a media stream to this address and port in a protocol of the first client. This may cause problems if the second client uses an incompatible protocol. Accordingly, using a process similar to providing a single intermediary point for security discussed above, proxy 160 may modify the response to identify an address of a conference bridge 154 as corresponding to the second client. The proxy 160 may transmit the modified response to the first client, causing the first client to transmit media data to the conference bridge, while believing it is transmitting data to the second client. The proxy 160 may also signal the conference bridge 154 to transmit a media stream to the second client at the identified address and port in the response from the second client. The second client may then believe this stream to be from the first client. Similarly, when the second client transmits a media stream in response to the first client, it will use the address of the conference bridge 154, believing the bridge to be the first client. The bridge 154 may then retransmit the stream to the first client, which the first client will believe was sent by the second client. Thus, the proxy/video conference bridge 804 may transparently act as an intermediary in the media path 808.

Furthermore, the conference bridge 154 may pass media received from each client to the protocol translation engine 164 for translation into a different protocol at the session, presentation, or application layers. For example, the protocol translation engine 164 may translate H.264 video data into Windows Media Video data, and vice versa. The translated data may be transmitted by the conference bridge 154 to each client in their native protocols, providing transparent and seamless communications between incompatible devices. Protocol translation engine may translate between any number of media protocols, including without limitation H.261, H.262, H.263, H.264, MPEG-1, MPEG-2, MPEG-4, QuickTime, AAC, Ogg, Windows Media Audio or Video, or any other type and form of media protocol.

Figure 8B:
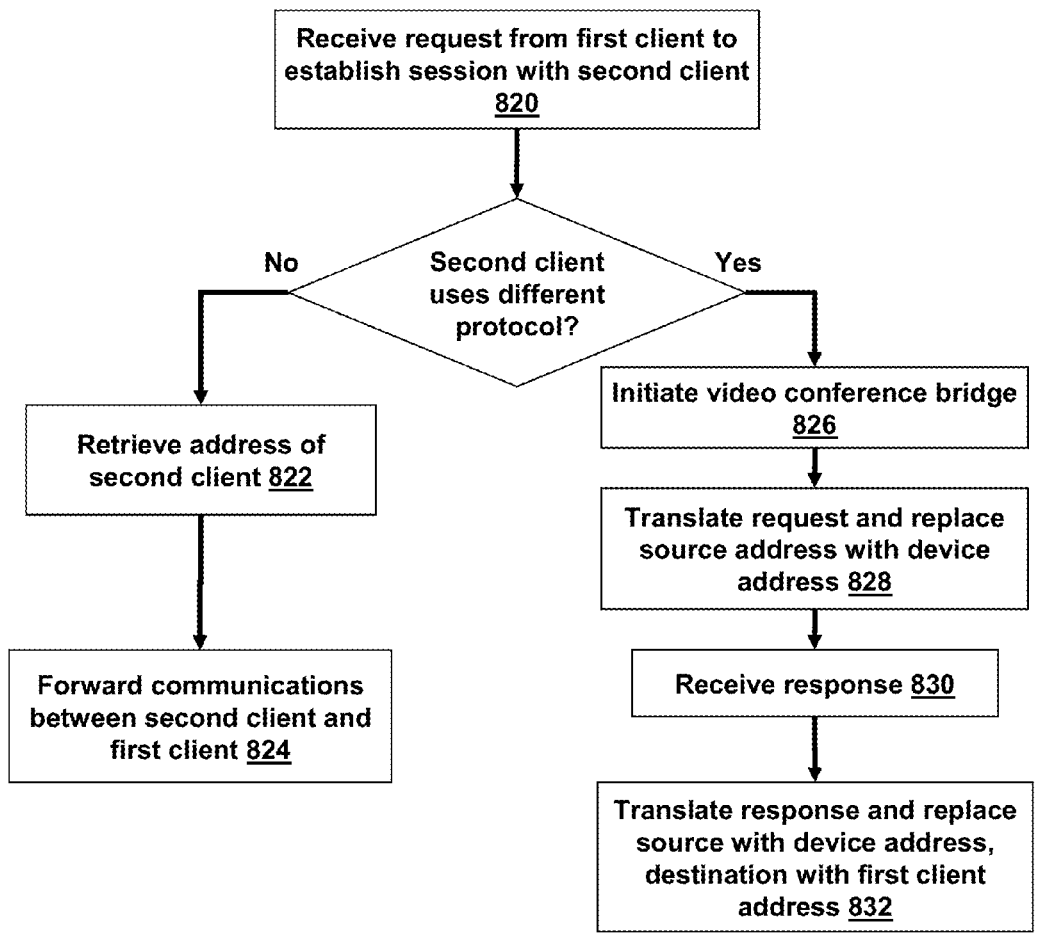
FIG. 8B is a flow chart of an embodiment of a method for providing communications between different protocol-using endpoints by a computing device establishing a video conference bridge.

Referring now to FIG. 8B, illustrated is a flow chart of an embodiment of a method for providing communications between different protocol-using endpoints by a computing device establishing a video conference bridge. At step 820, a device may receive a request from a first client to establish a session with a second client. The request may be in a first protocol, such as SIP, and may identify the second client by a URI or other identifier.

In some embodiments, the device may determine that the second client utilizes the same or a compatible protocol as the first client. For example, in one embodiment, the device may retrieve a registration record associated with the URI of the second client. The registration record may identify a protocol of the second client, and the device may determine that the second client and first client use the same protocol. If so, at step 822, the device may retrieve an address of the second client. In many embodiments, the registration record may comprise the address of the second client, and the device may retrieve the address from the registration record associated with the second client URI. At step 824, the device may forward communications between the second client and first client to establish the communication session.

In some embodiments, the device may determine that the first client and second client utilize different protocols. For example, in one embodiment, the device may retrieve a registration record associated with the URI of the second client. The registration record may identify a second protocol used by the second client, and the device may determine that the second protocol is different than the first protocol, such as IAX. If the second client uses a different protocol than is used by the first client, at step 826, the device may initiate a conference bridge to be used by the first client and the second client. Initiating a conference bridge may comprise signaling a conference bridge application to initiate a conference session and/or open listening ports for real-time protocol communications of the first client and second client.

At step 828, the device may translate the request from the first client in the first protocol into a second protocol. In some embodiments, translating the request may comprise passing the request to a protocol translation engine, which may translate the request into the second protocol. In many embodiments, the device may modify the request to replace a source address of the first client with an address of the device. For example, in one embodiment, the device may replace a source address of the first client for a signaling protocol with a proxy address of the device. In another embodiment, the device may replace a real-time protocol address of the first client with an address of the conference bridge. In some embodiments in which the proxy typically acts as an intermediary in the signaling path, the device may not need to replace a source address of the first client for requests of the signaling protocol. The device may transmit the translated and/or modified response to the second device, in the second protocol.

At step 830, in some embodiments, the device may receive a response and/or acknowledgement from the second client. In some embodiments, the response may comprise an address of the second client to which the first client should send real-time protocol communications. As discussed above, in many embodiments, at step 832, the proxy may replace the address of the second client in the response with an address of the device, such as an address of the conference bridge. In some embodiments, the proxy may translate the response into a first protocol of the first device, and may transmit the response to the first client. Upon receipt, the first client may transmit real-time protocol data to the conference bridge, believing it is sending data to the second client. In many embodiments, the conference bridge or translation engine may translate the data, and the device may transmit the translated data to the second client in the second protocol. Accordingly, the first and second client may be able to communicate in their native, incompatible protocols, agnostic to the proxying and translation of the communications.

In one exemplary embodiment, the transcoding or translation systems and methods discussed herein may be used to provide VoIP service, transparent connection to a PBX or PSTN system, or video conferencing for devices lacking inherent capabilities. For example, some devices, such as the range of BlackBerry smart phones manufactured by Research in Motion, Ltd. of Ontario, Canada, include highly computationally-intense codecs such as the Adaptive Multi-Rate (AMR) voice codec typically used in GSM networks. As these codecs may require significant amounts of processing time, hardware acceleration may be used to offload processing from the primary CPU. However, in many embodiments, third-party developers or service providers may not be provided access to such hardware acceleration, or hardware acceleration may not be provided for every codec desired. Accordingly, it may be difficult for developers and service providers to integrate such devices into VoIP networks utilizing other codecs.

For example, in some instances, a developer may attempt to perform non-AMR codec transcoding on the device, such that the device may process packets in a native format for the VoIP network. However, lacking hardware acceleration support for said non-AMR codecs, the developer must instead use the primary CPU of the device, typically resulting in reduced battery life, inferior audio quality, jitter, delays, etc.

Accordingly, in one embodiment, the systems and methods discussed herein may be utilized to provide transparent transcoding for devices, such as those with AMR codecs, to connect via an internet protocol network to a PBX or PSTN system. In another embodiment, native video decoding capabilities on the device may be utilized to provide video conferencing capabilities. For example, BlackBerry devices may include support for H.264 video for streaming movies on demand via content providers. Native decoders may be used for video conferencing, with video conferencing modules such as those discussed herein transcoding communications into such native formats as necessary.

G. Systems and Methods for Parallel Processing of Video and Audio Portions of Video and Audio Conference Stream Referring now to FIGS. 9A and 9B, systems and methods for multiple processor processing of video and audio portions of a video and conference streams are depicted. The integrated device 100 installed as an Ethernet adapter on a computing device provides offloading of video processing of the video and audio conference stream from the CPU of the computing device. In some aspects, the integrated device actions effectively turns the computing device into a dual or multi-processor device in which the CPU of the computing device processes the audio portion of the video and audio conference stream while the processor of the integrated device processed the video portion of the video and audio conference stream. The integrated device seamlessly and transparently offloads the taxing processing of the video from the CPU of the computing device to the integrated device installed as an Ethernet adapter on the computing device. This provides more efficient use of the CPU to handle the audio portion of the video and audio conference and execute any applications such as a video conference application 154'.

Figure 9A:
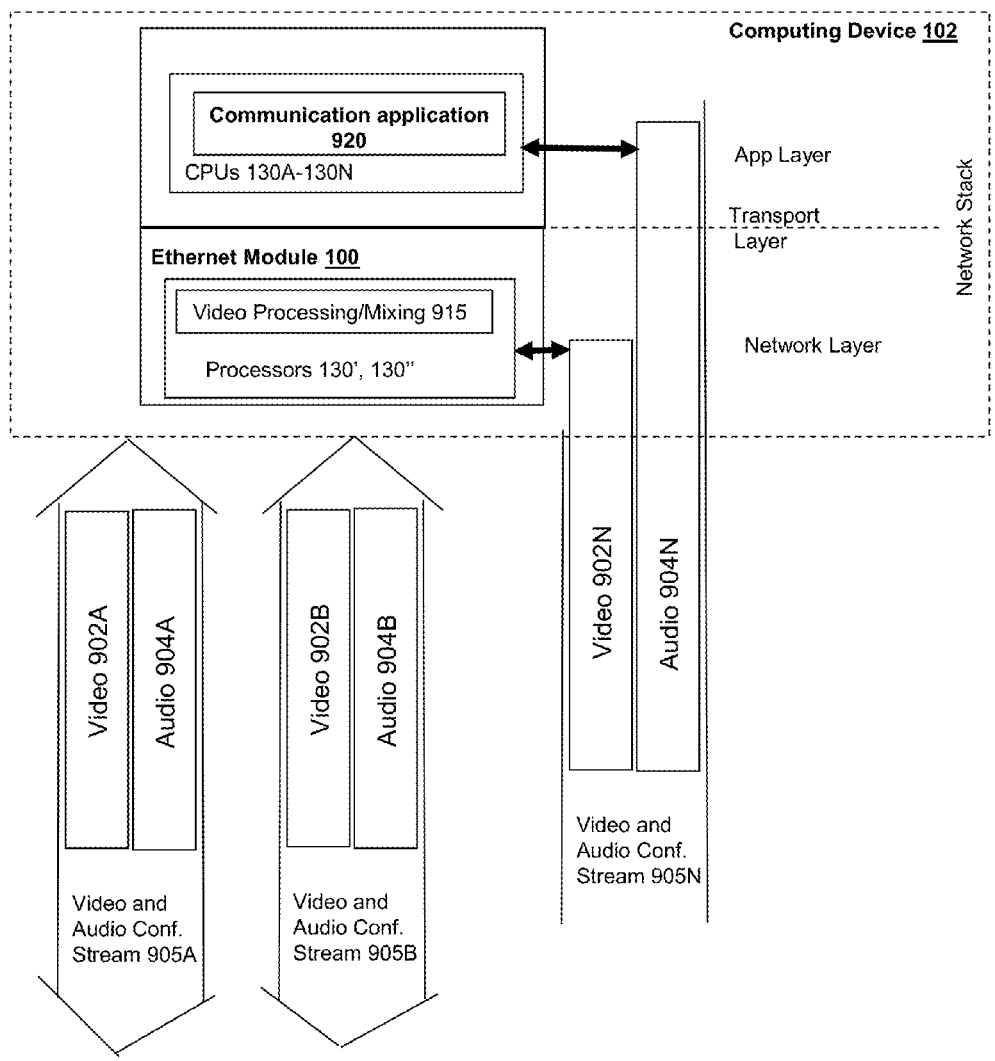
FIG. 9A is an embodiment of a system for offloading video processing of video and audio conference to integrated device installed as an Ethernet adapter.

Referring now to FIG. 9A, a system for multiple processor processing of video and audio portions of a video and conference streams is depicted. In brief overview, a computing device 102 comprises an embodiment of the integrated device 100 installed as an Ethernet adapter. The computing device may have one or more CPUs 130A-130N to execute one or more applications, such a communication application 920. The integrated device 100 may comprise one or more processors 120'-130" to execute any one or more video processing and/or mixing functionality 915. Via a network, the computing device 102 may receive a plurality of video and audio conference streams 905A-905N, each comprising a video portion 902A-902N and an audio portion 904A-904N. These video and audio conference streams may be destined for, associated with or part of a video and audio conference established via the communication appliance 920. The integrated device 100 may intercept the video portion of the video and audio conference at a layer below the transport layer of the network stack, such as the network layer. The video processing 915 of the processor 130' of the integrated device may process the intercepted video stream and transmit the processed video portion via the Ethernet adapter of the integrated device. The audio portion of the video and audio conference may be passed up or continue up the network stack to the application layer of the network stack. The communication application executing on the CPU 130 of the computing device may process the received audio portion corresponding to the video portion of the video and audio conference stream. The communication application may transmit the processed audio portion via the network stack and the Ethernet adapter of the integrated device.

In further detail, the computing device 102 may comprise any one or more types and forms of processors 130A-130N. In some embodiments, the computing device is a single processor. In some embodiments, the computing device is a dual processor. In some embodiments, the computing device is a quad processor. In some embodiments, the computing device has any number of processors. In some embodiments, the processor 130 of the computing device may comprise a core of a multi-core processor system. In some embodiments, each of the plurality of processors 130 of the computing device may comprise a core of a multi-core processor system. Each core or processor may execute one or more communication applications 920.

The integrated device 100 may comprise any one or more types and forms of processors. In some embodiments, the integrated device is a single processor. In some embodiments, the integrated device is a dual processor. In some embodiments, the integrated device is a quad processor. In some embodiments, the integrated device has any number of processors. In some embodiments, the processor of the integrated device may comprise a core of a multi-core processor system. In some embodiments, each of the plurality of processors 130 of the integrated device may comprise a core of a multi-core processor system. Each core or processor may execute one or more video processing and/or mixing applications 915.

The communication application may comprise an application, program, library, service, process, task or any type and form of executable instructions executable on one or more processors of the computing device. The communication application may be designed and constructed to process the audio portion of the video and audio conference stream. The communication application may be designed and constructed to decode and/or encode the audio portion 904 of a video and audio conference stream 905. The communication application may be designed and constructed to mix audio from a plurality of audio portions 904 of a plurality of video and audio conference streams 905. The communication application may be designed and constructed to perform any of the functions, operations and techniques of audio processing described herein.

The communication application may be designed and constructed to receive and transmit audio communications. The communication application may be designed and constructed to receive and transmit text-based communications, such as texting, email or instant messaging. The communication application may be designed and constructed to receive and transmit video communications. The communication application may be designed and constructed to receive and transmit video and audio communications. The communication application may be designed and constructed to receive and transmit video, audio and text-based communications. The communication application may comprise any embodiments of the video conference application 154, 154' described herein.

The communication application may generate any portions of the video and audio conference streams 905A-905N (generally referred to as 905) and transmit via the Ethernet adapter the stream via a network. The communication application may receive any audio portions of the video and audio conference streams 905. The communication application may receive any video portions of the video and audio conference streams 905. The computing device 102 and/or integrated device 100 may receive any of the video and audio conference streams 905 via the network, such as via the Ethernet adapter 100. The communication application may receive any of the video and audio conference streams 905 from any type and form of client or end point device, such as any embodiment of such device (108, 110, 112 and 114) described in connection with FIG. 1C.

The video processing and mixing application 915 may comprise an application, program, library, service, process, media processing device, task or any type and form of executable instructions executable on one or more processors of the integrated device. The video processing and mixing application 915 may be designed and constructed to process the video portion 902 of the video and audio conference stream 905. The video processing and mixing application 915 may be designed and constructed to decode and/or encode the video portion 902 of a video and audio conference stream 905. The video processing and mixing application 915 may be designed and constructed to mix video from a plurality of video portion 902 of a plurality of video and audio conference streams 905. The video processing and mixing application 915 may be designed and constructed to perform any of the functions, operations and techniques of video processing described herein.

The video processing and mixing application 915 may include any embodiments of one or more of the following described in connection with FIG. 1D: video conference application 154, web server 158, SIP stack 160, SIP registrar 162 and protocol translation engine 164. The video processing and mixing 915 may comprise any embodiments of the video mixer 206 described in connection with FIG. 2 or the video mixer 300 describe in connection with FIGS. 3A-3B. The video processing and mixing 915 may comprise any embodiments of the mixer 424 described in connection with 4B. The video processing and mixing 915 may comprise any embodiments of the proxy/video conference bridge described herein.

In some embodiments, each of the video and audio conference streams 905 may comprise the same protocols. In some embodiments, each of the video and audio conference streams 905 may comprise different protocols. In some embodiments, some of the video and audio conference streams 905 may comprise the same protocols while other video and audio conference streams 905 comprise different protocols. In some embodiments, each of the video and audio conference streams are communicated or generated from different types of applications and/or devices. In some embodiments, some of the video and audio conference streams are communicated or generated from the same types of applications and/or devices while other video and audio conference streams are communicated or generated from different types of applications and/or devices.

The video and audio streams may comprise a video portion 902 and an audio portion 904. The audio portion 905 may correspond or provide the audio for the video portion 902. In some embodiments, video and audio streams may comprise data, such as from text-based communications, control commands, etc. In some embodiments, the audio portion may be constructed or carried via one or more audio protocols while the video portion may be constructed or carried via one or more video protocols. In some embodiments, the audio portions and video portions are constructed and carried via the same media protocols. In some embodiments, the video and audio stream comprises channels. One channel may carry or communicate audio portions of the streams while another channel may carry or communicate the video portion of the streams. In some embodiments, the video and audio streams may comprise one stream for the audio and another stream for the video.

The integrated device may operate at any layer at and/or below the transport layer of the network stack. The integrated device may provide an interface between the transport layer and the application layer of the network stack. The integrated device may intercept packets at any layer at or below the transport layer, such as media control layer and process any payloads of portions of the intercepted packet. The integrated device may generate or constructs packets at any layer at or below the transport layer, such as media control layer and transmit any such packets. The communication application executing on the CPU of the computing device may operate at any layer at and/or above the transport layer of the network stack. The communication application executing on the CPU may communicate via any type and form of sockets library via the transport layer of the network stack. The communication application may receive application layer payloads communicated via transport layer protocols. The communication application may generate application layer payloads to be communicated via transport layer protocols.

In operation, the computing device receives a video and audio conference stream 905, such as via a port of the Ethernet adapter connected to a network. The integrated device intercepts the video portion 902 of the video and audio conference stream 905 at a layer below the transport layer, such as a network layer or media control layer. The processor(s) of the integrated device processes the intercepted video portion. The audio portion of the video and audio conference stream passes up the network stack to the application layer. The communication application 920 executing on the CPU of the computing device receives and processes the audio portion via the application layer, such as via application layer payload of a transport layer protocol packet(s). As the video portion of the video and audio conference stream is processed by the audio/video processor of the integrated device, the corresponding audio portion of the video and audio conference stream is processed by the CPU of the computing device. Upon processing each of the audio and video portions, as the processor of the integrated device transmits the processed video portion on the network via the network interface of the integrated device, the CPU of the computing device transmits the audio portion via the network stack and onto the network via the Ethernet adapter and network interface of the integrated device.

Figure 9B:
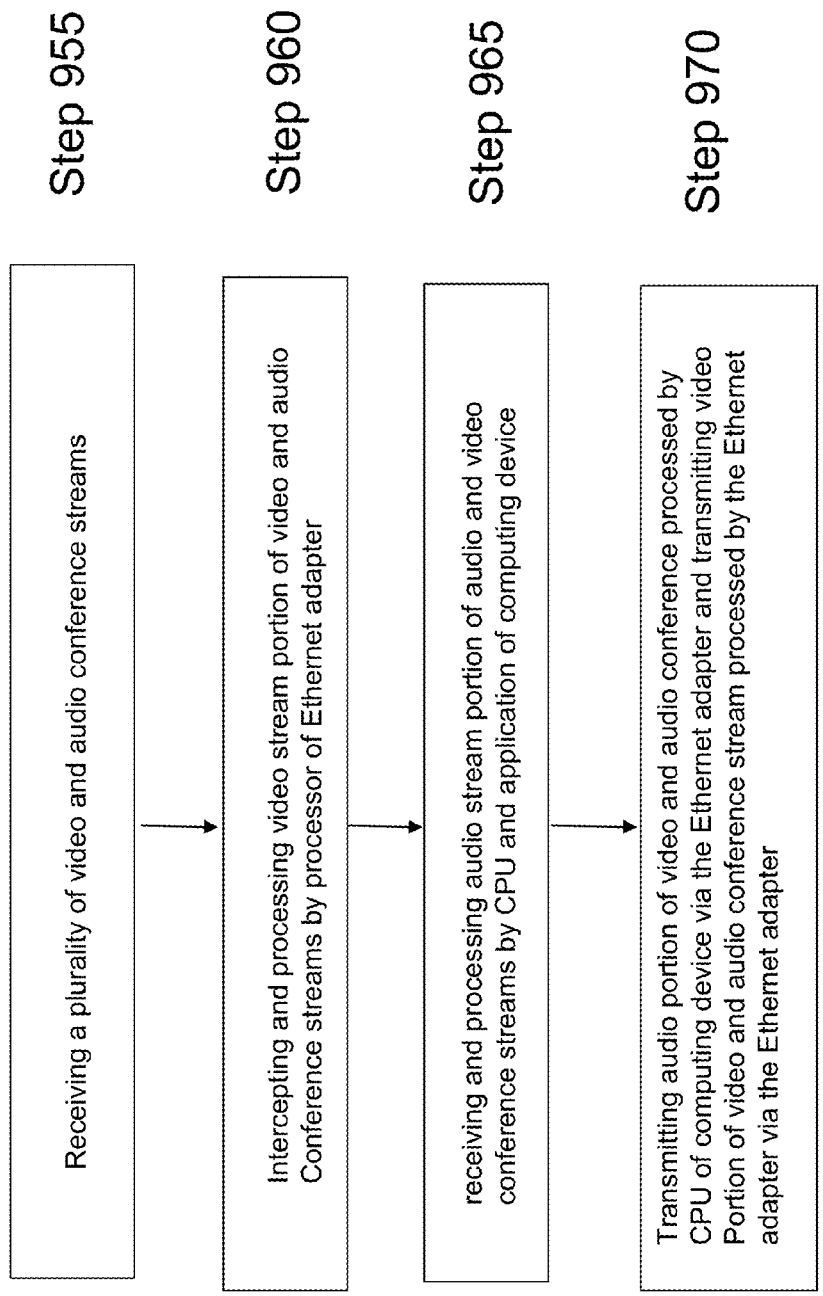
FIG. 9B is an embodiment of a method for offloading video processing of video and audio conference to integrated device installed as an Ethernet adapter.

Referring now to FIG. 9B, a method for multiple processor processing of video and audio portions of a video and conference streams is depicted. In brief overview, at step 955, the computing device, including the integrated device, receives a plurality of video and audio conference streams. At step 960, the processor of the integrated device intercepts and processes the video portion of each video and audio conference stream while at step 965, the communication application executing on the CPU of the computing device receives and processes the audio portion of each video and audio conference stream. At step 970, the audio portion processed by the communication application executing on the CPU of the computing device is transmitted onto the network via the network stack and Ethernet adapter and network interface of the integrated device while the integrated device transmits the processed video portion onto the network via its network interface.

In further details, at step 955, the computing device, which includes the integrated device, may receive any one or more video and audio conference streams. The computing device may receive a plurality of video and audio conference streams for one video conference hosted, managed or facilitated via the computing device. The computing device may receive a plurality of video and audio conference streams for a plurality of video conferences hosted, managed or facilitated via the computing device. The computing device may receive a plurality of video and audio conference streams from a plurality of different users and/or devices. For each participant in the video and audio conference, the computing device and integrated device may establish such as conference using different media and/or signaling protocols for each participant as described elsewhere herein. The computing device may receive each of the plurality of video and audio conference streams comprising different protocols.

Although steps 960 and 965 may be for discussion purposes identified and/or described as separate steps, each of these steps may be considered the same step, combined into a single step and/or otherwise be considered to be performed concurrently.

At step 960, the integrated device intercepts video portions of each of the plurality of video and audio conference streams traversing the portion of the network stacked provided by the Ethernet adapter of the integrated device. As previously described herein, the media controller of the integrated device may intercept packets at any layer at or below the transport layer, such as the media access control layer. In some embodiments, the media controller detects whether or not a packet traversing the network stack identifies or comprises a video portion. In some embodiments, the media controller detects whether or not a packet traversing the network stack identifies or comprises a protocol for communicating video media, such as a real time protocol payload for a UDP packet. In some embodiments, the media controller detects whether or not a packet traversing the network stack identifies or comprises media such as video. Upon detection, the media controller may intercept the packet and provide to the video processing and mixing 915 functionality executing on one or more processors of the integrated device. In some embodiments, the media controller intercepts the packet and performs the detection. If the media controller detects that the packet comprises video communication, the media controller retains the packet and passes onto the processor of the integrated device. If the media controller detects that the packet does not comprise video communication, the media controller may pass the packet up the network stack. In some embodiments, the driver processes a copy of the video portion of the packet and forward the original packet up the stack.

The video processing and mixing 915 functionality executing on one or more audio/video processors of the integrated device obtains the intercepted packet(s) and process the video portion in accordance with the desired video and/or conferencing functionality, such as any of the video conferencing, bridging, proxying and mixing embodiments described herein. The processor of the integrated device performs this processing transparently and seamlessly separate from the CPU of the computing device. The processor of the integrated device performs this processing while the audio portions of the same video and audio conference stream are passed up the network stack and processed at the application layer by the communication application executing on the CPU of the computing device.

At step 965, a communication application executing on one or more processors of the computing receives audio portions of each of the plurality of video and audio conference streams. The communication application may receive application layer payload passed up the network stack via the transport layer packets and protocols. The communication application may not receive any of the video portions corresponding to the audio portions of the same video and audio conference streams. In some embodiments, the communication application may receive information, such as meta-data, about the video portion corresponding to the audio portion of the same video and audio conference stream. In some embodiments, the communication application may receive the video portion corresponding to the audio portion of the same video and audio conference stream.

The communication application executing on one or more processors of the computing device receives and process the audio portion in accordance with the desired audio and/or conferencing functionality, such as any of the audio related functions for the video conferencing, bridging, proxying and mixing embodiments described herein. The processor of the computing device performs this processing transparently and seamlessly separate from the processor of the integrated device. The processor of the computing device performs this processing while the video portions of the same video and audio conference stream are intercepted at a lower layer in the network by the integrated device and processed by the video processing functionality executing on the processor of the integrated device.

At step 970, the computing device, including the integrated device, transmits the processed video and audio portions of the video and audio conference stream. Upon completion of processing of an audio portion of a video and audio conference stream, the communication application executing on the processor of the computing device may transmit, or cause to be transmitted, the processed audio portion via the network stack and the Ethernet adapter of the integrated device onto the network. Upon completion of processing of a video portion of a video and audio conference stream, the video processing executing on the processor of the integrated device may transmit, or cause to be transmitted, the processed video portion via the network stack and the Ethernet adapter of the integrated device onto the network.

The communication application executing on the processor of the computing device may transmit, or cause to be transmitted, the processed audio portion concurrently with the corresponding video portion being transmitted by the processor of the integrated device. The processing functionality executing on the processor of the integrated device may transmit, or cause to be transmitted, the processed video portion concurrently with the corresponding audio portion being transmitted by the processor of the computing device. In some embodiments, the processor of the computing device and the processor of the integrated device communicate their respective portions of the video and audio stream in a synchronized manner. In some embodiments, the processor of the computing device and/or the processor of the integrated device may use meta-data of the video and audio conference stream, such as about temporal information of frames of the video and audio conference stream, for synchronization.

In some embodiments, the processor of the computing device and the processor of the integrated device communicate their respective portions of the video and audio stream in real-time without predetermined synchronization. In these embodiments, the respective portions of the video and audio stream may be relatively, closely or nearly synchronized based on any latency or processing speeds of the respective processors of the computing device and the integrated device.

Although generally described above as a single processor of the CPU and a singled processor of the integrated device, embodiments of these methods may be performed by a multi-processor or multi-core computing device and/or a multiple processor and/or multi-core integrated device. Each processor and/or core of the computing device and integrated device respectively may process video and audio portions of a plurality of video and audio conference streams from a plurality of different end-points and participants for a plurality of different video/audio conferences.

Although generally described above as concurrent processing of respective video and audio portions of video and audio conference streams by the processor of the computing device and the processor of the integrated device, the systems and methods described herein may be used generally to off-load video processing of a video stream to the integrated device while the processor of the computing device performs or processes other functionality which may not be related to or be part of the video conference stream.

H. Systems and Methods for Integrating Video from External Video Producing Device into Video Conference Referring now to FIGS. 10A and 10B, systems and methods for integrating or providing video from an external video producing device into a video conference are depicted. As previously described herein in various embodiments, the integrated device may seamlessly establish and provide a video conference between a plurality of participant on different devices using different communication applications and using different protocols. In further embodiments, the integrated device may seamlessly integrated video from an external video producing device, such as a closed caption television, security camera, television or digital video recording, into the video conference. The integrated device may mix the video from such external video produce devices into the video conference much like the external video producing device was a participant in the video conference. As part of establishing a video conference between participants or on demand or per request during an established video conference, embodiments of the present solution may integrate a video stream from an external video device into the video conference streams transmitted to any or each of the participants.

Figure 10A:
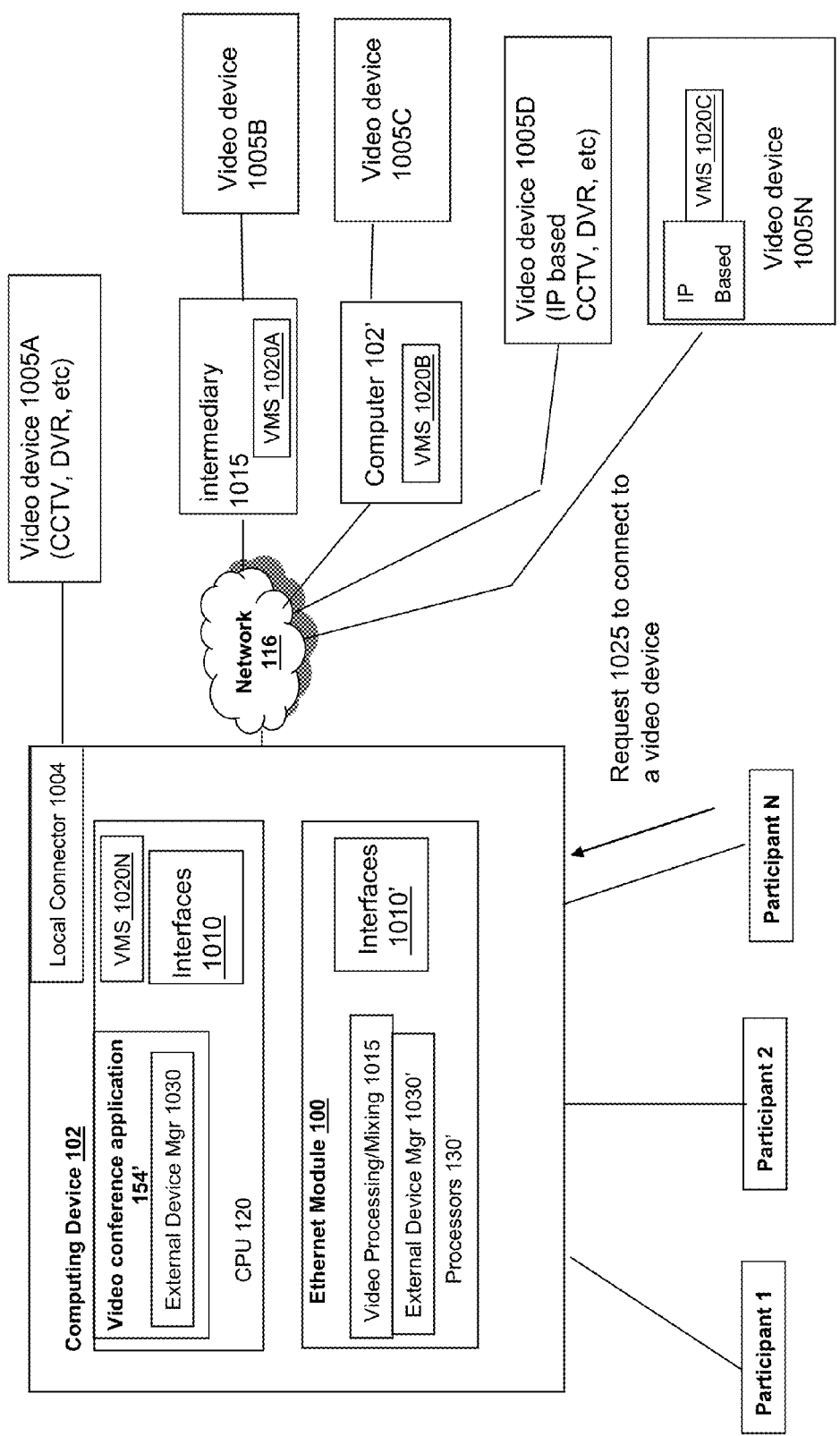
FIG. 10A is an embodiment of a system for mixing video from external video device into video conference provided by integrated device installed as an Ethernet adapter.

Referring to FIG. 10A, an embodiment of a system for integrating or providing video from an external video producing device into a video conference is depicted. In brief overview, any embodiments of the integrated module described herein may be deployed or installed as an Ethernet adapter in a computing device 102. The computing device may be connected to or in communication with a plurality of video devices 1005A-1005N (generally referred to as video device 905). In some embodiments, the video device may be connected to the computing device locally via a local connector 1004. In some embodiments, a video device may be connected over the network 116 to the computing device and/or integrated device. In some cases, the video device 1005N may be IP based and able to communicate via IP communications to the computing device and/or integrated device. In some cases, the video device 1005C may be connected to a second computing device 102' that provides an IP based communication interface via the network 116. In some cases, an intermediary device, such as an appliance, 1015 may be used to provide IP capabilities to a video device 1005B. Any of the computing devices 102, 102', intermediary 1016 or video device may include video management software (VMS) 1020A-1020N (generally referred to as 1020) to provide video encoding, streaming, processing and management functionality and operations with respect to any one or more of the video devices. The video via the VMS or otherwise may produce a video stream. In some embodiments, as discussed above, a video device 1005A such as a CCTV may connect via a first interface directly to the computing device, while a similar video device 1005D such as an IP-based CCTV may connect via a network connection to the computing device.

In further overview, the computing device and/or integrated device may comprise interfaces 1010, 1010' (generally referred to as 1010) to interface, integrate, connect or communicate to the external video device or to otherwise receive a video stream generated or provide by the external video device. External device mgmt application or manager 1030, 1030' (generally referred to as 1030) may operate on the computing device and/or integrated device to receive requests 1025 to connect to or include the video device in a video conference with one or more participants (e.g., participants 1 through participants N). The external device manager 1030 may use interfaces 1010 to connect to video devices 1005 and to receive video streams from such devices. The video processing/mixing functionality 1015 of the integrated device may intercept and mix the video stream from the video device 1005 into a mixed video stream that is transmitted to one or more of the participants.

In further detail, the video device 1005 may comprise an independent, automated and/or intelligent video producing system. In some embodiments, the video device may comprise a closed caption television device. In some embodiments, the video device may comprise a digital video recorder (DVR) device. In some embodiments, the video device may comprise a security system. In some embodiments, the video device may be part of a home automation system. In some embodiments, the video device may comprise a broadcasting device, such as a television or cable set top box. In some embodiments, the video device may comprise a web, network or Internet based server or site, such as YouTube or Google. In some embodiments, the video device may comprise a streaming server or device. In some embodiments, the video device may comprise a video camera or recorder. In some embodiments, the video device may comprise an X10 based device. In some embodiments, the video device may comprise a remote viewing device, such as video, web or security camera places in a remote location, public or private location. In some embodiments, the video device may comprise a network enabled device. In some embodiments, the video device may comprise a smart phone capable of capturing and presenting video or otherwise playing video. In some embodiments, the video device may comprise a gaming console, such as Xbox, PS3 or Wii. In some embodiments, the video device may comprise a portable gaming device, such as Nintendo GameBoy, Portable PS3, etc. In some embodiments, the video device may include any embodiments of a computing device 102 described herein.

The video device may be connected to the computing device or integrated device via either local or remote connectivity. In some embodiments, the video device is connected to the computing device or integrated device via a local connector 1004. The local connector 1004 may be designed and constructed to support any connector to the video device and a corresponding connector of the computing device or integrated device. The local connector may include any embodiments of the I/O control 178 described in connection with FIG. 1E. The local connector may include any embodiments of the I/O port and/or I/O devices 168a-b described in connection with FIG. 1F. The local connector may include any embodiments of network interface 142 described in connection with FIG. 1E. The local connector may be any type and form of USB based connector. The local connector may be any type and form of fire-wire based connector. The local connector may be any type and form of serial port based connector. The local connector may be any type and form of Ethernet based connector. The local connector may be any type and form of coaxial cable connector. The local connector may be any type and form of wireless based network connector. The local connector may be any type and form of Bluetooth based connector. The local connector may be any type and form of connector or module for X10 based communications.

The video device may be connected to or in communications with the computing device or integrated device via a network 116. The video device may be an IP or network based device that is recognized as a unique IP address on a network. The video device may be an IP or network based device that sends and receives IP based communications. The video device may comprise an operating system, program, application, kernel or firmware for providing and executing IP based communications on a network. The video device may be a server, such as a web server or streaming media server. The video device may be designed and constructed to communicate using X10 based protocols.

The video device may not be IP or network enabled. In some embodiments, the video device is connected to, integrated with or in communication with another device that provides IP capabilities or otherwise enables an interface to the video device using IP based communications. In some embodiments, a video device, such as video device 1005C is connected to a computing device 102', such as using a local connector. The video device 1005C and computing device 102' may communicate using any interface, APIs or local integration techniques. The video device 1005C and computing device 102' may communicate or interface using proprietary protocols and communication interfaces. The computing device, such as VMS 1020, may provide for streaming of video from the video device via the network. In some embodiments, an intermediary device 1015 may be a device designed and constructed to provide IP and video streaming capabilities to a video device 1005B that does not have such capabilities. For example, the intermediary device may be an appliance with a local connector to the video device 1005 and a network interface to the network 116. The intermediary device may include VMS for encoding, processing and streaming video produced, stored or generated by the video device.

The VMS 1020 may comprise an application, program, library, service, process, task or any type and form of executable instructions executable on one or more processors, such as the processors of the computing device or integrated device. The VMS may comprise any functions, operations or logic for the management of video, including but not limited to encoding, decoding, transmitting and/or streaming video.

The VMS may comprise any type and form of video server. The VMS may comprise any type and form of media server. The VMS may comprise any type and form of encoding, compressing and transmitting of video and/or audio via a network. The VMS may include, establish or interface to a SIP stack. The VMS may be designed and constructed to process and/or communicating using any signaling or session protocols. The VMS may include, establish or interface to a SIP stack. The VMS may be designed and constructed to process and/or communicating using any media protocols, such as a real-time protocol.

The interfaces 1010 which may operate on the computing device and/or the integrated device may be designed and constructed to interface with any of the video devices, either via a local connector, via the network, via an intermediary or another computing device. The interfaces may be designed and constructed to communicate to a video device using a protocol understood and supported by the video device. The interfaces may be designed and constructed to communicate to a video device via a type and form of connection supported by and connectable to the video device. The interfaces may be designed and constructed to establish a session or connection with the video device. The interfaces may be designed and constructed to call the video device. The interfaces may be designed and constructed to send a command, request, or API call to the video device. The interfaces may be designed and constructed to receive a response to a command, request, or API call to the video device. The interfaces may be designed and constructed to receive a video stream of the video device. The interfaces may be designed and constructed to send media control commands, such as play, pause, stop, rewind or forward to the video device in connection with a video. The interfaces may be designed and constructed to provide an interface or API to any application, program or executable instructions of the computing device and/or integrated device to access the video device and videos produced, transmitted or stored by the video device. The interfaces may be designed and constructed to communicate, integrate or interact with a VMS. In some embodiments, a VMS on the computing device includes one or more interfaces 1010.

The external device manager 1030 may comprise an application, program, library, service, process, task or any type and form of executable instructions executable on one or more processors, such as the processors of the computing device or integrated device. In some embodiments, the video conference application comprises the external device manager. In some embodiments, the integrated device comprises the external device manager. In some embodiments, the media controller of the integrated device comprises the external device manager. In some embodiments, the video processing/mixing 1015 of the integrated module comprises the external device manager. In some embodiments, the external device manager is a separate executable executing on the processor of the integrated device or the processor of the computing device. In some embodiments, the external device manager communicates with the media controller or any components of the integrated device to establish a connection and/or receive video from a video device.

The external device manager may provide a graphical user interface or command line interface to receive requests regarding an external video device 1005. The external device manager may provide a programmatic interface, such as an API, to receive and process requests regarding an external video device 1005. For example, the external device manager may receive a request 1025 to connect to a video device 1005 or receive a video stream from a video device. The external device manager may be designed, constructed and/or configurable to identify and present one or more video devices available or accessible via the computing device and/or integrated module. The external device manager may be designed, constructed and/or configurable to provide or present a selectable list of one or more video devices 1005 to participate or be integrated into a video conference call established, provided by or facilitated by the integrated device. The external device manager may be designed, constructed and/or configurable to receive identification of a video device to which to connect to and/or receive video. The external device manager may be designed, constructed and/or configurable to receive a request to close a connection or stop receiving video from a video device.

Figure 10B:
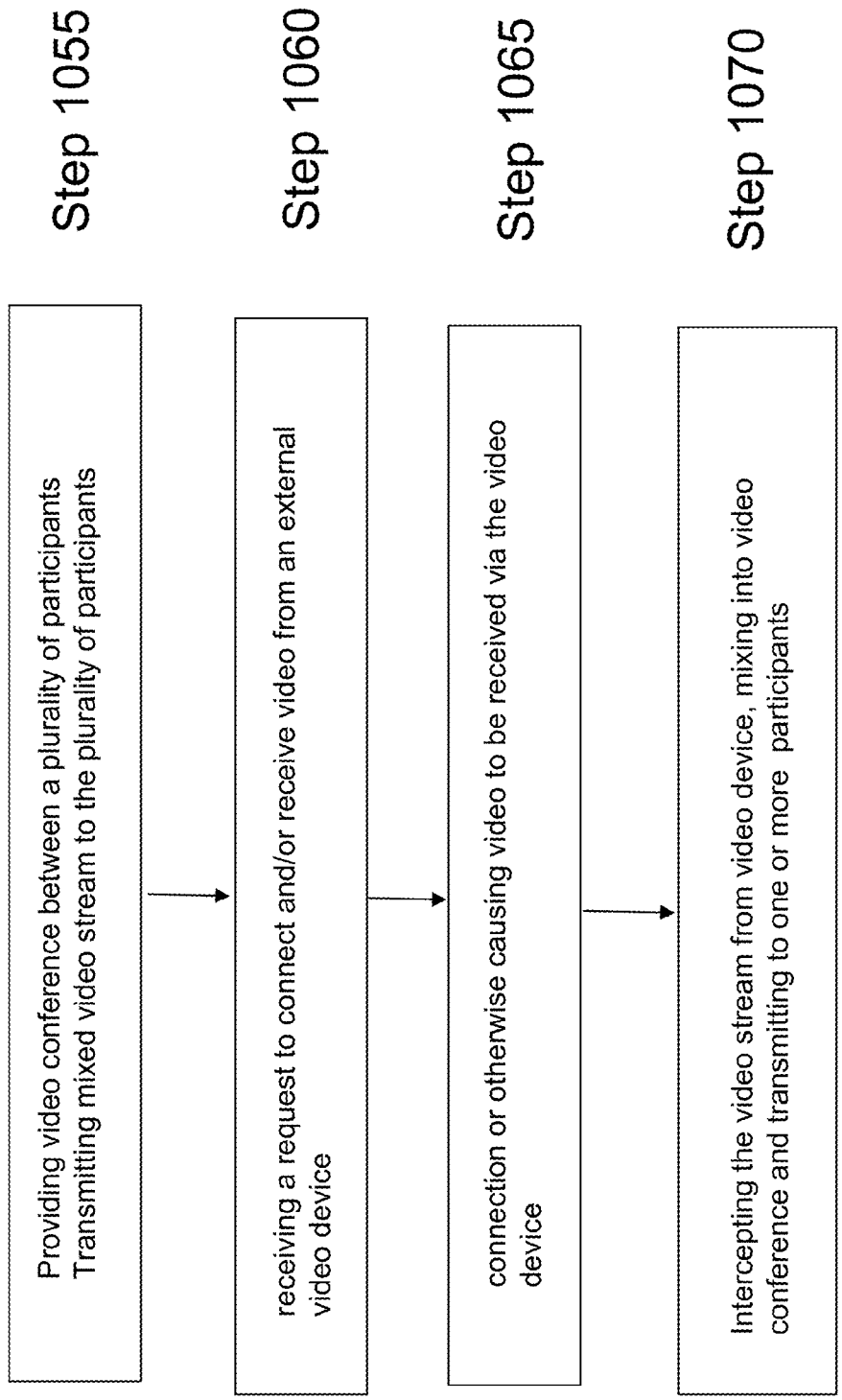
FIG. 10B is an embodiment of a method for mixing video from external video device into video conference provided by integrated device installed as an Ethernet adapter.

Referring now to FIG. 10B, an embodiment of a method for integrating or providing video from an external video producing device into a video conference is depicted. In brief overview, at step 1055, the integrated device provide a video conference between a plurality of participants. The integrated device may transmit a video stream mixed by the integrated device to each or one or more of the participants. At step 1060, the computing device and/or integrated device receives a request to connect to a video device or receive video from the video device. At step 1065, responsive to the request, the computing device and/or integrated device establishes a connection or otherwise causes video from the video device to be provided, communicated or transmitted to the computing device and/or integrated device. At step 1070, the integrated device intercepts the video stream from the video device, mixes the video stream into the video conference mixing of video from the participants and transmits the mixed video stream to each or one or more of the participants.

In further details, the integrated device installed in the computing device may establish a video conference between a plurality of participants using any of the systems and methods described herein, including but not limited to those described in connection with FIGS. 3A-3C and 4A-4C. The integrated device may establish and proxy connections to each of the devices of the participants. The integrated device may establish and proxy connections to each device using different signaling and media protocols. The integrated device may intercept a video stream from each device, decode the video stream based on the encoding of each video stream and mix the video from each device via the video mixer using any of the embodiments described herein. The integrated device may take the mixed video and encode the mixed video into a protocol for each connection to each device and transmit the encoded mixed video via the connection between the integrated device and each device according to the transport layer and media protocols used by that device.

At step 1060, the computing device and/or integrated device may receive a request to connect and/or receive video from a video device. The request may be received by the external device manager. In some embodiments, the request 1025 is received upon the establishment of the video conference, such as at step 1055. For example, the video device may have a URI identified in a SIP request to establish a conference with the video device. In another example, a user setting up the video conference via the video conference application may identify or select one or more video devices 1005 to participate in the video conference. In some embodiments, the request is sent or requested by a user of the video conference application executing on the computing device comprising the integrated device. In some embodiments, the request is sent or requested by a user of a VMS executing on any of the devices illustrated in FIG. 10A. In some embodiments, the request is sent or requested by a participant in the video conference from a communications application executing on the participant's device or via the participant's access to an interface of the video conference application executing on the computing device comprising the integrated device. In some embodiments, the video device sends a request to the video conference application or integrated device to connect to or participate in the video conference. For example, in some embodiments, a user of the VMS for the video device sends a request to the integrated device for the video device to connect or stream video for a video conference. In some embodiments, the request is received any time during the video conference.

At step 1065, the integrated device connects to or communicates with the video device. The integrated device may connect to the video device via an interface 1010. The integrated device may connect to the video device via an interface 1010. The integrated device may connect to the video device via an interface 1010 to the local connector. The integrated device may connect to the video device directly via the local connector. The integrated device may connect over the network to the video device via an interface 1010. The integrated device may connect over the network to the video device via an interface 1010 to the intermediary device. The integrated device may connect over the network to the video device via an interface 1010 to a second computing device connected to the video device. The integrated device may connect over the network to the video device via an interface 1010 to the intermediary device.

The integrated device may communicate using IP based communications over the connection to the video device. The integrated device may communicate using SIP based communications to establish a media based session with a SIP stack of the VMS for the video device or SIP stack of the video device. The integrated device may send a request, command or make an API call to have a video of the video device be transmitted, communicated or received by the integrated device. The video may be a stored video of the video device or VMS managing the video device. The video may be a stream of a video of the video device or VMS managing the video device. The video may a live capture or stream of video currently being produced, captured or generated by the video device.

At step 1070, the integrated device intercepts the transmission or communication of the video stream from the video device. A VMS, intermediary, computing device or video device may transmit the video via the network 116 which is received by the integrated device installed as an Ethernet adapter. The video stream may traverses the network stack provided by the integrated device and computing device. A media controller of the integrated device may intercept the transmission at or below the transport layer, such as at the media access control layer. In some embodiments, the integrated device via interface 1010 receives the video stream from the video device. In some embodiments, the integrated device receives the video from a locally connected device, such as via a video device connected via local connector to the computing device. The integrated device may decode the video stream from the video device. The integrated device may store the video stream or portions thereof in memory of the integrated device. The integrated device may translate or encode the video stream into a desired format for mixing.

Using any embodiment of the video mixing systems and methods described herein, the integrated device may mix the video, or any portions thereof, from the video device into the video conference. As the video stream is received from the video device in conjunction with video streams from each of the participants, the video mixing functionality 1015 may mix each of these video streams into a single mixed video. The video mixing functionality may mix in the video from the video device in accordance to any mixing format or arrangement. The video mixing functionality may mix in the video from the video device according to a role assigned to or designated for the video device. The video mixing functionality may mix in the video from the video device according to the specification or instructions from a user. The integrated device may transmit the mixed video, including portions from the video device, to each device of the participants via their respective connections and protocols. The integrated device may transmit the mixed video, including portions from the video device, to a selected one of the participants via their respective connections and protocols.

Embodiments of the systems and methods of the present solution described herein may be used to connect a video conference to a streaming server to stream video to participants who are not connected to the video conference or otherwise not video enabled. The media controller of the integrated device may initiate a session establishment with a video streaming server. The media controller and/or video conferencing application may establish or negotiate with the streaming video server any session parameters, such as bit rate, resolution, etc. The media controller may create a copy of the mixed stream and transmit the mixed video stream to the streaming server via the established session. The streaming server may broadcast the mixed video to a plurality of endpoints such, as a Windows Media Player, QuickTime or a Web server that displays the mixed video in a web browser.

Although many of the embodiments discussed above refer to communications via the SIP protocol, one of skill in the art may readily apply these systems and methods to communications via similar signaling protocols. Furthermore, in some embodiments of the systems and methods discussed herein, a host computing device of an integrated device installed as an Ethernet adapter in the host computing device may execute an application for control of functions of the integrated device. For example, the host computing device may execute a GUI or command line interface for configuring or managing firewall policies or other security policies, registering VoIP/SIP/PBX extensions or users, configuring default video conference options, or performing other functions. In one embodiment, such applications may communicate with the integrated device via an API call to the device. In another embodiment, such applications may communicate with the integrated device via a network packet sent via the integrated device. For example, the application may transmit a packet via a network stack of the computing device corresponding to the integrated device, such that the packet is passed to a network switch of the device. The packet may include an address of the integrated device, such as a preconfigured localhost virtual address or a default address, and the network switch of the device may forward the packet to a network stack or processor of the device. This may eliminate the need for configuration of the host computing device operating system. Applications such as a video conferencing application or VoIP application executing on the host computing device may communicate with the integrated device in similar methods.

It should be understood that any of the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A method for providing unauthenticated client access to session initiation protocol (SIP) communication services provided by an Ethernet device comprising a proxy and a conference bridge, comprising:
   receiving, by a device installed as an Ethernet adapter, a SIP call request from a first client, the SIP call request comprising a first uniform resource identifier (URI), the first URI comprising a SIP alias;
   determining, by the device, that the first client has not been authenticated;
   identifying, by the device, that the first URI comprises a SIP alias;
   proxying, by the device, the SIP call request to an endpoint associated with the SIP alias, responsive to the identification of the first URI as a SIP alias;
   receiving, by the device, a second SIP call request from the first client, the SIP call request comprising a third URI; and
   blocking, by the device, the second SIP call request.

2. The method of claim 1, further comprising determining that the SIP alias corresponds to a conference bridge address, and wherein proxying the SIP call request is performed responsive to the determination that the SIP alias corresponds to the conference bridge address.

3. The method of claim 2, further comprising determining that the conference bridge address is an address for an active conference session, and wherein proxying the SIP call request is performed responsive to the determination that the conference bridge address is an address for the active conference session.

4. The method of claim 1, wherein determining that the first client has not been authenticated comprises determining that the first client has not registered an address with a registrar of the device.

5. The method of claim 1, wherein determining that the first client has not been authenticated comprises determining that the first client lacks authorization to register an address.

6. The method of claim 1, wherein identifying that the first URI comprises a SIP alias comprises retrieving a registration record associated with the first URI from a registrar of the device.

7. The method of claim 6, further comprising identifying an explicit alias indicator in the retrieved registration record.

8. The method of claim 6, further comprising identifying that the first URI is associated with a plurality of addresses.

9. The method of claim 6, further comprising identifying that the first URI is associated with an address of a conference bridge.

10. The method of claim 6, further comprising identifying that the first URI is associated with a second URI.

11. The method of claim 1, wherein blocking the second SIP call request comprises blocking the request, responsive to determining that the third URI corresponds to an internal extension.

12. The method of claim 1, wherein blocking the second SIP call request comprises blocking the request, responsive to determining that the third URI does not correspond to an active conference session.

13. The method of claim 1, wherein blocking the second SIP call request comprises blocking the request, responsive to determining that a number of requests received from the first client exceeds a predetermined threshold.

14. The method of claim 1, further comprising adding the first client to a blacklist.

15. A system providing unauthenticated client access to session initiation protocol (SIP) communication services provided by an Ethernet device comprising a proxy and a conference bridge, comprising:
   a device installed as an Ethernet adapter, comprising an Ethernet interface for receiving a SIP call request from a first client, the SIP call request comprising a first uniform resource identifier (URI), the first URI comprising a SIP alias;
   wherein the device is configured for:
   determining that the first client has not been authenticated,
   identifying that the first URI comprises a SIP alias, and
   proxying the SIP call request to an endpoint associated with the SIP alias, responsive to the identification of the first URI as a SIP alias; and
   wherein the Ethernet interface is further configured for receiving a second SIP call request from the first client, the SIP call request comprising a third URI; and the device is further configured for blocking the second SIP call request.

16. The system of claim 15, wherein the device further comprises a conference bridge, and wherein the device is configured for determining that the SIP alias corresponds to a conference bridge address, and wherein proxying the SIP call request is performed responsive to the determination that the SIP alias corresponds to the conference bridge address.

17. The system of claim 16, wherein the device is further configured for determining that the conference bridge address is an address for an active conference session, and wherein proxying the SIP call request is performed responsive to the determination that the conference bridge address is an address for the active conference session.

18. The system of claim 15, wherein the device comprises a registrar, and wherein the device is configured for determining that the first client has not registered an address with the registrar of the device.

19. The system of claim 15, wherein the device is configured for determining that the first client lacks authorization to register an address.

20. The system of claim 15, wherein the device comprises a registrar, and wherein the device is configured for retrieving a registration record associated with the first URI from the registrar of the device.

21. The system of claim 20, wherein the device is configured for identifying an explicit alias indicator in the retrieved registration record.

22. The system of claim 20, wherein the device is configured for identifying that the first URI is associated with a plurality of addresses.

23. The system of claim 20, wherein the device comprises a conference bridge, and wherein the device is configured for identifying that the first URI is associated with an address of the conference bridge.

24. The system of claim 20, wherein the device is configured for identifying that the first URI is associated with a second URI.

* * * * *